United States Patent
Eghbal et al.

(10) Patent No.: US 11,093,673 B2
(45) Date of Patent: Aug. 17, 2021

(54) THREE-DIMENSIONAL NOC RELIABILITY EVALUATION

(71) Applicant: Synopsys, Inc., Mountain View, CA (US)

(72) Inventors: Ashkan Eghbal, San Jose, CA (US); Pooria M. Yaghini, Irvine, CA (US); Nader Bagherzadeh, Laguna Beach, CA (US)

(73) Assignee: Synopsys, Inc., Mountain View, CA (US)

(*) Notice: Subject to any disclaimer, the term of this patent is extended or adjusted under 35 U.S.C. 154(b) by 495 days.

(21) Appl. No.: 15/853,105

(22) Filed: Dec. 22, 2017

(65) Prior Publication Data

US 2018/0203963 A1    Jul. 19, 2018

Related U.S. Application Data

(60) Provisional application No. 62/438,125, filed on Dec. 22, 2016.

(51) Int. Cl.
  *G06F 30/33* (2020.01)
  *G06F 11/26* (2006.01)
  (Continued)

(52) U.S. Cl.
  CPC ............ *G06F 30/33* (2020.01); *G06F 11/261* (2013.01); *G06F 30/394* (2020.01);
  (Continued)

(58) Field of Classification Search
  CPC ...... G06F 30/33; G06F 30/394; G06F 11/261; G06F 2111/04; G06F 2111/20; G06F 2117/02
  See application file for complete search history.

(56) References Cited

U.S. PATENT DOCUMENTS

| 4,996,688 A | * | 2/1991 | Byers | ............ | G01R 31/318536 |
| | | | | | 714/41 |
| 7,689,866 B2 | * | 3/2010 | Chakraborty | ....... | G06F 11/3672 |
| | | | | | 714/32 |

OTHER PUBLICATIONS

Eghbal, Ashkan, Pooria M. Yaghini, Hossein Pedram, and Hamid R. Zarandi. "Fault injection-based evaluation of a synchronous noc router." In 2009 15th IEEE International On-Line Testing Symposium, pp. 212-214. IEEE, 2009. (Year: 2009).*

(Continued)

*Primary Examiner* — Chuen-Meei Gan
(74) *Attorney, Agent, or Firm* — Park, Vaughan, Fleming & Dowler LLP; Laxman Sahasrabuddhe

(57) ABSTRACT

Methods, storage mediums, and apparatuses for evaluating the reliability of Three-Dimensional (3D) Network-on-Chip (NoC) designs are described. The described embodiments provide a 3D NoC specific fault-injector tool which is able to model logic-level fault models of 3D NoC specific physical faults in 3D-NoC platform. These embodiments automate the whole process of static and dynamic fault injection base on the user preference and reports the specific reliability metrics for 3D NoC platform as a single tool. The described embodiments can be used for the reliability evaluation and effectiveness of fault-tolerant designs in any of the 3D-many core designs such as manycore systems in different ranges of application from embedded systems in cellphones to larger systems which can be used in next generation of autonomous cars or hypercube memory cells.

9 Claims, 39 Drawing Sheets

(51) Int. Cl.
G06F 30/394 (2020.01)
G06F 111/04 (2020.01)
G06F 111/20 (2020.01)
G06F 117/02 (2020.01)

(52) U.S. Cl.
CPC ....... G06F 2111/04 (2020.01); G06F 2111/20 (2020.01); G06F 2117/02 (2020.01)

(56) References Cited

OTHER PUBLICATIONS

Eghbal, Ashkan, Pooria M. Yaghini, Nader Bagherzadeh, and Misagh Khayambashi. "Analytical fault tolerance assessment and metrics for TSV-based 3D network-on-chip." IEEE Transactions on computers 64, No. 12 (2015): 3591-3604. (Year: 2015).*
Eghbal, Ashkan. "Three-Dimensional NoC Reliability Evaluation Automated Tool (TREAT)." PhD diss., UC Irvine, 2016. (Year: 2016 ).*
Khayambashi, Misagh, Pooria M. Yaghini, Ashkan Eghbal, and Nader Bagherzadeh. "Analytical reliability analysis of 3D NoC under TSV failure." ACM Journal on Emerging Technologies in Computing Systems (JETC) 11, No. 4 (2015): 1-16. (Year: 2015).*
Yaghini, Pooria M., Ashkan Eghbal, Siavash S. Yazdi, and Nader Bagherzadeh. "Accurate system-level TSV-to-TSV capacitive coupling fault model for 3D-NoC." In Proceedings of the 9th International Symposium on Networks-on-Chip, pp. 1-8. 2015. (Year: 2015).*
Navabi, Zainalabedin. "Digital system test and testable design." E-ISBN (2011): 97814419-97875485. (Year: 2011).*
Khayambashi M, Yaghini PM, Eghbal A, Bagherzadeh N. Analytical reliability analysis of 3D NoC under TSV failure. ACM Journal on Emerging Technologies in Computing Systems (JETC). Apr. 27, 2015;11 (4):1-6. (Year: 2015).*
Yadav S, Gaur MS, Laxmi V, Bhargava M. Dynamic fault injection model for on-chip 2D mesh network. InProceedings of the 7th ACM India Computing Conference Oct. 9, 2014 (pp. 1-6). (Year: 2014).*
Banerjee, Nilanjan, Praveen Vellanki, and Karam S. Chatha. "A power and performance model for network-on-chip architectures." In Proceedings Design, Automation and Test in Europe Conference and Exhibition, vol. 2, pp. 1250-1255. IEEE, 2004. (Year: 2004).*
Eghbal et al.; "Analytical Fault Tolerance Assessment and Metrics for TSV-Based 3D Network-on-Chip" IEEE Trasnactions on Computers, vol. 64, No. 12, Dec. 2015.
Eghbal et al.; "Capacitive Coupling Mitigation for TSV-based 3D ICs" 2015 IEEE 33rd VLSI Test Symposium (VTS), IEEE Computer Society, 2015.
Eghbal et al.; "Fault Injection-based Evaluation of a Synchronous NoC Router" IOLTS 2009, 15th IEEE International, 212-214.
Eghbal et al.; "TSV-to-TSV Inductive Coupling-Aware Coding Scheme for 3D Network-on-Chip" 2014 IEEE International Symposium.
Khayambashi et al.; "Analytical Reliability Analysis of 3D NoC Under TSV Failure", ACM Journal on Emerging Technologies in Computing Systems, vol. 11, No. 4, Article 43, Pub. date: Apr. 2015.
Yaghini et al.; "Accurate System-Level TSV-to-TSV Capacitive Coupling Fault Model for 3D-Noc", NOCS 15 Sep. 28-30, 2015, Vancouver, BC Canada.
Yaghini et al.; "Capacitive and Inductive TSV-to-TSV Resilient Approaches for 3D ICs", IEEE Transactions on Computer, vol. 65, No. 3, Mar. 2016.
Yaghini et al.; "Coupling Mitigation in 3-D Multiple Stacked Devices", IEEE Transactions of Very Large Scale Integration (VLSI) Systems, vol. 23, No. 12, Dec. 2015.
Yaghini et al.; "Investigation of Transient Fault Effects in Synchronous and Asynchronous Network on Chip Router", Journal of Systems Architecture 57 (2011) 61-68.

* cited by examiner

SoC CONSUMER PORTABLE DESIGN COMPLEXITY TRENDS

TSV-BASED 3D MULTIPLE-STACKED MEMORY

FAULT MEANS

TAGNoC ARCHITECTURE FOR A 5-PORT NoC ROUTER

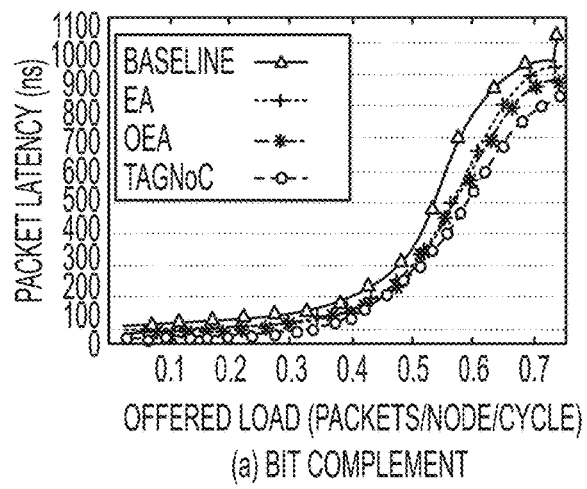
(a) BIT COMPLEMENT
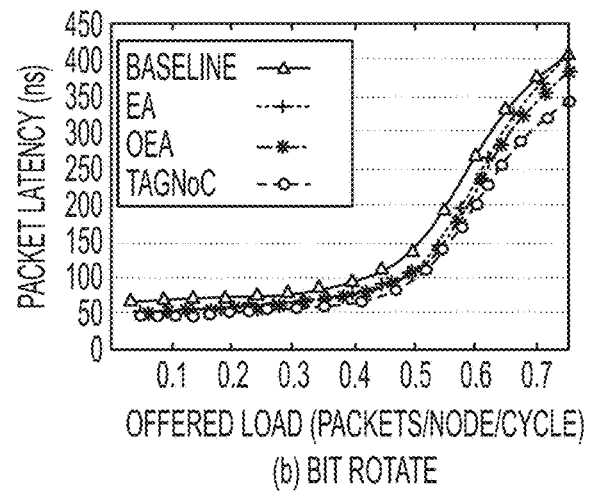
(b) BIT ROTATE
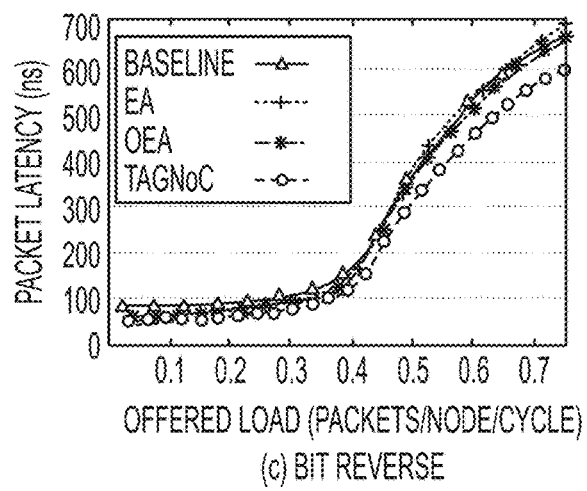
(c) BIT REVERSE
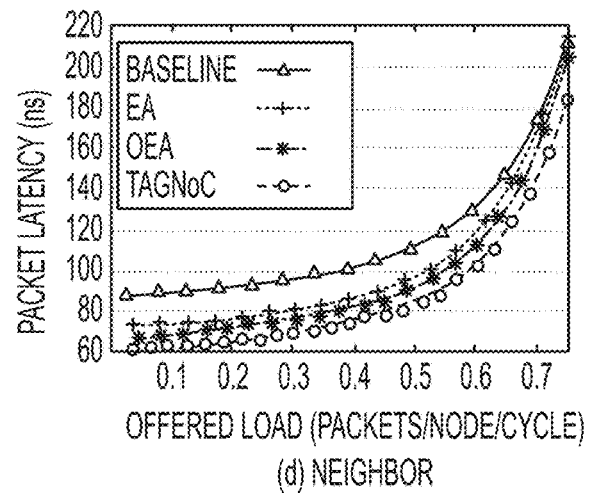
(d) NEIGHBOR
AVERAGE PACKET LATENCY UNDER SYNTHETIC TRAFFIC
Figure 3H

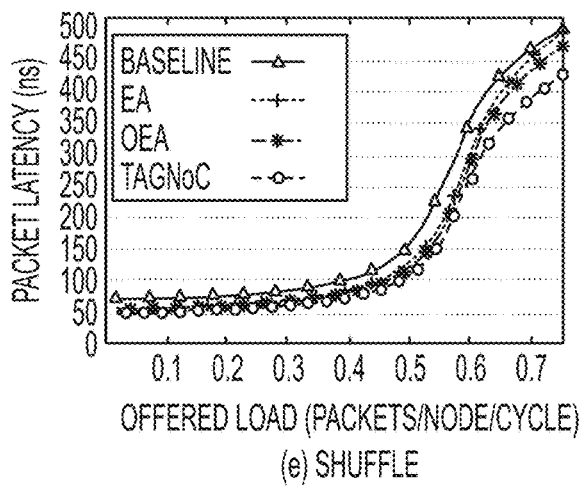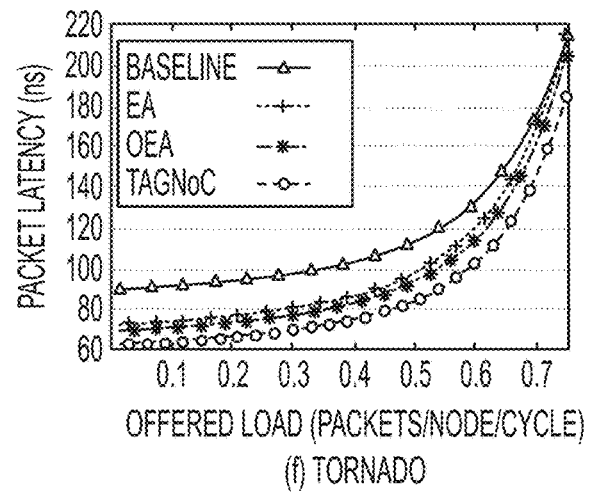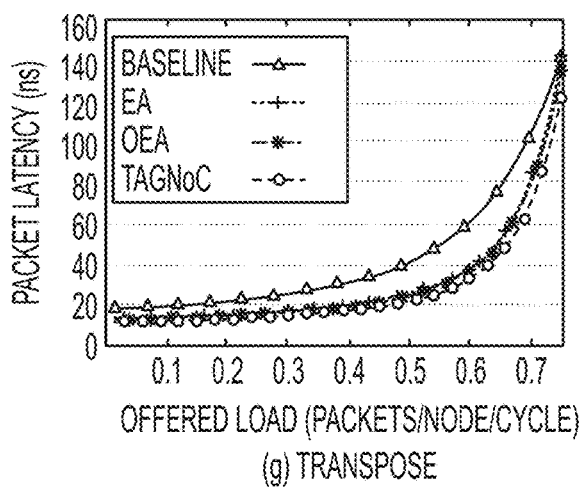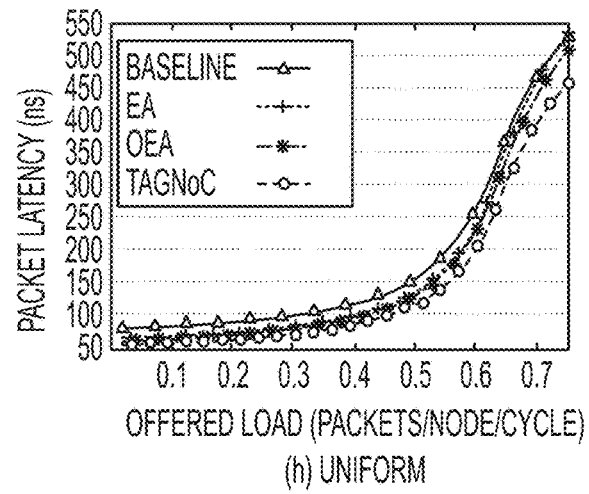
AVERAGE PACKET LATENCY UNDER SYNTHETIC TRAFFIC
Figure 3H Cont.

AVERAGE PACKET LATENCY UNDER SPLASH-2 APPLICATION TRAFFIC

POWER CONSUMPTION AND AREA OCCUPATION COMPARISON

POTENTIAL PHYSICAL-LEVEL AND LOGIC-LEVEL FAULTS IN 3D NoC

CLASSIFICATION OF FAULTS AND THEIR EFFECTS IN 3D NoC COMPONENTS

CURRENT FLOW DIRECTION IN TSV.

CIRCUIT-LEVEL OF VICTIM TSV AND ITS NEIGHBORS

FAULT DENSITY MAP

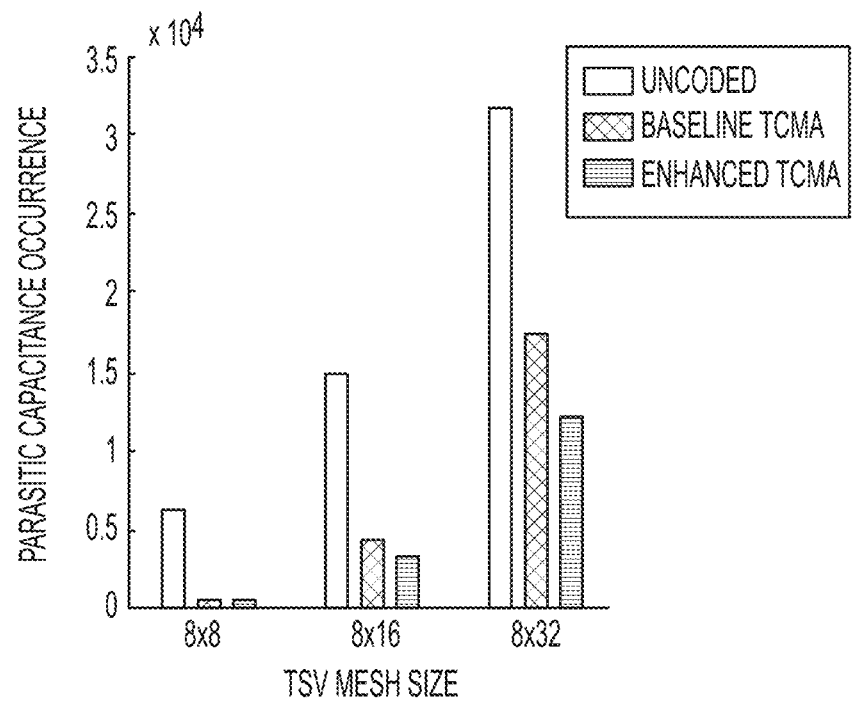
(a) RANDOM DATA BIT PATTERNS IN LARGER MESH OF TSVs
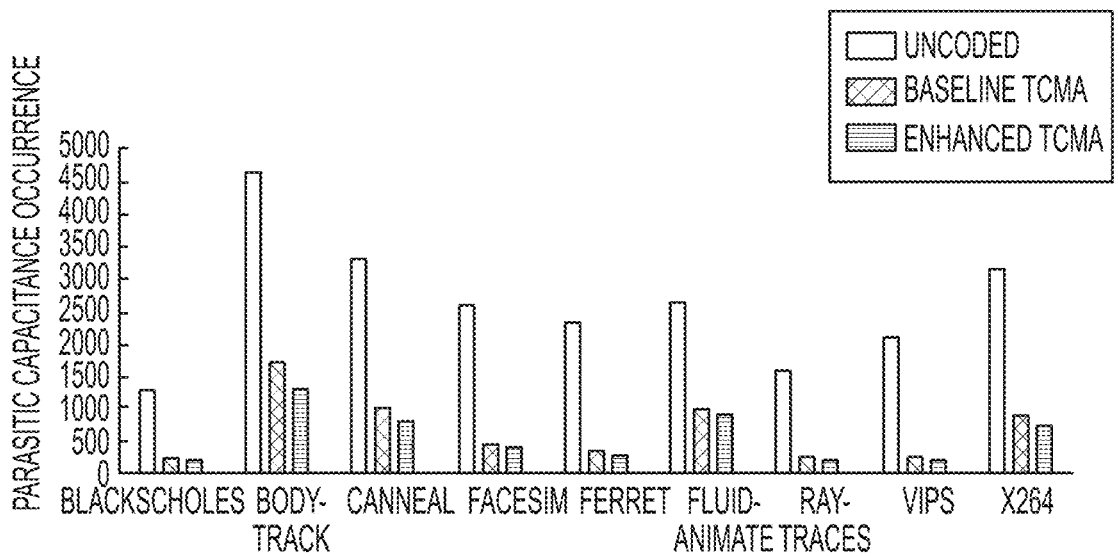
(b) PARSEC APPLICATION DATA BIT PATTERNS IN 8 x 32 MESH OF TSVs
7C AND 8C CAPACITIVE COUPLING FOR RANDOM AND PARSEC APPLICATIONS
Figure 7E

CHARACTERIZING INDUCTIVE COUPLING AGAINST VARIOUS PARAMETERS

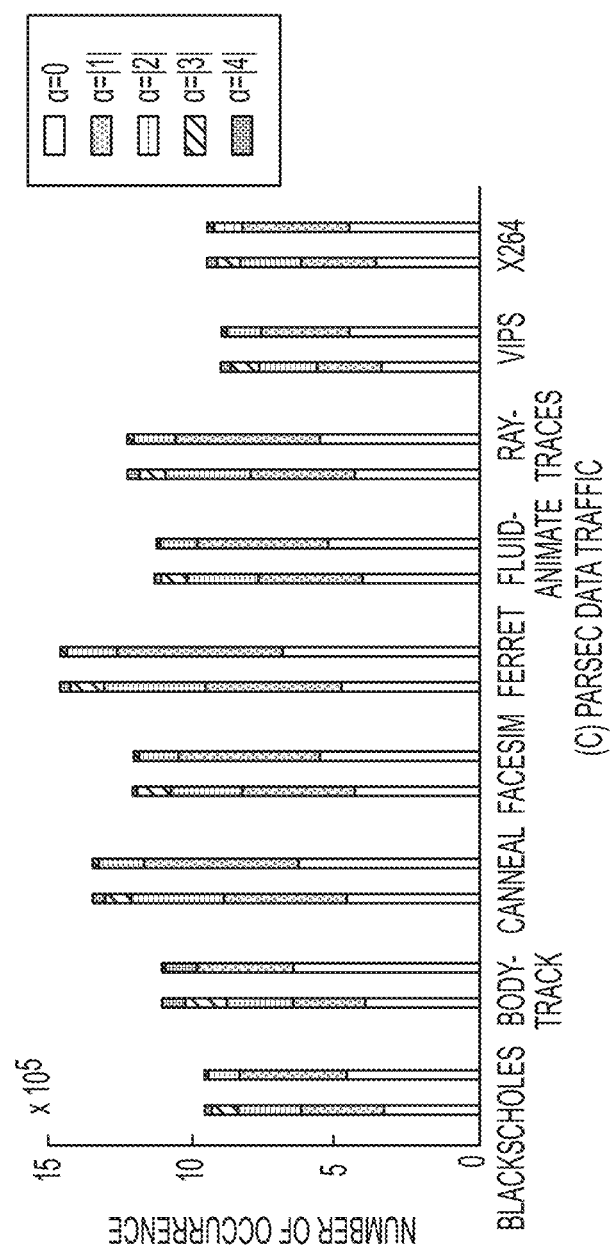

THREE-DIMENSIONAL NOC RELIABILITY EVALUATION

RELATED APPLICATION

This application claims benefit of U.S. Provisional Application Ser. No. 62/438,125, filed on 22 Dec. 2016, by the same inventors, the contents of which are herein incorporated by reference in their entirety for all purposes.

BACKGROUND

This disclosure relates to reliability of integrated circuits that include Three-Dimensional (3D) Network-on-Chip (NoC) technology. Technology scaling and higher operational frequencies are no longer sustainable at the same pace as before. The processor industry is rapidly moving from a single core with high-frequency designs to many-core with lower frequency chips; NoC has been proposed as a scalable and efficient on-chip interconnection among cores. In addition, employing 3D integration instead of Two-Dimensional (2D) integration is the other trend to keep the traditional expected performance improvements. The combination of 3D integration and NoC technologies provides a new horizon for on-chip interconnect design. In more detail, the reduction of the length and number of global interconnects; by applying Through-Silicon Via (TSV) is the major advantage of 3D NoCs. However, shrinking transistor sizes, smaller interconnect features, and 3D packaging issues, lead to higher error rates and unexpected timing variations. Although many researches have focused on reliability issues for 3D NoC architectures, to develop a general technique to advance both the intuitive understanding and the quantitative measurement of how potential physical faults influence the behavior of 3D NoC is lacking.

SUMMARY

Some embodiments disclosed herein provide methods, storage mediums, and apparatuses for evaluating the reliability of 3D NoC designs. Specifically, some embodiments provide a Three-Dimensional NoC Reliability Evaluation Automated Tool (TREAT). TREAT is a 3D-NoC specific fault-injector tool which is able to model logic-level fault models of 3D NoC specific physical faults in 3D-NoC platform. It automates the whole process of static and dynamic fault injection base on the user preference and reports the specific reliability metrics for 3D NoC platform as a single tool. It can be used for the reliability evaluation and effectiveness of fault-tolerant designs in any of the 3D-many core designs such as manycore systems in different ranges of application from embedded systems in cellphones to larger systems which can be used in next generation of autonomous cars or hypercube memory cells.

During operation, some embodiments can simulate, by using a simulation module executing on a computer, a register-transfer level (RTL) description of a three dimensional (3D) Network-on Chip (NoC) design. Next, the embodiments can receive, via a user interface of the computer, simulation parameters that are used by the simulation module to simulate the RTL description of the 3D NoC design. The embodiments can then inject at least one dynamic logic-level fault into the RTL description of the 3D NoC design while the simulation module is simulating the RTL description of the 3D NoC design, wherein the at least one dynamic logic-level fault corresponds to a physical fault that is specific to the 3D NoC design. Next, the embodiments can comput at least one reliability metric for the 3D NoC design based on analyzing an impact of injecting the at least one dynamic logic-level fault into the RTL description of 3D NoC design.

Some embodiments can generate a traffic pattern that is used by the simulation module to simulate the 3D NoC design.

In some embodiments, injecting the at least one dynamic logic-level fault into the RTL description of the 3D NoC design comprises (1) monitoring signal values while the simulation module is simulating the 3D NoC design, (2) detecting that a dynamic-fault activation condition has been met based on the signal values that are monitored by the monitoring module, and (3) injecting the at least one dynamic logic-level fault into the RTL description of 3D NoC design upon detecting that the dynamic-fault activation condition has been met.

In some embodiments, analyzing the impact of injecting the at least one dynamic logic-level fault into the RTL description of 3D NoC design comprises comparing (1) a first simulation output produced by the simulation module when the at least one dynamic logic-level fault is not injected into the RTL description of 3D NoC design, with (2) a second simulation output produced by the simulation module when the at least one dynamic logic-level fault is injected into the RTL description of 3D NoC design.

In some embodiments, the at least one reliability metric for the 3D NoC design is one of: (1) Mean Time Between Failures (MTBF) of one or more components of the 3D NoC design, (2) percentage of header flit loss, (3) percentage of data flit loss, or (4) percentage of tail flit loss.

BRIEF DESCRIPTION OF THE FIGURES

FIG. 3H illustrates the average packet latency versus offered load for all the approaches under running synthetic traffics as a function of aggregate offered load for mesh network of 16 nodes.

FIG. 7E illustrates the 7 C and 8 C capacitative coupling for random and PARSEC applications.

DETAILED DESCRIPTION

Figure 1A:
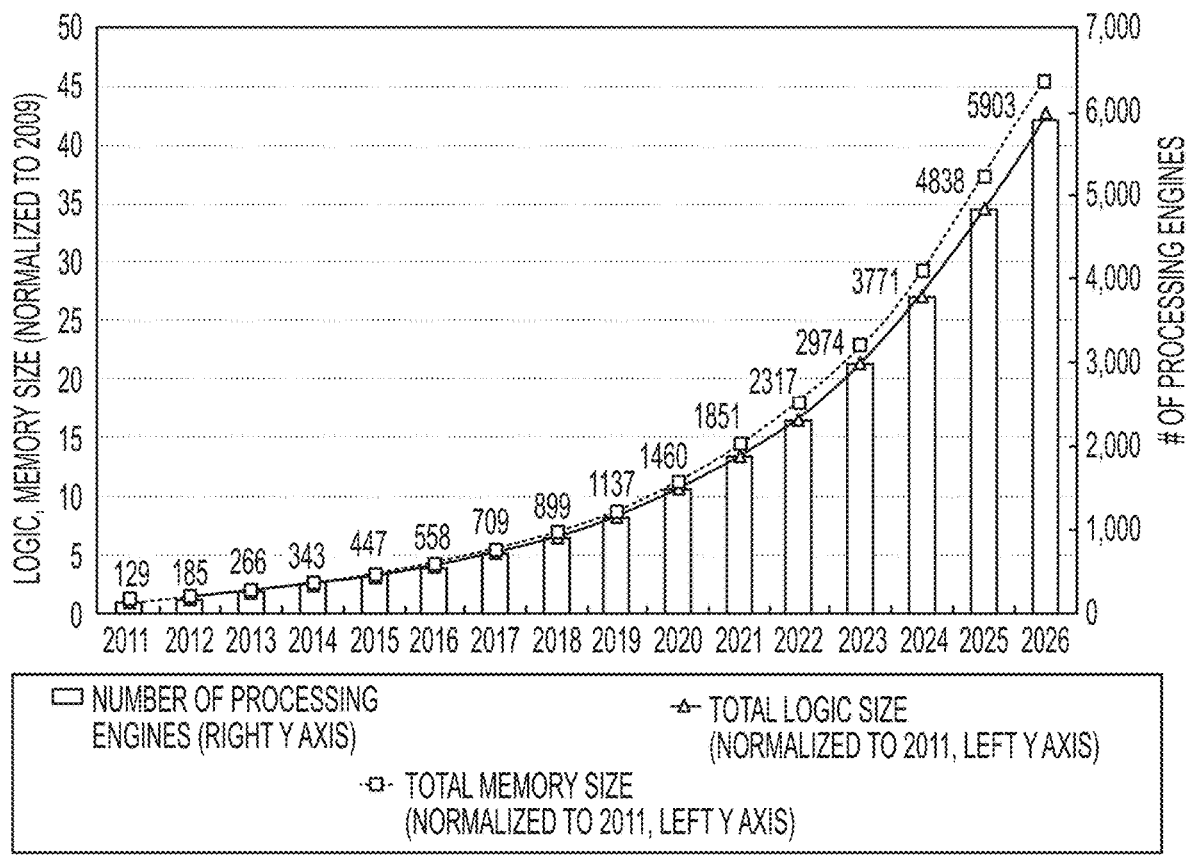
FIG. 1A illustrates a trend in the number of cores.

A goal of this reasearch is to develop a Three-Dimensional NoC Reliability Evaluation Automated Tool (TREAT), for the first time, as an automated analysis tool to analyze effects of static and dynamic faults in 3D NoC architectures. It is capable of evaluating the vulnerability of different architectural components in the presence of faults by using the fault injection method. This approach allows injecting faults into the 3D NoC platform dynamically by monitoring the status of links and components to decide where and when inject faults accurately. TREAT provides the strength of different components in terms of reliability-based metrics such as Mean Time Between Failure (MTBF) and header/data/trailer flit failure rate for different level of granularity. The output reports of TREAT are critical in devising fault-tolerant techniques with low overhead cost. TREAT can be used at the early stage of the design process in order to prevent costly redesigns after assessing dependability for the target architecture.

Comparing to existing fault injector tools, TREAT is specifically developed for 3D NoC platforms and it is not a general fault injector tool. Such a tool is needed since the characteristics and behavior of a 3D NoC component is different from other computational platforms; 3D NoCs are susceptible to different fault sources that are not fully addressed by existing tools. Furthermore, one of the most important advantages of TREAT is supporting dynamic fault injection by monitoring the status of the NoC platform. This is critical since based on the reported experiments in this disclosure, random TSV coupling fault injection may result in about 26%-99% inaccuracy of reliability evaluation process. The fault injector interface is responsible for injecting fault accurately where and when they should in order to enhance the reliability evaluation. None of the existing tools offer these capabilities as a single package.

CHAPTER 1: INTRODUCTION

Since the technology scaling does not treat wire delay and gate delay equally, many-cores' interconnection design became challenging. Consequently, a novel communication method is required to take the benefits of many-core designs as they are highly demanded for both embedded systems and super-computers. Additionally, the reliability characteristic is of crucial importance in today's High Performance and Energy Efficient Computing (HPEEC) applications since the malfunctioning of a component results in lower performance and waste of energy. Therefore, similar to any new technology the reliability of the proposed communication methodologies is a crucial issue.

With this in mind, a reliability analysis tool is needed to uncover the sensitive components and to evaluate the efficiency of the proposed robust designs. Although many general analysis tools have been presented especially for investigating the reliability properties of the processors, these tools are not accurate enough to reveal fault tolerance characteristics of the next generation on-chip communication links.

The purpose for this research is to develop a specific reliability analysis tool, to address the unexpected effects of physical faults in on-chip interconnections statically and dynamically. In the rest of this chapter, the necessity and the basic concepts of on-chip links with their reliability issues are briefly discussed. Additionally, the available reliability analysis tools are also introduced and compared with the one which is proposed in this disclosure. Then the contributions of this research are listed and discussed and finally, the outline of the disclosure is provided.

1.1 The Future Design Trends

The three well known factors in traditional high performance Processing Element (PE) designs are: Instruction Level Parallelism (ILP), gates per clock, and process technology. However, the first two factors have already reached their limits. The problem of process technology scaling is more related to wire issues and energy consumption concerns rather than the device design challenges. Applying higher frequencies results in more energy consumption, clocking synchronization concerns, and signal/power integrity issues. Moreover, the unexpected heat generation in PEs is already known as a major concern though they have never been super-fast yet. In addition, technology and supply voltage scaling slows down due to physical limitation in nano fabrication feature size. The leakage energy consumption, lithography complexity, and process variation issues are some critical examples of these physical constraints. On the other side, there are plentiful of computational applications in the market that demand more complex processing calculations such as smart phones, gaming consoles, or weather forecast applications. With these limitations there are significant concerns in moving forward to follow the Moore's law for next generation of IC designs. Therefore, different solutions have been suggested by researchers to exploit the technology capacity and keep the traditional performance improvements such as: proposing many-core designs, Three-Dimensional (3D) integration, and new generation of interconnections. Each of these solutions is discussed separately in the following subsections.

1.1.1 Moving from Single Core to Many-Core

With each passing year, the number of problems where experiments are impossible, dangerous, or inordinately costly is growing. To provide vastly more accurate predictive models and the analysis of massive quantities of data are some examples of these problems. In order to meet performance demands, parallel computing is ample motivation for proposing many-core architectures as predicted by ITS reports which is shown in FIG. 1A. Based on the represented trend in FIG. 1A the number of cores will be increased by a factor of 10 by the next decade.

However, many-core popularity is not only limited to super-computer applications. Modern embedded systems also require massive processing power due to computationally intensive embedded applications, such as self-driving automobiles' control unit, real-time speech recognition, video conferencing, software-defined radio, and cryptography. With these considerations it is concluded that, many-core design is the only de facto solution for HPEEC applications, which has been already found its way into mass production. Two major benefits of replacing a high frequency single core chip by the many-core designs with a reasonable frequency are providing better level of resource sharing and occupying less Printed Circuit Board (PCB) space. The other advantage of many-core design is increasing the raw performance by enhancing the clock per instruction factor rather than frequency, which consequently results in slower growth in energy consumption. Therefore, many-core architecture manifests a good tradeoff between technology scaling and limited energy budget requirement.

1.1.2 Moving from 2D to 3D Integration

Figure 1B:
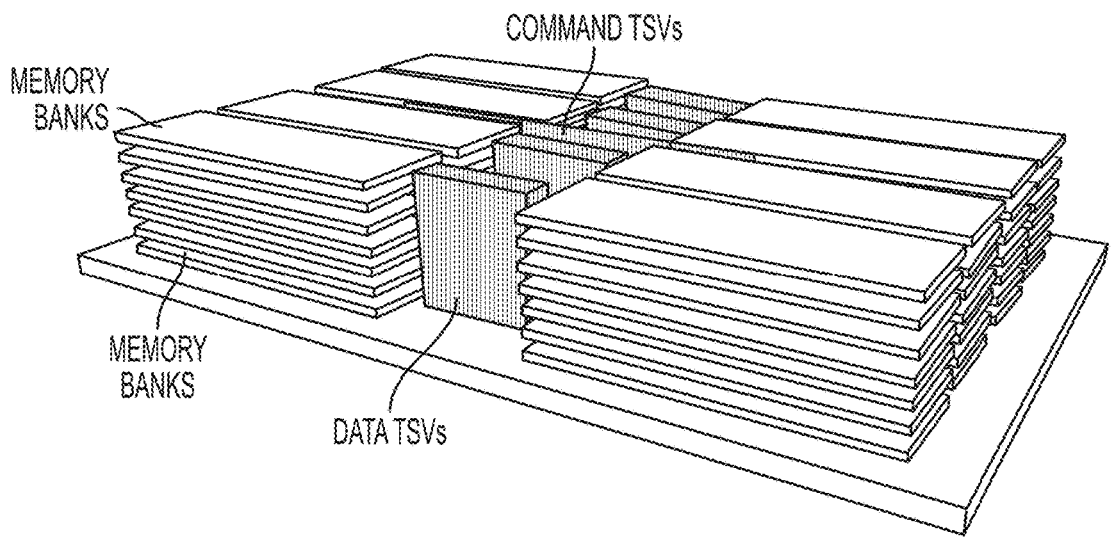
FIG. 1B shows the graphical structure of 3D memory in which memory banks are stacked on top of each other and connected through vertical interconnection known as Through Silicon-Via (TSVs).

The other solution which has been recently become popular is to add one more dimension to the 2D state of the art architectures (resulting in 3D designs). This method provides numerous opportunities to connect PEs and memory cells on one package with larger bandwidth. The 3D memory, known as Hyper Memory Cube (HMC), is an industrial example of applying this technique. FIG. 1B shows the graphical structure of 3D memory in which memory banks are stacked on top of each other and connected through vertical interconnection known as Through Silicon-Via (TSVs). One of the promises of HMC is that it eliminates the so-called "memory wall," the problem of the disparity between CPU clock speed/bandwidth and the memory systems. The 32-layer V-NAND flash memory is the other example of this approach which has been started for mass production by Samsung Company. In addition to industrial examples, the 3D cache architecture has become a popular topic of study among researchers.

In general, 3D ICs are proposed as a viable solution for integrating more PEs on a chip, without the need for extra footprint area. According to the characteristics of the 3D architectures, data transmission is done both horizontally and vertically at the same time. Moreover, 3D designs provide shorter interconnect links in which cores are usually located centimeters apart on a chip are now could be placed millimeters apart from each other vertically. Therefore, as 3D ICs compared to the 2D ones are expected to support higher performance, lower latency, smaller form factor, and less energy consumption.

1.1.3 Moving from Bus-Based to Network-Based Interconnects

The chip data transmission needs more attention as the complexity of systems increases, in a way that devising a new communication infrastructure is necessary. In other words, the traditional, bus-based core communication infrastructures, are considered as one of the performance bottleneck in many-core systems. The reason is that the wire delays have become more critical in smaller feature size, as technology scaling results in larger capacitance for global wires. It has been reported that under 45 nm technology size, Metal-1 and intermediate-level metal wires (local wires) are expected to have the same line-widths and thicknesses, demonstrating similar process variation effects. The effect of process variations on local metal layers are expected to have smaller effect on overall circuit delay because of their relatively shorter lengths as compared to global wires. Therefore, global wires are not scalable in terms of delay, energy consumption, and bandwidth. In addition, global clocking is another challenge in traditional bus-based interconnections. The clock tree method has been suggested to resolve this issue, but it consumes large portion of energy and area budget. In addition, due to clock skew effect even larger portion of the total cycle time is needed. It should be also added that a bus-based system has a limited capability of concurrent communication. The intrinsic resistance and capacitance of the bus also increase by connecting more number of cores. Moreover, buses broadcast the data to transfer them among the cores in which the entire bus wires should be switching from on to off state periodically; resulting in large waste of energy. Because of these important considerations, the Network-on-chip (NoC) architecture has been proposed as a practical alternative for the traditional system-on-chip (SoC) approach, supporting better modularity, scalability and higher bandwidth. In fact, an NoC consists of multiple point-to-point data links interconnected by routers to implement the connectivity of on-chip Intellectual Properties (IPs).

1.1.5 3D NoC

NoCs have become significant over the past 10 years in order to fully utilize the integration capacity with billion-transistor on a chip. However, because of the aforementioned benefits of 3D IC designs, as discussed in subsection 1.2, the 2D NoC designs must be expanded to support 3D schemes. The combination of 3D integration and NoC technologies provides a new horizon for on-chip interconnects design, which combines the benefits of short vertical interconnects of 3D ICs and the scalability of NoCs. Compared with 2D NoCs, 3D NoCs greatly reduce the network diameter and overall communication distance; they improve communication performance and reduce energy consumption.

The TSV is currently the most popular technology to connect 2D NoC routers vertically. They are actually large vertical wires which are surrounded by an insulation and depletion layers. Additionally, TSVs are very short and fine-pitched links, which provide high-bandwidth communication channels. They are also highly compatible with the standard CMOS process which makes them capable of integrating into existing circuits without extra design cost.

Figure 1C:
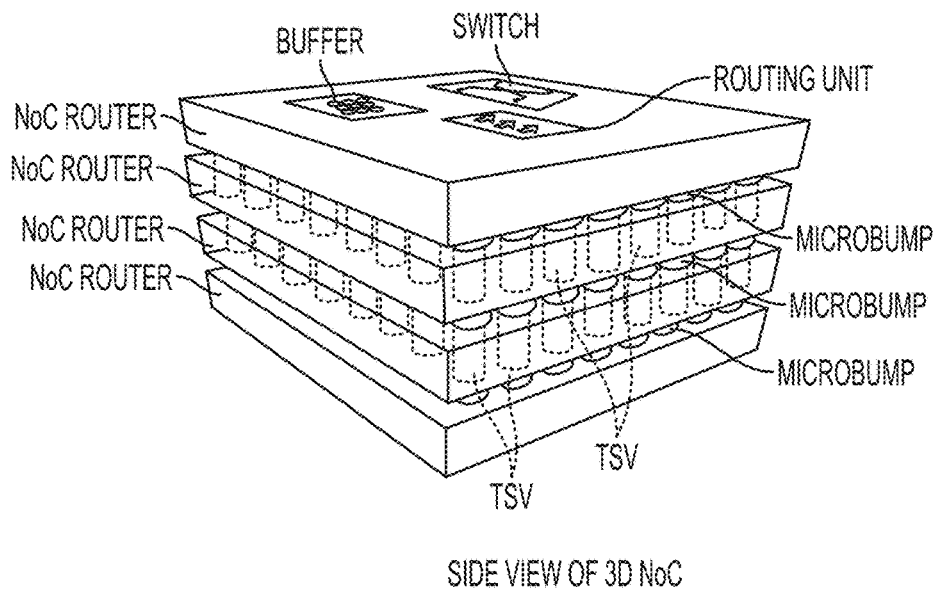
FIG. 1C shows 3D structure of stacked 2D NoC routers vertically connected by Microbumps and TSVs.

In more details, 2D NoC routers are connected by TSVs (inter-die interconnects) through connectors with small diameters called Microbumps. Microbumps are actually the metal connectors on both topside and backside of the chip which are integrated into the copper filled TSV process for electrical connection between chips. FIG. 1C shows 3D structure of stacked 2D NoC routers vertically connected by Microbumps and TSVs. The buffer, crossbar switch, and routing unit are the fundamental components of a 2D NoC router, which are individually explained in Section 3.2. In fact, TSVs implement a serial data transmission method in which each TSV is capable of single bit data transmission at a time, sequentially. This is why each NoC router is connected to several TSVs and Microbumps as shown in FIG. 1C. It should be noted that, due to large sizes of TSVs, all the routers cannot be connected to the routers of the other layers. Therefore, vertically partially connected 3D NoCs are more practical and have been the focus of majority of researchers instead of vertically fully connected 3D NoCs.

On the other side, 3D NoC architectures demand many trade-offs in order to meet some specific performance requirements, which results in various design issues.

One of these major design concerns is the reliability of 3D NoC which is the goal of this research. The reliability issue in 3D NoC is briefly described in subsection 2 and further discussed in Chapter 4.

1.2 Reliability of 3D NoC

To design a robust computing circuit has been considered for many years ago. Recently it has received a great deal of attention as the CMOS technology approaches the nanoscale level. Shrinking transistor sizes, smaller interconnect features, 3D packaging issues, and higher frequencies of CMOS circuits lead to higher error rates and more thermal and timing violations. Many approaches have been proposed to enhance the robustness of NoCs, mostly in the areas of routing algorithms, communication infrastructure, or microarchitecture designs. Many fault-tolerant routing algorithms have been proposed for both 2D and 3D NoC designs. The idea of bypassing faulty data paths within failed routers has been suggested as a lightweight fault-tolerant method. A fault-aware IP-core mapping to NoC routers has been proposed. They address the problem of transient link failures by means of temporally and spatially redundant transmission of messages. A stochastic communication paradigm can provide a fault-tolerant communication. This approach is based on probabilistic broadcast where packets are forwarded randomly to the neighboring nodes. However, none of them protect faulty datapath inside routers. Error correcting schemes can be employed to achieve combined energy minimization and reliability optimization design goals. A fault-tolerant router can guarantee the functionality of NoC in the presence of faults. They detect the most tenuous components of router against different sources of faults first and then tolerate them to save power and area overhead of employing fault-tolerant techniques. An adaptive fault-tolerant NoC router with the power consumption consideration is also possible. They improve error correction capability of their design based on the frequency of fault occurrence. A novel bidirectional fault-tolerant NoC architecture capable of mitigating both static and dynamic channel failures is also proposed.

However, in all of these approaches the dependability of NoC design is improved, regardless of imposing redundancies (hardware, information, and time) or based on reliability analysis reports with general tools. Also, there is no measurement capability to compare the effectiveness of the proposed reliable 3D NoC architectures. In fact, experimental and analytical techniques are two popular methods to explore the dependability of systems. Categorizing the effects of potential faults on the performance of a system is a necessity for both techniques. An analytical model for reliability evaluation of 2D NoC can be presented, but it is not reusable for 3D die-stacking designs in which new sources of faults are presented.

Many major reliability issues are presented by the emergence of 3D structures such as thermal concerns and TSV issues as a result of 3D structures. The unwanted heat generation by PEs in 3D NoC should be removed effectively otherwise it may result in other problems. Three major effects of heat generation are increasing the device temperature, generating thermal stress, more thermomigration as a result of cooling down methods. In addition, TSVs may also cause unwanted noise sources as a result of inductive and capacitive coupling effects. These effects are different from the traditional crosstalk issues due to differences between the physical characteristics of TSVs and 2D wires. They are still active areas of research. Additionally, the generated noise signals by TSVs, may also have undesirable effect on the performance of 2D components such as transistors or 2D wires. A minimum distance between TSVs and these components is required to prevent undesirable effects of TSVs impacting the functionality of the 3D NoC architectures. Furthermore, there are still additional issues for developing 3D architecture EDA tools. Accuracy of simulated environment is a concern for experimental methods in order to analyze dependability of a system. On the other hand, measurements are expensive and time consuming while time-to-market cycle is of great importance.

Consequently, developing general analytical techniques to advance both the intuitive understanding and the quantitative measurement of how potential physical faults influence the behavior of 3D NoC are still lacking although many researches have focused on reliability issues for 3D NoC architectures.

1.3 Contribution of this Research

The goal of this research is to present an accurate reliability analysis tool for 3D NoC platform. The presented reliability analysis tool in this disclosure is called Three-Dimensional NoC Reliability Evaluation Automated Tool (TREAT). TREAT is able to analyze effects of static and dynamic faults in 3D NoC architectures. This tool can be applied investigating the capability of proposed fault-tolerant 3D NoC approaches at the early stage of the design, which saves both time and cost of design. The major stages are:

Discovering the source of physical faults in 3D NoC and categorizing them based on their possible effect on the functionality and performance of the 3D NoC. In more details, all possible potential sources of physical faults in 3D NoC environment have been studied. The impacts of all potential physical faults on 3D NoC components are also addressed to be used for reliability metrics in TREAT. All main components of a 3D NoC router architecture and sensitive entities with their possible responses to physical faults are categorized in this disclosure.

Designing and developing an HDL environment of 3D NoC router as a platform of running the experiments, called Three-Dimensional HDL Emulator NoC (THENoC). As a side project an optimized on-chip routing algorithm is also proposed which takes advantages of both source routing and distributed routing algorithms for 2D NoC and scalable to 3D NoC designs. This method eliminates the heavy routing process of intermediate routers for each packet from source toward its destination by imposing a light overhead independent from the network size.

Modeling the logic-level of all possible physical faults in 3D NoC router and defining the property of injected faults dynamically by profiling the status of different components. These logic-level faults are modeled and applied as fault libraries in TREAT. By comparing the value of selected signals and their assertion time in 3D NoC components after running both faulty and faultless experiments the vulnerability of each component is reported. The effect of psychical fault models which are discussed in Chapter 4 are used as evaluation metrics in TREAT.

Automating the fault injection and reliability evaluation processes and verifying its functionality with THENoC. It is capable of implementing static fault injection based on the provided information by the user or to accomplish dynamic fault injection process based on the analyzed feedback from the simulator. For static fault injection process this experiment is repeated as many times as the user defines for various fault activation time and periods, while a single experiment is needed for dynamic fault modelings.

1.5 Similar Tools

Fault injection is one of the popular method of reliability analysis which is addressed in Chapter 2. The impacts of faults have been evaluated by several research groups for various design objectives. Different methods are proposed with the goal of fault injection based on the analysis such as software fault injection, simulation fault injection and physical level fault injection.

Physical-based fault injection involves augmenting the system under analysis with specially designed test hardware to allow for the injection of faults into the system and examine their effects. Although the experimental process in this method is fast, but the experimental set up is time consuming. In addition, this method needs the actual hardware in order to run the fault injection process, resulting in a costly method. Software-based fault injection includes the modification of the running software on the system under analysis in order to modify the system state according to the programmer's modeling view of the system. This is popular for cases that have communicative or cooperative functions so that there is enough interaction to make fault injection useful. Comparing to physical-based fault models they do not need the actual model of the system, but they have some limitation in terms of fault injection coverage and observability. Finally, simulation-based fault injection method requires an accurate model of the system under analysis. The accuracy of the model and simulation time, are major concerns for these approaches, but they have full control of fault injection and fault modeling. This approach is not expensive either, since it does not need the actual hardware of the design. Because TREAT is a simulation-based fault injector tool, various simulation-based fault injector tools are introduced to show they are not appropriate for 3D NoC reliability analysis objective.

MEFISTO-C: is a VHDL-based fault injection tool developed at Chalmers University of Technology, Sweden that conducts fault injection experiments using VHDL simulation models. The tool is an improved version of the MEFISTO which was developed jointly by LAAS-CNRS and Chalmers. Also a similar tool called MEFISTO-L has been developed at LAAS-CNRS. MEFISTO-C uses the vantage optimum VHDL simulator and injects faults via simulator commands in variables and signals defined in the VHDL model. It offers the user a variety of predefined fault models as well as other features to set-up and automatically conducts fault injection campaigns on a network of UNIX workstations. This tool generates modified components descriptions called mutants. The mutants generation is based on a static information and the model has to be recompiled for each experiment.

VHDL-based Evaluation of Reliability by Injection Faults Efficiently (VERIFY): is developed at University of Erlangen-Nurnberg, Germany. VERIFY uses an extension of VHDL for describing faults correlated to a component, enabling hardware manufacturers, which provide the design libraries, to express their knowledge of the fault behavior of their components. Multi-threaded fault injection which utilizes checkpoints and comparison with a golden run is used for faster simulation of faulty runs. The proposed extension to the VHDL language requires modification of the VHDL language itself. VERIFY uses an integrated fault model, the dependability evaluation is very close to that of the actual hardware.

HEARTLESS: is a hierarchical register-transfer-level fault-simulator for permanent and transient faults that was developed, by CE Group-BTU Cottbus in Germany, to simulate the fault behavior of complex sequential designs such as processor cores. Furthermore, it serves for the validation of online test units of embedded processors. It can support permanent stuck-at faults, transient bit flip and delay faults. HEARTLESS was developed in ANSI C++. The whole design or parts (macros) can be selected for fault simulation based on fault list generation. Fault list is reduced according to special rules derived from logic level structures and signal traces. HEARTLESS can be enhanced by utilizing macros described in a C-function.

GSTF: is another VHDL-based fault injection tool developed by Fault Tolerance Systems Group at the Polytechnic University of Valencia, Spain. This tool is presented as an automatic and modeling dependent fault injection tool for use on an IBM-PC or compatible system to inject faults into VHDL models (at gate, register and chip level). The tool has been incorporated into a commercial VHDL simulator (V-System by Model Technology) and can implement the main injection techniques: Simulator commands, saboteurs and mutants. Both transient and permanent faults, of a wide range of types, can be injected into medium-complexity models. The tool can inject a wide range of fault models, surpassing the classical models of stuck-at and bit-flip and it is able to analyze the results obtained from the injection campaigns, in order to study the error syndrome of the system model and/or validate its fault-tolerance mechanisms.

Fault Tolerance Injection (FTI): is developed at Universidad Carlos III de Madrid in Spain, for fault-tolerant digital ICs in the RT abstraction level. The main objective of FTI is to generate a fault-tolerant VHDL design description. Designer provides an original VHDL description and some guidelines about the type of fault-tolerant techniques to be used and their location in the design. FTI tool processes original VHDL descriptions by automatic insertion of hardware and information redundancy. Therefore, a unified format to deal with descriptions is needed. There are several intermediate formats that represent, by means of a database, the VHDL description in a formal way that could be accessed and processed with some procedural interface. Fault-tolerant components to be included into VHDL original descriptions have already been described and stored in a special library called FT library. These components come from previous researches about FT and designer just use them. FTI use an intermediate format for VHDL descriptions (FTL/TAURI) and it will work only with synthesizable descriptions IEEE 1076.

Many other fault injector tools have been presented for various design objectives by research groups in addition to the famous ones which are listed in this section. However, none of the existing tools are efficiently reusable for 3D NoC platforms, since 3D NoCs are susceptible to different fault sources that are not fully addressed by existing tools like 3D design issues. Furthermore, components and behavior of a 3D NoC is different from other computational platforms. ARROW is the only fault injector tool for NoC platform, which only supports 2D NoC design and it does not provide any reliability analysis. TREAT is specifically developed for 3D NoC platforms and it is not a general fault injector tool. Additionally, one of the most advantages of TREAT is its capability of intelligent fault injection by monitoring the status of the NoC platform (dynamic faults), while most of existing fault injector tools inject faults randomly. This is critical since based on our experiments; random fault injection may result in 26%-99% inaccuracy of reliability evaluation process. The presented tool is capable of evaluating the Verilog model of 3D NoC architecture or fault-tolerant techniques. TREAT includes the following features which none of the mentioned tools offer them all in one package:

Automatic fault-injection
Rich set of fault models
Designed specifically for NoC
Single and multi-bit fault activation
Dynamic and static fault models
3D IC-specific fault models
NoC specific reliability analysis and reporting 1.5 Outline The rest of this disclosure is organized as follows: Chapter 2 discovers the basic terminologies in fault-tolerant and fault evaluation communities which are used in other chapters. The basic components for a general fault injector tool are also discussed in this chapter. The 3D NoC architecture is explained in detail in Chapter 3, which is needed to recognize the major causes of fault occurrence and their effects on a 3D NoC design. The presented 3D NoC architecture in Chapter 3 is also applied in this disclosure to as a platform to run the experiments. The reliability challenges in 3D NoC interconnection are uncovered in Chapter 4, with their logic-level fault models. The effects of each of presented physical fault on the functionality of 3D NoC design are also discussed in this chapter. The framework of TREAT is introduced in Chapter 5. The experimental results of both static and dynamic fault injection processes are also presented in Chapter 6 to verify the capability of TREAT. Finally, Chapter 8 concludes the disclosure and discusses the potential directions for future work of this research.

CHAPTER 2: DEPENDABILITY THREATS AND MEANS

To guarantee the correctness of computing and communication services of many-core systems, has always been a major challenge for both designers and end users. Designers need to develop more complex architectures which are capable of providing the expected services even in a faulty environment with limited energy consumption and area overhead. On the user's side, adding the dependability and fault tolerance features to electronic devices convey higher market prices. As an example, the price of the DDR memory slots with ECC (Error Correction Code) functionality is almost double the price of elemental components. In general, dependability is defined as the ability to deliver service that can justifiably be trusted.

A systematic exposition of the concepts of dependability consists of three parts: the threats to, the attributes of, and the means by which dependability is attained. There are many well-known attributes for dependability such as: reliability, availability, safety, security, survivability, maintainability, and other well known attributes. As discussed in Chapter 1, the goal of this disclosure is to provide a reliability analysis tool for 3D NoC environments which is considered one of the major attributes of the system dependability. The dependability threats and means terminologies in addition to the concept of fault injection which are all needed for discussions of the following chapters are addressed in this chapter.

2.1 Dependability Threats

A system may not always perform as it is expected to, because of environmental conditions or internal faults. Higher temperature or voltage, neutrons and alpha particles, interconnect noises, electromagnetic interferences, and electrostatic discharge are some examples of undesirable environmental conditions for on-chip circuits. Each of these environmental conditions may result in an internal fault and consequently causes other unexpected behavior in the system. In general, causes and consequences of deviations from the promised functionality of a system are known as dependability threats including: fault, error, and failure. Each of these terminologies is individually discussed in the following subsections:

2.1.1 Fault

Fault is a physical defect, imperfection, or flaw that occurs within some hardware or software component. A delay in an electronic circuit or missing the priority of operators in a math equation in a software program are some examples of faults.

A fault is classified into two major categories which are called active and dormant ones. A fault is active when it ends in an error, otherwise it is dormant. An active fault is either an internal or external fault. An internal fault was actually a dormant fault which has been triggered by the computation process or environmental conditions.

An active fault may again become dormant, awaiting a new trigger. Most of internal faults switch repeatedly between their dormant and active states. As an example assume there is a memory cell with a predefined operational temperature. If the environmental temperature has changed for an unexpected reason the memory cell will be infected by the thermal fault. This is an example of external fault in which a dormant fault is converted to an active one. Also as an example of internal fault assume a single bit is infected by a fault before it is accessed. In this case the infected single data bit represents as a dormant fault until it is approached. Once this data bit is read, it becomes an active fault. In case of write access, the infected fault bit is called to be overwritten before causing an error.

In other words, faults can also be categorized based on their temporal persistence known as: transient, permanent, or intermittent. A transient fault has an active status for a limited time and never gets activated again till the end of system's simulation. However, a permanent fault exists in the system till the end of system's life time. In addition, many of the faults switch between their dormant and active states which are called intermittent faults. But their activation time and intervals' length are not necessarily the same.

2.1.2 Error

An error is defined as a deviation from accuracy or correctness which is the manifestation of a fault. To miss capturing the serial data bits by a memory cell because of delay fault or to generate an unexpected value as a result of missing the priority of operators are both error examples.

Similar to faults, an error can be categorized into two types which are: detected or latent errors. With applying error detection techniques; an error is called a latent one, as long as it has not been recognized, otherwise it remains as latent error in the system. As an example an error in a single memory bit of the cache entry caused by positive charge and kinetic energy of alpha particles, known as Single Event Upset (SEU) fault, can be either latent or detected. If the ECC decoder unit of the cache entry has recognized the result of SEU fault, it is detected; otherwise it keeps its latent status. In addition, a latent error may disappear or be overwritten before it is detected. But, most often many of the errors are propagated and consequently generate more errors or pass through the system which result in single or more failures.

2.1.3 Failure

A failure is the non-performance of some action that is due or expected. Such as packet loss in data transmission because of missing correct data capturing or missing a software event as a result of regenerating unexpected values are examples of failures. A component failure causes a fault for the system which it belongs to or the other components which are interacting with.

Figure 2A:
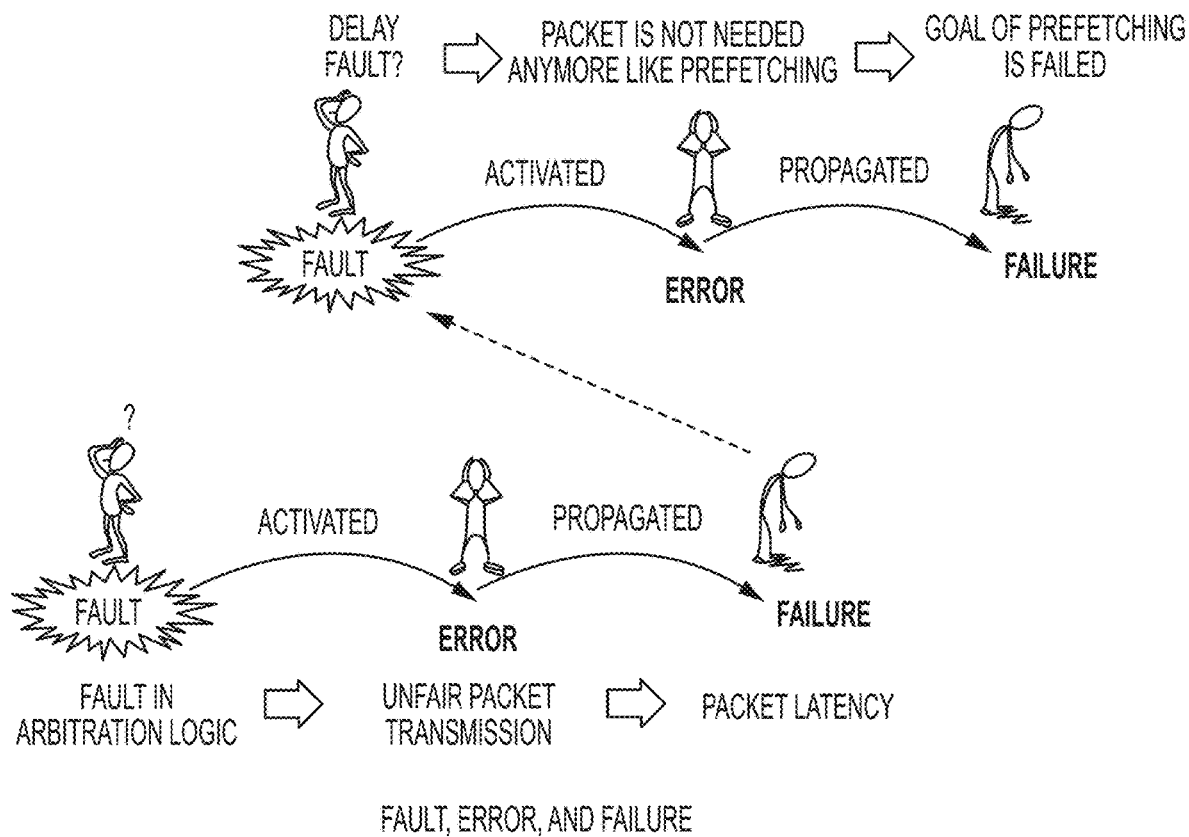
FIG. 2A summarizes the relation between faults, errors, and failures.

FIG. 2A summarizes the relation between faults, errors, and failures. This figure also includes an example for each transition from a component's fault to failure which results in another component's fault and consequently a system failure. To illustrate this example assume there is a many-core system in which instructions are supposed to be prefetched from the memory, while the memory and cores are connected to each other through a network. If a fault in arbitration component of routing unit is activated; it will generate an unfair packet transmission through the system which consequently results in a packet latency failure. In a normal condition the maximum delay for each packet including instructions is predictable if the arbitration component works correctly, otherwise the packet will be captured with an unknown latency. This failure can be considered as a kind of delay latency in the receiver side which is supposed to perform the prefetching operation. The activation of the delay fault results in an error in which the packet is not needed anymore. This error results in a system failure in the prefetching process. This example is a typical case especially in modern GPUs that are composed of many-core and memory units in which the prefetching technique has been proposed in order to increase the performance.

In addition to dependability threats, the means of dependability are also discussed in the next subsection to classify the types of methods discussed with the goal of resolving the unexpected behavior of faulty electronic circuits.

2.2 Dependability Means

Figure 2B:
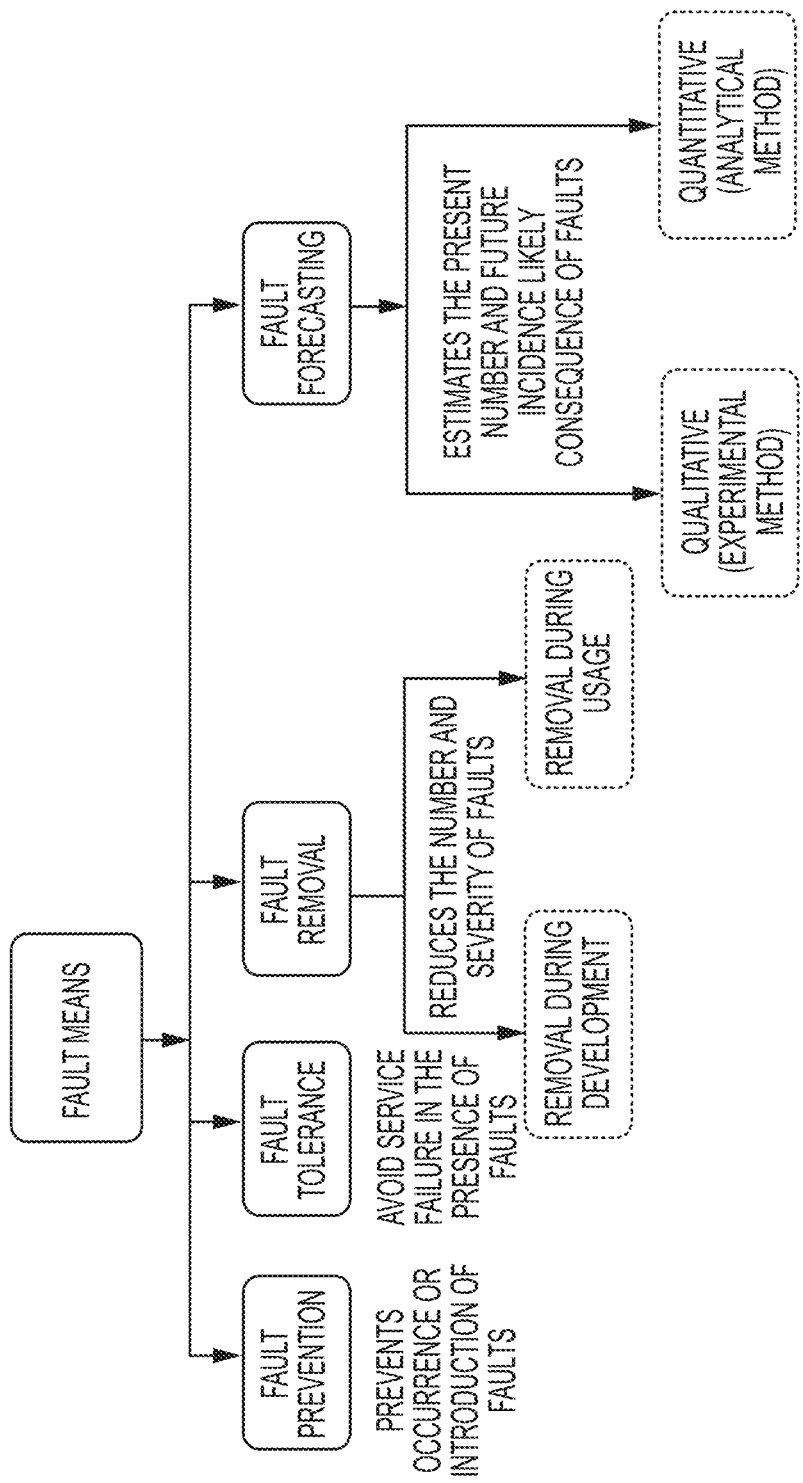
FIG. 2B summarizes these approaches which are discussed individually in the following subsections; through they are not independent from each other.

Dependability means can be grouped into four major classes to attain the expected level of dependability attributes. These categories are: fault prevention, fault tolerance, fault removal, and fault forecasting. FIG. 2B summarizes these approaches which are discussed individually in the following subsections; through they are not independent from each other.

2.2.1 Fault Prevention

It includes all the methods which prevent the occurrence or introduction of faults. In more details, any hardware (such as hardware shielding and radiation hardening) or software activities (such as information hiding and modularized programming) at design time with the goal of protecting the system from different sorts of fault occurrence is known as fault prevention. However, if the applied method is not resilient enough to prevent the fault occurrence, they cannot resolve the issue.

2.2.2 Fault Tolerance

These methods are proposed to protect the system in the presence of active faults to deliver its correct service. In higher level of abstraction fault-tolerant approaches intend to remove the errors from the system (known as error processing techniques) or to prevent the transition of dormant faults to be active ones (by applying fault handling methods). These two methods are discussed separately in the following paragraphs:

Error Processing

The error processing technique can be implemented by either of applying error recovery or error compensation approaches. For the error recovery approach, the erroneous state is replaced by an error-free state, while for the error compensation technique the integrated redundancies guarantee the delivery of error-free service. The error detection method is a critical step in error recovery approaches, for recognizing the erroneous state, resulting in the notion of self-checking component. The error recovery process is implemented in two different formats which are: backward recovery or forward recovery. For the backward recovery there is a transition from the current state to the state prior to error occurrence. As expected this method cannot resolve the permanent faults. On the other hand, for the forward recovery there is a transition from the current erroneous state to a new state from which the system can operate correctly.

In error compensation approach, the self-checking component is still needed. In this method the execution of non-failed component is delivered to present the correct service, if the error is detected by the self-checking component. In more details, when error compensation is performed in a system, composed of self-checking components partitioned into classes executing the same tasks, there is simple switching within a class from a failed component to non-failed one. Additionally, error recovery approach imposes larger time overhead but less hardware or information redundancy as compared to the error compensation method.

Fault Handling

Fault handling is the other well-known technique proposed for a fault-tolerant design by preventing the located faults to be activated again. Fault handing is accomplished in four stages:
1. to locate and recognize the cause(s) of errors.
2. to prevent faults to be activated again which can be done by isolating the faulty identified components from the system.
3. to reconfigurable the system if it is not able to deliver the system without the faulty isolated component.
4. to reinitialize the system by checking and updating the new configuration of the system.

To select either of error processing and fault handling techniques and their implementation depends on the system requirement, overhead budget, and underlying fault assumption. It is critical that the fault-tolerant mechanisms are resilient enough against the faults that can affect them. Additionally, for any given fault-tolerant method, the fault hypothesis and the fault coverage are two major properties which should be considered by the designer. The fault hypothesis represents the types of faults which the proposed technique should tolerate and the fault coverage shows the probability that the fault hypothesis is respected when a fault actually occurs in the system.

2.2.3 Fault Removal

This method can be applied both during the development phase or operational system's lifetime. During the development phase fault removal is done in three stages including: verification, diagnosis, and correction. In the verification stage it is checked to investigate if the system fulfills the given properties, which are described as verification conditions. If it does not, the other two steps follow: diagnosing the fault(s) that prevented the verification conditions, and then performing the required alteration. An important aspect of this technique during development stage is the verification of fault tolerance mechanisms. Verifying the capability of the proposed fault-tolerant methods is critical. Fault removal during the operational phase of a system's life is either corrective or preventive maintenance. The corrective methods remove the reported faults ended in error(s), while protective approaches recognize and remove faults before they cause an error.

2.2.4 Fault Forecasting

Fault forecasting is a method to evaluate the system behavior against the fault occurrence or activation. It can be accomplished in two different techniques: quantitative (formal) evaluation and qualitative (experimental) one. For quantitative method, the whole system is modeled by probabilistic equations. In this approach the malfunctioning probability of the modeled components are reported as measures of dependability. This method is fast but complex especially as the size of system grows, but the system is simulated and its behavior is evaluated in the presence of faults by running large number of experiments. This method is not as fast as formal methods, but it has more controllability over more parts of the system. Fault injection technique is a typical example of this method. Fault injection can also take place in the verification stage of the fault removal method.

All of the four dependability means are somehow related to each other and in some cases they have some overlaps. However, a typical question is that which of them guarantees to deliver a dependable system. In most cases, the expected dependability is not achieved by using any of them, separately. Different fault-tolerant techniques have been introduced by researchers, but it would be more cost effective to employ them if the resiliency of the target device against different sources of fault is available. This knowledge can be achieved by applying fault forecasting methods in order to address the vulnerable components of the system. With this strategy the expected dependability is met while redundancies cost is kept low. In practice, fault removal and fault forecasting methods are followed by each other. In other words, after rejecting a system by the fault forecasting, several fault removal tests are applied. These new tests provide actions that can help the designer to improve the system. This loop is repeated until reaching the desirable design. The main goal of this disclosure is to present a fault forecasting technique for 3D NoC environment. To reach this goal fault injection technique is used which is briefly in the following Section.

2.3 Fault Injection

Fault injection is a process in which responses of the system are analyzed to verify the behavior of the designed system in the presence of predefined faults. This is a popular approach in reliability evaluation of computing and communication systems such as processors, micro-controllers, and interconnections. In this method faults are injected into the system states and points, that were previously determined by an initial system analysis. There are two major types of fault injection: hardware-based and simulation-based. In the hardware-based method the actual component is examined by triggering some faults through the system and determining their effects. This method is expensive and usually is considered at the final stage of mass production. Moreover, the model of system is evaluated in the simulation-based approach to study the behavior of it against the fault models. This method is much cheaper than hardware-based evaluation and it is considered at the beginning stages of design, but the simulation-based method takes longer time than the hardware-based one. In addition, the other concern of simulation-based method is the accuracy of the model of the target system, which can be verified by running different kinds of applications.

Fault injection is often the only choice when the complexity of a target system precludes analytical solutions for reliability analysis. It facilitates fault removal and fault forecasting methods, resulting in the following benefits:

Understanding the effects of real faults on the system either internal or external ones. A fault-tolerant designer is able to focus on the most vulnerable components rather devising a general tolerant approach. This capability results in reliable coarse-grained components designs and consequently more cost-efficient fault-tolerant systems.

Efficiency assessment of fault-tolerant mechanisms embedded in the target system. This method is also able to compare the resiliency of proposed fault-tolerant method in the presence of different sorts of faults.

Forecasting the faulty behavior of the target system, in particular developing a measurement of the coverage provided by the fault-tolerant mechanisms.

Estimating the failure coverage and latency of fault-tolerant mechanism.

Figure 2C:
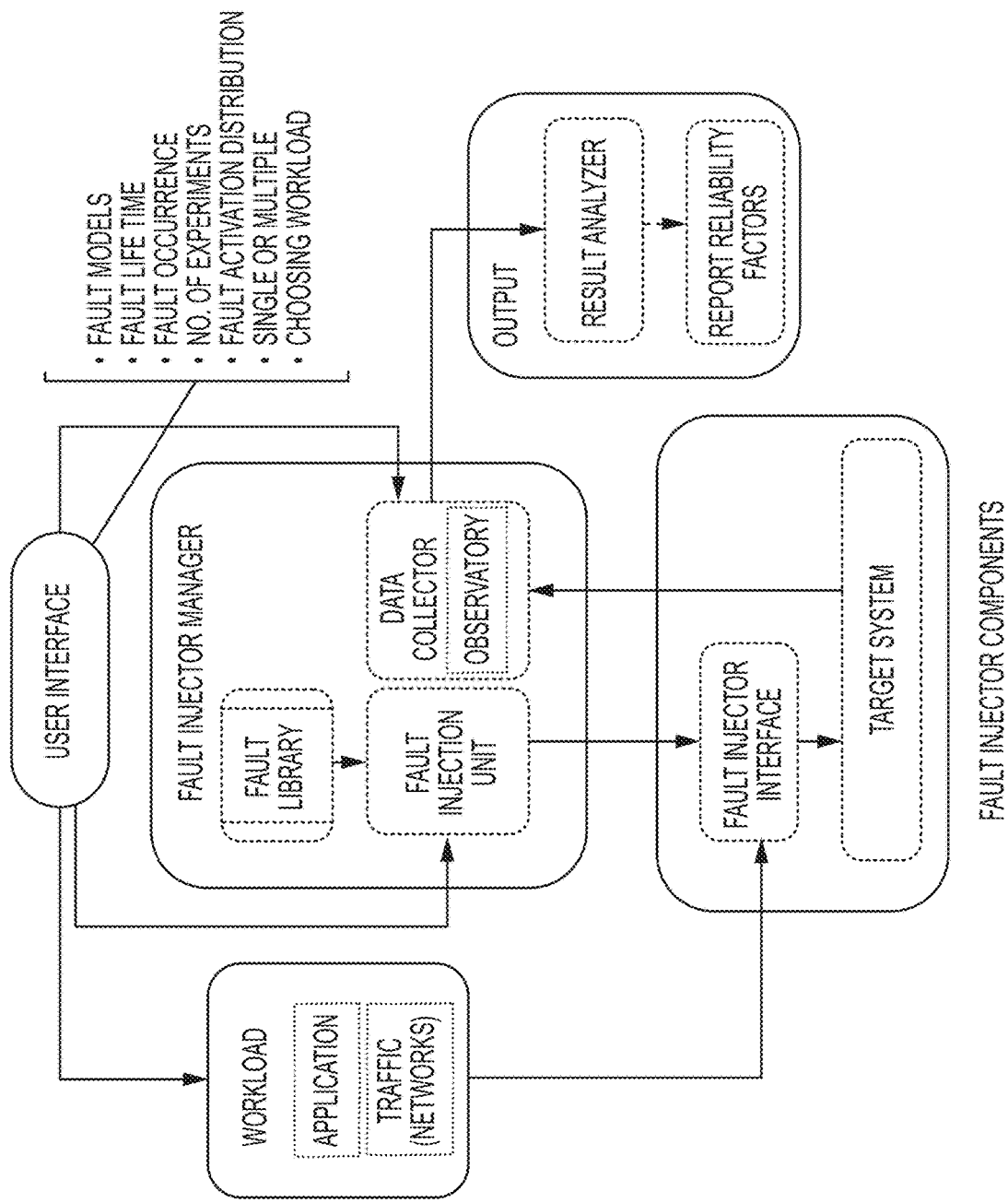
FIG. 2C illustrates the typical modules in a fault injection tool with their interactions which is composed of five main components: user interface, workload, fault injector manager, target system, and output.

Several efforts have been made to develop techniques for injecting faults into a system prototype or model as introduced in Chapter 1. FIG. 2C, represents the typical modules in a fault injection tool with their interactions which is composed of five main components: user interface, workload, fault injector manager, target system, and output.

The user interact with the fault injector tool by the help of the user interface unit. Some examples of definitions which should be defined by the user are shown in FIG. 2C, such as type, number, and activation time of faults.

The workload component is composed of benchmarks which are supposed to be run on the target system while examining its behavior against injected fault models. The workload component may include either of synthetic or real applications or even both of them. In some cases an interface between this component and target system is needed to translate the generated raw data by the applications for the target system.

The fault injector manager is the heart of fault injector tool which is responsible for activating the fault models which are predefined by the tool designer and accessible by the fault injection unit. In other words, fault libraries are some fault models which will be injected to different components of the target system based on the user preference. The fault injection sub-component is responsible to activate each of the injected faults into the system. The injected faults are the dormant faults and once they are triggered by the fault injector tool, they will be treated as active faults. The observatory list is another sub-component of the fault injector manager in which a list of comparison signals are stored. The fault injector tools compare the values of the observatory list signals after running each faulty run by golden run. A faulty run is the execution of the workload once at least one of the injected faults is activated, while the golden run refers to the execution of the workload over the target system when all of the injected faults are in their dormant state.

The fourth major component is the target system, which is actually the model of system that should be studied. The fault injector interface verifies the injected fault models are syntax error free in the language in which target system is modeled. In case of evaluating the proposed dependability means such as fault-tolerant or fault removal methods, this component should be integrated with the proposed technique.

Finally, the result of golden run and fault run comparison is reported by the output component, which are considered as an evaluation metrics to compare the reliability of the target system in presence of different sorts of faults.

CHAPTER 3: THE 3D NOC ARCHITECTURE

As discussed in Chapter 1, NoC is the dominant communication infrastructure for many-core systems with thousands of cores. The NoC offers higher flexibility and modularity, supporting simpler interconnection models with higher bandwidth as compared to traditional SoC approaches. In addition, the advent of 3D integration results in considerably shorter interconnects wires in the vertical direction. The 3D integration supports new opportunities by providing feasible and cost effective approaches for developing heterogeneous cores to realize future computing systems. Additionally, the 3D structure supports heterogeneous stacking because different types of components can be fabricated separately, and silicon layers can be implemented with different technologies. Furthermore, vertical integration technologies are particularly compatible with the traditional CMOS IC design process; they can be easily integrated into the state of art designs. These capabilities are inherent to 3D NoCs, and have been introduced as a promising scalable and energy-efficient communication method for modern ICs with high performance.

In general, a 3D NoC is composed of three major components including: links, routers, and Network Interface (NI). The links physically connect all the cores to perform the communication process. There are two different types of links in 3D NoC which are: inter-die connections and intra-die connections. The former one connects routers in different layers, while the latter one relates to communication links among NoC routers located in the same layer. The communication links inside the NoC router also belong to intra-die interconnections category. The router is responsible to run the communication protocols in order to accomplish the data transmission process among the connected cores. In other words, the router receives data packets from the shared links and based on their destination address, forwards them to the local connected core or to the corresponding neighbor router. In the latter case, the router is called an intermediate router. The routers' protocols should support deadlock and livelock free routing algorithms, fair data transmission by applying arbitration unit, and performing an efficient switching methods. Finally, the NI is an interface between IP cores and network, since the processed data format of each IP does not necessarily match the data transmission format and network protocols. Before discussing the architecture of the 3D NoC which is developed as a part of this disclosure, some basic definitions are discussed first in the following subsections.

3.1 Basic Definitions

This section covers brief definitions for some of the well-known terminologies in the NoC environment, including: flit and phit, flow control, routing algorithm, and topology. These terminologies are refereed to in the rest of this disclosure.

3.1.1 Flit and Physical Unit (Phit)

An injected message into the network by the local connected IP, is first segmented into packets by the NI component, which are then divided into fixed-length flits. Flits are the unit of data transmission flow control in the most popular NoC routers. In other words, a flit is defined at the link level representing atomic units that form packets. There are typically three types of flits: header flits, data flits, and tail flits. Header flits contain the routing information for the whole packet and show the presence of a new packet. Data flits include the actual data bits which are supposed to be transferred among the cores. Finally, tail flits show the end of packets. Routers release the dedicated resources once the tail flit reception is confirmed by the local IP or neighbor router that the packets are forwarded to.

But, for some designs a smaller unit of data transmission is applied which is called a phit. In general, a flit may be composed of several phits in applications with highly serialized links. But, in many research articles, a flit size is the same as a phit size, which is the smallest unit of data transmission. In these cases, the characteristics of different components in an NoC architecture such as the buffer size and intra-die links' bandwidth, are reported in terms of flits. In addition, flits are also used as the performance evaluation metric units such as the number of transmitted flits per second or the power consumption for each flit transmission. In the rest of this disclosure the unit of data transmission is assumed to be a flit (or it is assumed a flit is composed of a single phit).

3.1.2 Flow Control

Flow control is the mechanism which decides network resource allocation, such as channel bandwidth and buffer capacity for each packet. A good flow control protocol minimizes the average of packet transmission latency. In other words, a typical flow control protocol improves the network throughput rather than the throughput of individual routers. There is a tradeoff between the complexity of flow control implementation and its efficiency. One of the critical factors affecting the efficiency of flow control is to choose a suitable switching technique. Circuit switching, store and forward, cut-through, and wormhole are the popular switching approaches for NoC designs.

In circuit switching technique, the whole path is reserved from the source toward destination for the entire duration of transmission. In this method all the intermediate reserved links will be released once the message has arrived at the destination router and the corresponding acknowledgment is confirmed by the source router. The advantage of this method is that the intermediate routers do not need any buffer unit. On the other hand, this method has a set-up phase which is not efficient especially for short messages. In addition, it violates the benefits of bandwidth sharing; resulting in poor bandwidth utilization.

The other approach is packet-based flow control which has been proposed due to the inefficiency of circuit switching method for NoC applications. The store and forward and cut-through switching methods are some examples of packet-based flow control technique. In packet-based method the message is divided into smaller units called packets; packets are partitioned into smaller units of transmission (flits). In this technique the links are not reserved and each packet can choose a different path to reach the destination. So all the flits of a packet use the same path toward destination like a train, consecutively. Unlike to circuit switching method, the buffer component is needed to store in-flight packets. The only difference between store and forward technique and cut-through switch method is that in the former the whole packet should be received by an intermediate router before being forwarded to the Local IP core or the appropriate neighboring NoC router. This condition is not necessary for transmission of packets with cut-through switching method. Finally, in wormhole switching, which is the most popular one, the flits are allowed to be forwarded before the entire packet is received by the intermediate routers similar to the cut-through method. But, the required buffer size in this method is less than what is needed for the cut-through approach. In other words, the buffer size in the wormhole switching is always less than a packet size unlike the cut-through method.

3.1.3 Routing Algorithm

The routing algorithm includes the process of choosing the appropriate path for a message through the network toward its destination. A good routing algorithm should balance the traffic evenly all over the network in order to prevent congestion through the network and consequently throughput degradation. Also, it should be implemented with as low as possible complexity to not stretch the critical path delay or impose area overhead. The routing algorithms are classified according to different criteria. Depending on how a path is defined, routing algorithms can be classified as deterministic or adaptive methods. The complexity of deterministic algorithm is lower than the adaptive one. In this method, a predefined algorithm is run once the header flit of a packet is received at each node. This method does not consider the status of the network in choosing the path for incoming flits. The adaptive algorithm may choose different paths for individual flits of a packet. This decision is done by keeping track of the network status. The complexity of adaptive routing algorithm implementation increases as more information of the network is needed for routing decision. Furthermore, an adaptive routing algorithm can be considered as a fault-tolerant method in case there is a fault on a packet's path to the destination.

There are two major types of routing algorithms: source routing and distributed routing. In the source routing the whole path for a packet transmission through all the intermediate routers are selected in source router. This routing information should be added to the packet's header flit. On the other hand, for distributed routing algorithm choosing the path for packet transmission is done through the intermediate routers. In the source routing method there is no need for routing decision process through the intermediate nodes, resulting in lower latency and power consumption. The disadvantage of this method is that the size of header flit increases for larger network sizes. The best method to take advantageous of both of these methods is to devise a mixed algorithm which has been done as a part of this research and is discussed thoroughly in Section 3.3.

3.1.4 Topology

Topology is another important factor in designing an NoC, which defines how the routers are connected to each other. This connectivity affects the number of hops for each packet transmission from source toward destination and also the interconnect links; indirectly influencing the power consumption of the whole network. Many different topologies have been proposed inheriting from the traditional semantic network topics, which are evaluated by different metrics such as degree, hop count, maximum channel load, and path diversity. The degree parameter refers to the number of connected links to each router. In some topologies all the routers have the same degrees such as the ring topology, while in some other cases different routers may have different degrees such as the mesh topology. The hop count includes the number of intermediate routers that a packet passes on its way from the source to the destination. The maximum hop count is usually considered as a factor of router and links delay to estimate the maximum latency of flit transmission through the network. But, it may not be an accurate metric in case the network congestion occurs. Maximum channel load factor predicts the maximum bandwidth that a router can support in terms of bits per seconds (bps). The path diversity is the other metric which defines the number of shortest path between a given source and destination pair. The path diversity metrics shows the capability of the topology in supporting load-balancing and fault-tolerant mechanisms.

In general, a network topology is divided into two major categories including: a direct topology and an indirect topology. For direct topology, each IP core is connected to a router. For this type of topology, each router is a source, destination, or an intermediate one. Ring, mesh, tori, and torus are some of the well-known examples for direct topologies. In an indirect topology, routers and IP cores are separated from each other. All the IP cores are source and destination nodes, while routers are all the intermediate nodes. The butterflies, Clos networks, and fat free topologies are some examples of the indirect ones; the direct topologies are more common in on-chip designs because of their ease of fabrication process.

3.2 The 3D NoC Router Architecture

The structure of the 3D NoC architecture is discussed in this subsection. This architecture is designed and developed in Verilog HDL environment, called THENoC, as an experimental platform for this disclosure. It supports wormhole switching, mesh and torus topologies, and employs XYZ routing algorithm in which each router is composed of 7 bidirectional ports. But, it is implemented completely modular and consequentially capable of supporting other specifications with nominal modifications. THENoC is actually a synchronous simulator with the capability of profiling all the communication links during the packet transmission among connected local ports. The asynchronous design of the similar architecture for 2D NoC has been also developed, which is embedded with two synchronous to asynchronous and asynchronous to synchronous wrappers. The synchronous and asynchronous 2D NoC architectures are compared in terms of their power consumption and reliability characteristics.

All the modules of THENoC are also developed synthesizable, for the goal of reporting the real power consumption and critical path delay. THENoC is also able to report different performance metrics to compare the efficiency of any proposed energy-efficient, fault-tolerant, or high performance techniques. It is composed of five main components including the links, an NI, an input buffer, a routing management unit, and a crossbar switch which are discussed individually in the following subsections.

3.2.1 Links

A 3D IC is a chip with multiple tiers of thinned-active 2D ICs that are stacked, bonded, and electrically connected together. As discussed earlier two major types of links in 3D NoC are: inter-die and intra-die links. The inter-die connections are also known as 2D wires, since they connect routers of the same layer together. The inter-die connections inside the router are depicted in detail in following subsections.

On the other hand, there are various vertical interconnect technologies. Wire-bonding and flip-chip stacking have made their ways into mainstream semiconductor manufacturing in recent years, but they are not considered anymore for new generation of 3D integrations. TSVs are currently the most popular vertical-electrical connection forms through silicon or oxide layers since they provide shorter signal paths with superior electrical characteristics in terms of reduced resistive, inductive and capacitive components. Additionally, the TSV technology provides more I/O terminal ports comparing to tradition system in package integration methods. In the wire-bonding for example the I/O ports should be located on the edges of the chip. With this capability of supporting I/O ports in arbitrary locations of the TSV-based 3D chips, they support more number of interconnections with higher levels of flexibility of circuit layout.

A TSV is typically a cylinder composed of the uniform conducting material more often the copper. The TSV is surrounded by silicon dioxide as an insulator to prevent leakage and resistive coupling through the silicon substrate. The TSV interconnections are fabricated in a silicon substrate and their distribution mainly depends on partitioning and placement approaches. However, irregular TSV placement results in a critical fabrication issue which is known as chip warpage. According to the prediction of ITRS, the maximum height of TSV is about 200 µm or less which is the same as thickness of the Si chip. The diameter of vias in TSV is now 20 µm and may reach 5 µm in the future. A copper TSV in standard Si-bulk technology normally will have via diameter of 2 µm-8 µm by 2018, 5 µm by 5 µm contact pads, 4 µm-16 µm via pitch, 0.5 µm oxide thickness ($t_{ox}$), and 20 µm-50 µm layer thickness including substrate and metallization.

Figure 3A:
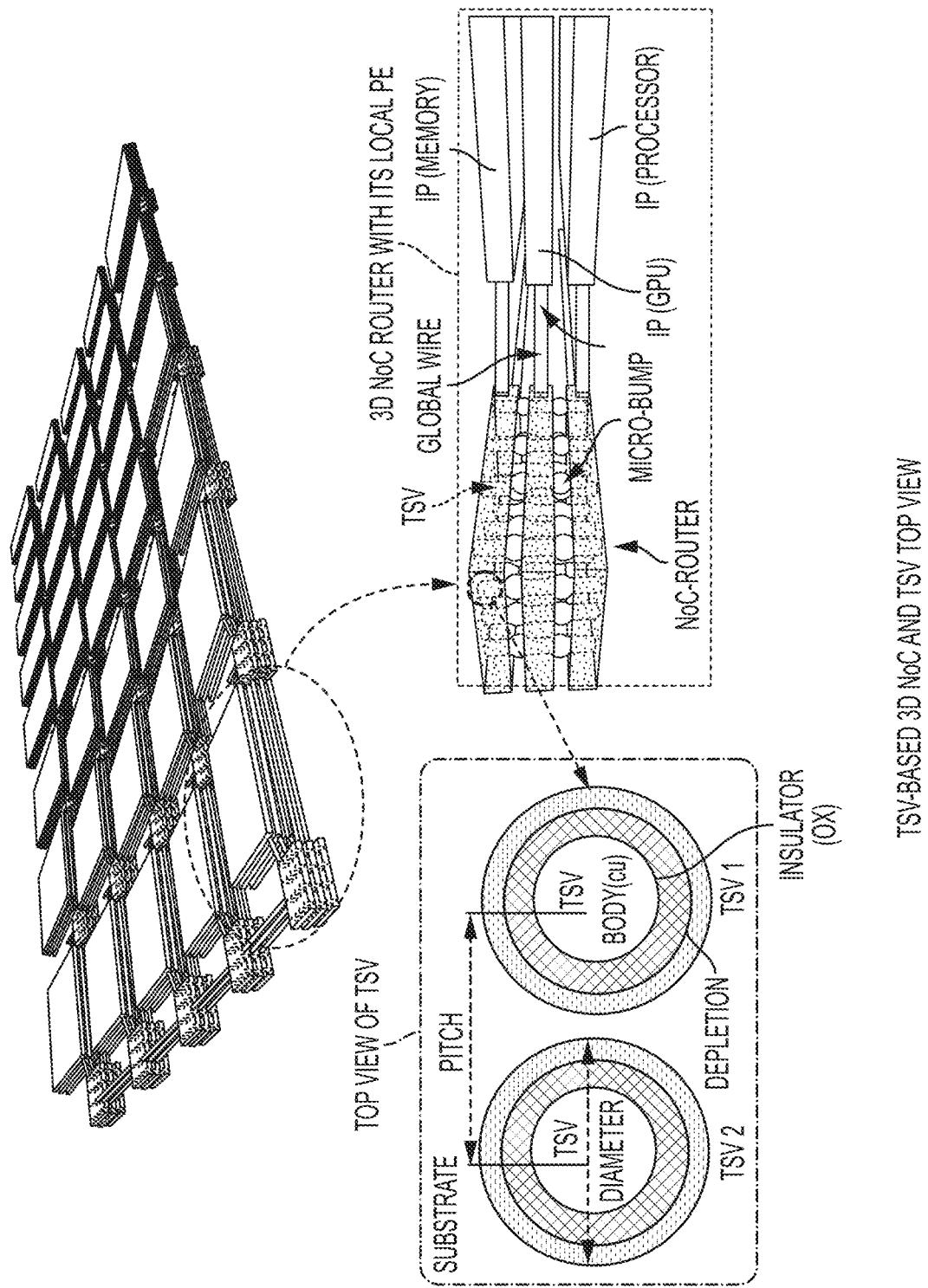
FIG. 3A illustrates a TSV-based 3D NoC structure, in which TSVs are connected to each other with Microbumps.

A TSV-based 3D NoC structure is illustrated in FIG. 3A, in which TSVs are connected to each other with Microbumps as discussed in Chapter 1. This figure is a sample 3D design in which each layer has different types of processing elements, while other designs can be different. It also shows a top view of a TSV which is typically composed of three different layers: depletion, insulator, and conductor (TSV body).

It is critical to note that the TSV fabrication process is independent of the CMOS fabrication technology and TSVs do not scale down with the same pace. TSV diameters and pitches are two to three orders larger than transistor gate lengths.

Additionally, TSVs have different characteristics other than 2D wires, resulting in new challenging designs which are discussed in Chapter 4.

3.2.2 NI

Figure 3B:
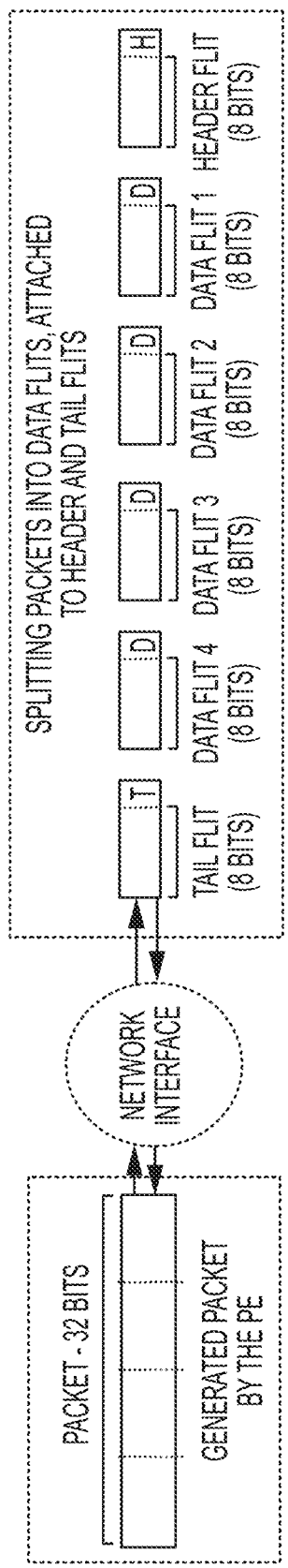
FIG. 3B illustrates the functionality of NI component through an example in which the packet is composed of 32 bits and the size of each flit is 8 bits plus the ID bits.

The NI is responsible for interpreting generated data by the connected PE to each of the NoC routers though the local ports. The functionality of this component has been verified by injecting both realistic and synthetic data traffics. One of the major tasks of the NI is to prepare the transmission units of data, which are flits in this disclosure, by defining some special protocols. These protocols are defined based on the 3D NoC router simulator implementation parameters and flow control attributes such as buffer size, flit size, and switching method. FIG. 3B illustrates the functionality of NI component through an example in which the packet is composed of 32 bits and the size of each flit is 8 bits plus the ID bits. The ID bits are used by the router components to recognize the type of flits while transferring through the network. The NI also generates both header and tail flits, attaching them to the front and end of each packet, respectively. In this disclosure, the NI component of THENoC simulator splits all the messages into 64-flit packets, while each flit is composed of 32 bits. The generated header flit in this component also supports the XYZ routing algorithm which is the default routing method in THENoC. The reverse process is done again in the NI component of each router after capturing the incoming packets through the local port. In this step, the incoming data flits are rearranged into a readable message format for the connected PE to the local port.

Figure 3C:
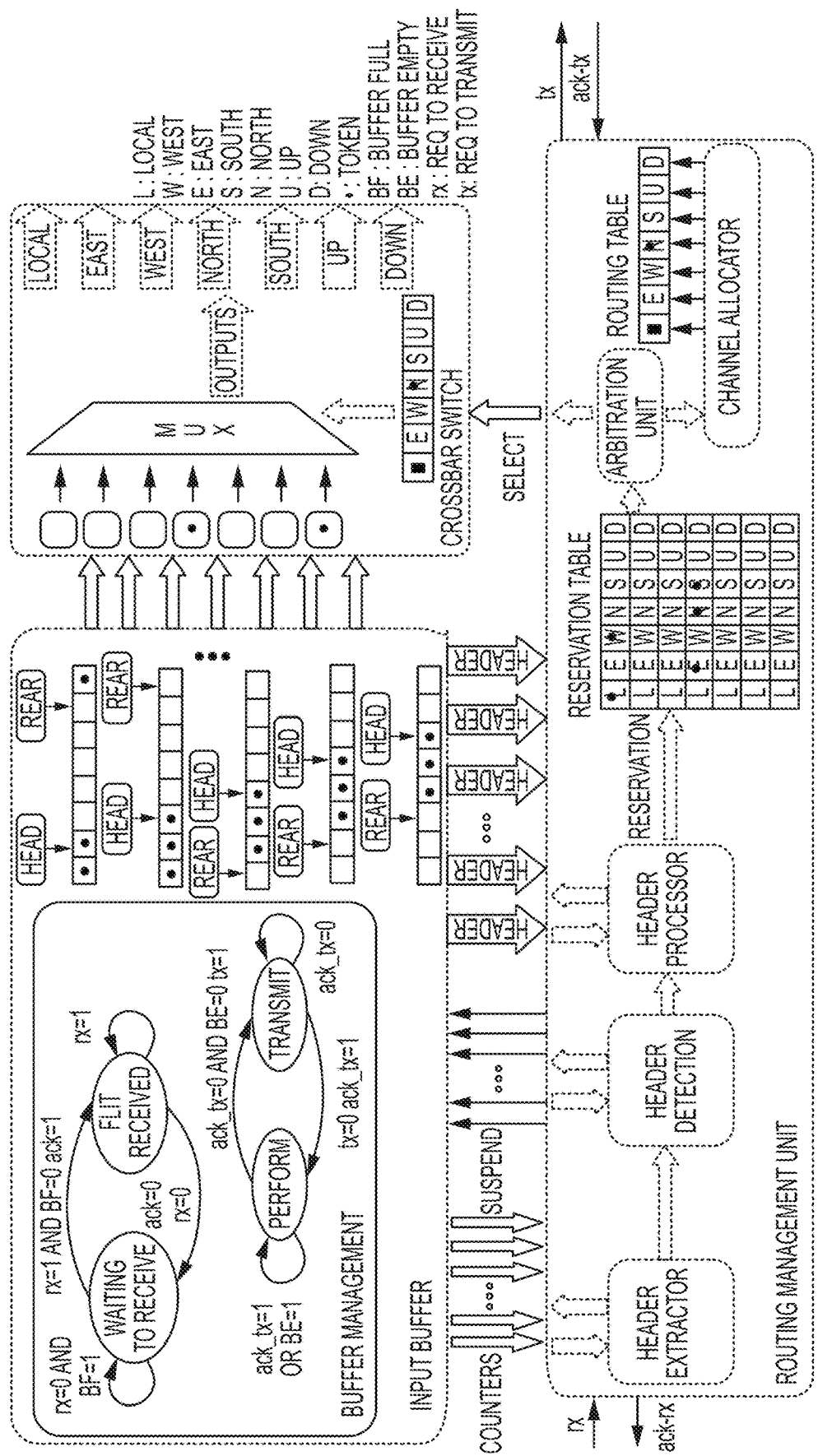
FIG. 3C illustrates these components and their connections (inter-die links).

The major components of router architecture for THENoC including: the input buffer, routing management, and crossbar switch components, are discussed in the following subsections. FIG. 3C illustrates these components and their connections (inter-die links).

3.2.3 Buffer

The buffer component is supposed to store the header, data, or tail flits on the intermediate routers in packet-based switching methods as discussed in Section 3.1.2. THENoC employs the input buffers rather than output buffer as they are more energy-efficient. Furthermore, the size of buffers are less than the packet size in THENoC to support wormhole switching in which the data flits follow the header flit as a chain of flits. In THENoC the input buffers are supposed to store the incoming flits until they are granted with the appropriate output port. These output ports are reserved until the whole flits of the packets reach the destination. Once the tail flits leave any intermediate router the corresponding input buffer port is deallocated and is available to service other requests. The buffer management is composed of two state machines which are designed to handle the read/write process from/to the buffer unit. In other words, this sub-component is in charge of tracking the empty and full spaces inside the buffer in order to preclude replacing the old flits with the new ones, before they are transmitted. The buffer management grants the incoming flits if there is a free space in the buffer unit, otherwise the requested flit waits in the intermediate router's buffer until to get the grant.

In a normal buffer implementation, there is a chance of suspending the buffer component's grants though there is a free space inside the corresponding buffer component. But the input buffer component of THENoC is implemented as a circular queue to address this issue. With this implementation, it is guaranteed that no port request of a flit is stalled if the buffer has an empty space. For this implementation two pointers are needed to keep track of occupied locations in the buffer component as shown in FIG. 3C. In THENoC implementation, the head pointer refers to the head of queue, including the occupied cells of the buffer, and rear pointer refers to the empty location right before the last occupied cell of the same queue. In this approach one cell of the buffer is always reserved which cannot be used for storage usage.

3.2.4 Routing Management Unit

The routing management unit component is the central unit of the router architecture which is composed of four subcomponents including: a header detector, a header extractor, a header processor, and an arbitration unit in addition to a look-up table. All of these units and their interactions are represented in FIG. 3C. An XYZ routing algorithm is implemented in THENoC which can be replaced by other routing algorithms with modifying the routing unit module of THENoC.

The header detection unit distinguishes the header flit from data and tail flits. In THENoC, the buffer component has a counter which counts the total number of received flits for each packet and it resets once the tail flit is read from the input buffer and transferred to the appropriate output port. The header detector component monitors this counter to recognize the header flit as shown in FIG. 3C. The header extractor splits the header flits into different fields and prepares it for header processor component which is responsible to run the routing algorithm. Each of the input channels can reserve one of the output ports when the routing process is accomplished. An arbitration unit locks the dedicated output channel until the end of packet transmission. It also guarantees a fair output channel allocation among input ports. In more details, in case of receiving a request from the new header flit for an already allocated output port channel, the new header flit is stalled and its request is tagged in a priority queue. This priority queue is checked before the upcoming output port channel allocation to the header flit requests. This priority queue in FIG. 3C is shown as the Reservation Table.

The routing unit grants the requested input port and updates the selector signals of the output multiplexers once the routing process is accomplished successfully. Such grant and activation signals are disabled as the tail flit of a packet is transmitted to its desired output port.

3.2.5 Crossbar Switch

The crossbar switch is responsible to connect the active input buffer to their appropriate output ports. As shown in FIG. 3C, the crossbar switch is composed of multiplexers for each of the output ports. The crossbar switch component actually establishes the connection of input buffer to selected output port by reading the routing control signals which are provided by the routing management component. As discussed earlier THENoC implements the wormhole switching, in which all of the flits which follow the header flit, are directed toward destination in a pipeline manner. In other words, the data and tail flits are blocked if their header is impeded on its way towards destination. In this case these flits (data and tail flits) are kept in the intermediate buffers until the header flit is granted the channel resources to start moving toward destination. Once a packet transmission has been confirmed by each intermediate or destination routers, the corresponding switch is unlocked to serve other input channels.

As an additional aspect of this disclosure, an efficient routing algorithm has been proposed which takes the advantages of both source and distributed routing methods, called TagNoC. The TagNoC algorithm and design are discussed in the following section.

3.3 Proposed TagNoC Routing Method

TagNoC is actually a hybrid routing algorithm which takes the advantages of both source routing and distributed routing approaches. In other words, the goal of the proposed TagNoC method is to reduce the intrinsic overhead of conventional source routing and per hop routing decision process in distributed routing methods. Additionally, TagNoC is actually a micro-architectural level method which can be integrated to any deterministic routing algorithms. It inherits the routing-specific characteristics of the target-oriented routing algorithm and supports all turn model routing algorithms such as XY, NF, WF and NL. Since XY routing algorithm is the reference model for most of the NoC related research, in this project XY-based TagNoC coding and corresponding architecture are presented. But, the presented architecture can be simply modified to support any other turn-based routing model. In this approach a header flit is composed of the destination router's coordination in addition to, two extra bits which are called Tag bits. The header flit including the Tag bits values are generated in the NI of the source router. In XY-based TagNoC method, the header flits is first directed horizontally and then vertically toward its destination similar to XY routing. With this methodology there is only one turn for the header flit on its way toward the destination. With this knowledge the source router is able to predict the turn point of the header flit. In this method for each header flit at the turn point, there are three options: turn up, down, or choosing the local port, if the source and destination have the same vertical coordination. These three options are encoded for each header flit and presented by Tag bits as a part of header flit as shown in Table 3.1.

Figure 3D:
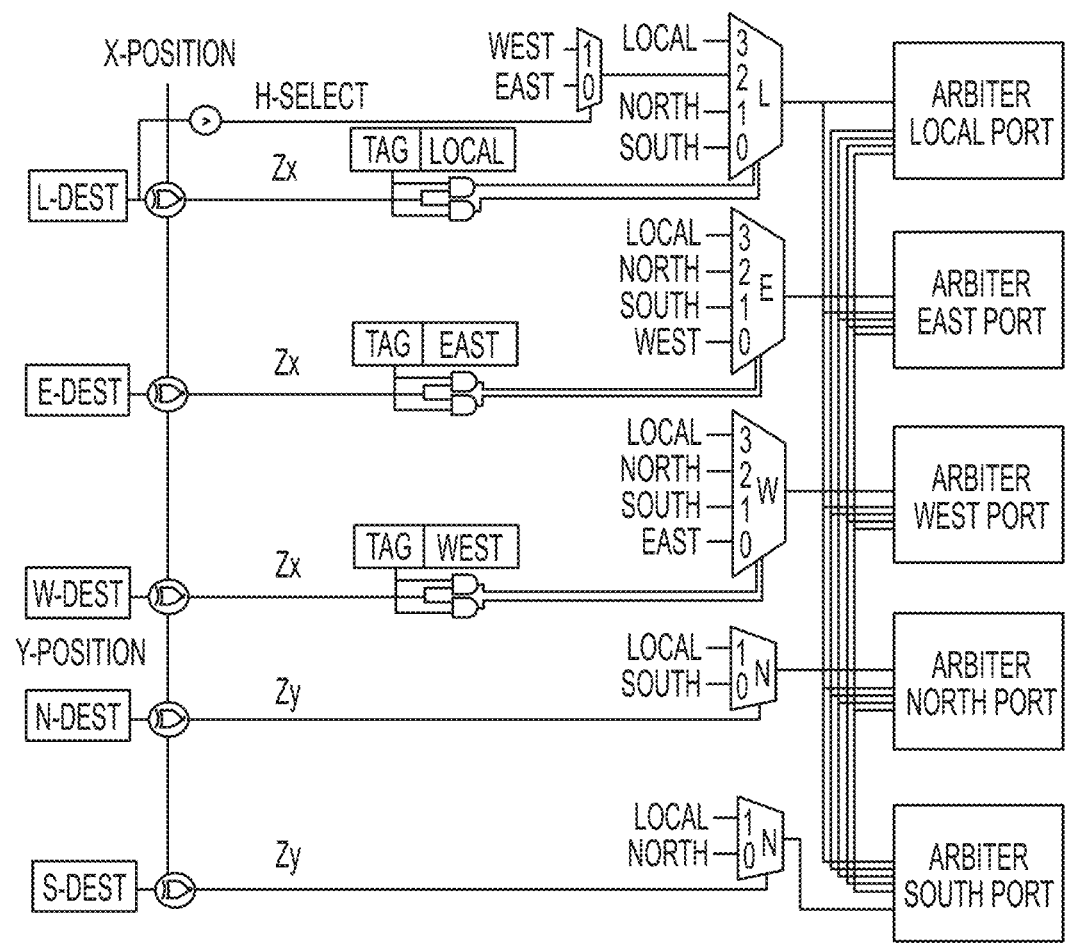
FIG. 3D illustrates the architecture of TagNoC routing approach, in which the output of XNOR gates for both horizontal and vertical dimensions are shown by $Z_x$ and $Z_y$, respectively.

With this technique in all of the routers the destination address is compared with the corresponding coordination of the intermediate routers by employing XNOR gates. The architecture of TagNoC routing approach is presented in FIG. 3D, in which the

TABLE 3.1

| Horizontal direction | | | |
|---|---|---|---|
| $Z_x$ | Tag[1] | Tag[0] | Rotation |
| 0 | x | x | no turn |
| 1 | 0 | 1 | turn up |
| 1 | 1 | 0 | turn down |
| 1 | 1 | 1 | local |

TABLE 3.2

| Vertical direction | | | |
|---|---|---|---|
| $Z_y$ | Tag[1] | Tag[0] | Rotation |
| 0 | x | x | 180° |
| 1 | x | x | 0° | output of XNOR gates for both horizontal and vertical dimensions are shown by $Z_x$ and $Z_y$, respectively. If $Z_x$ is equal to 1 it means the header flit does not have any further horizontal movement toward destination or it has reached its turn point. The Tag bits are evaluated at this point to choose the next movement of the header flit as shown in the fourth column of the Table 3.1. After a header flit has turned the Tag bits are not evaluated anymore as shown in Table 3.2, since the header flit has only two options at this point which can be decided by the $Z_y$ signal.

Figure 3E:
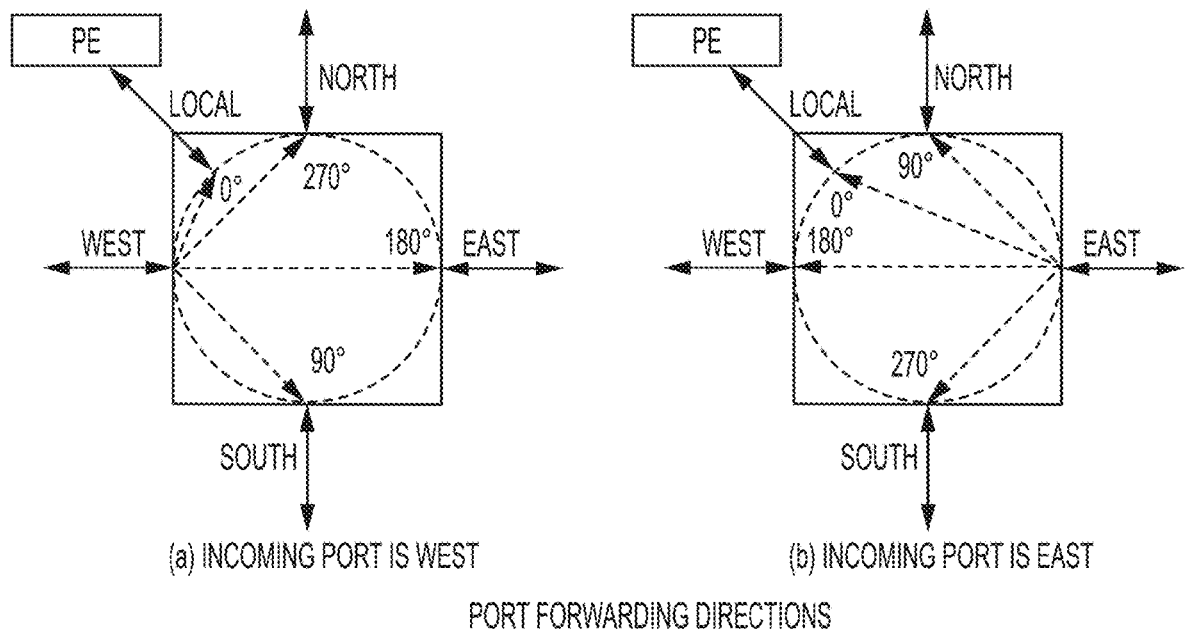
FIG. 3E illustrates that the other output ports are labeled as 90°, 180°, and 270° values in a counter clock wise direction starting from the incoming port.

The proposed TagNoC method is compared with other routing approaches in terms of scalability, performance, and power consumption. These four routing algorithms are: baseline (XY technique), None Encoded Address (NEA), Encoded Address (EA), and Optimized Encoded Address (OEA) routing algorithms. For the NEA method, the header flit contains the coordinates of all intermediate routers from source toward its destination. The elimination of routing decision through the intermediate routers results in less latency and power consumption, at the cost of increasing header flit size. But, NEA is not scalable and imposes a large data overhead. In the EA technique, only two bits are needed to identify the output port for each of the intermediate routers in a 5-port 2D NoC assuming the packet from any of the incoming ports is not directed to the same port. To encode four of output ports dynamically, the output ports are flagged by a turning degree value. Based on the proposed definition, the local port is always labeled by 0°. The other output ports are labeled as 90°, 180°, and 270° values in a counter clock wise direction starting from the incoming port as illustrated in FIG. 3E. In (a) is assumed that incoming port is the west port, while for the incoming header flit from the east port (see (b)), the north, west, and south output ports will be recognized by 90°, 180°, and 270° labels, respectively. With this dynamic labeling output ports, relative to the incoming port, there is no need to use an extra bit for storing the appropriate output port for the EA technique.

The idea of OEA approach is to use the same encoding technique as EA method until the header flit changes its dimension toward the destination. Then the header flit has only two options, choosing the local port or traversing in the same direction. For the OEA routing techniques one bit per hop is employed to navigate the header toward destination, after the header turns to move vertically. This optimization is because of the property of the dimension order routing algorithms in which only one turn is permitted. The comparison of these four approaches with the TagNoC method is discussed in the following subsections.

3.3.1 Scalability

Routing algorithm plays a major role in the degree of scalability for an NoC design. The number of enforced bits in the header flit by a routing algorithm is the limiting factor. The size of header flit influences the flit size which directly impacts the bandwidth of the network. If the size of a flit is large, the limiting factor in wire routing or bandwidth efficiency parameters is not satisfied.

TABLE 3.3

Header size comparison of proposed methods

| Approach | Header size | Header bits |
| --- | --- | --- |
| Baseline | $(\lceil \log_2 X \rceil + \lceil \log_2 Y \rceil)$ | 8 bits |
| NEA | $(\lceil \log_2 X \rceil + \lceil \log_2 Y \rceil) \times ND$ | 144 bits |
| EA | $2 \times ND$ | 36 bits |
| OEA | $2 \times (X - 1) + (Y - 1)$ | 27 bits |
| TagNoC | $(\lceil \log_2 X \rceil + \lceil \log_2 Y \rceil) + 2$ | 10 bits |

Another critical factor for the NoC is communication reliability. Any fault occurrence on the header flit may result in a misrouting of the whole packet. The probability of fault occurrence on header flit grows as the header flit size increases, with the same Bit Error Rate (BER)$^2$ for both data and control flits. The extra routing information bits in the header flit which limits the scalability and decrease the reliability of NoC is the major problem of source routing methods.

The minimum number of bits in a header flit for all discussed approaches are presented in Table 3.3 where X and Y represent the horizontal and vertical size of the network, respectively. The third column of the Table 3.3 demonstrates the header size for each of discussed routing approaches in a 10×10 NoC mesh. ND term represents network diameter which is (X+Y−2) for a mesh topology.

Figure 3F:
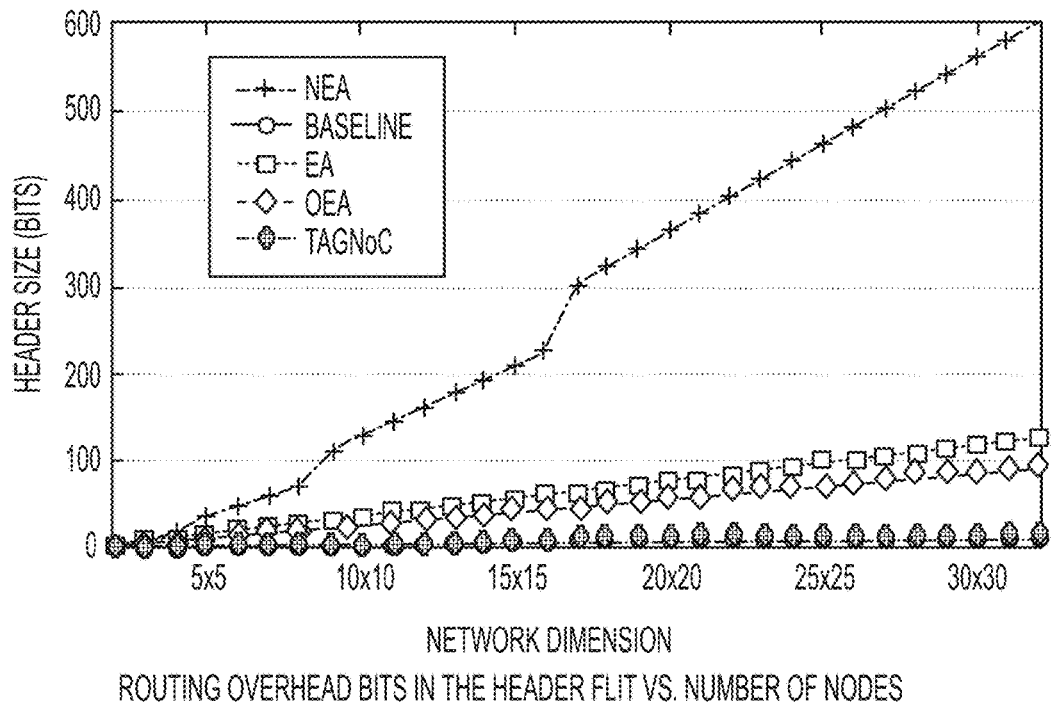
FIG. 3F illustrates different range of network sizes.

For the EA method, two bits are needed for each intermediate node from the source to destination. Comparing to NEA, EA method is more scalable but still is a function of network dimensions. In comparison with EA, the header flit in the OEA method requires even fewer bits. The reason is that in OEA method, two bits are needed for each horizontal movement while after the turn; only one bit is enough for each vertical movements. In TagNoC, regardless of NoC dimensions, only two extra Tag bits are used so the number of header flit bits for TagNoC technique is considerably smaller than the rest of proposed approaches, while it is almost with the same order of baseline XY routing algorithm. The presented function in Table 3.3 are visually compared for different range of network sizes in FIG. 3F. In this figure, it is demonstrated that the size of header flit in TagNoC grows logarithmically, similar to the baseline distributed XY routing with negligible constant amount of overhead.

The performance, power consumption, area overhead, and the frequency of TagNoC method is compared with baseline, EA, and OEA approaches in the following paragraphs. The NEA method is not considered for these evaluation metrics because of its large design complexity and overhead.

3.3.2 Performance

In this section, the experimental framework is introduced first and then experimental results are reported to compare the efficiency of all proposed methods.

Experimental Setup

A 16-node, 4×4 mesh network with 16-bit interconnection links is implemented in Verilog as an NoC simulator for this experiment. The accuracy of the NoC model is verified by tracing the traverse of packets through the network with the help of SystemVerilog language for different traffic patterns. Both synthetic and application-level traffics analyses are considered in order to investigate the efficiency of the proposed hybrid routing approach under different performance constraints.

Routers contain five 128-bit buffers per input port and operate with the frequency of 1 GHz. Selected signals for the simulation are profiled after the simulator is warmed up and the majority of routers are involved in packet transmissions as source or intermediate nodes in order to report accurate results. Header flit arrival time and the moment which the whole packet is received by its destination local port are captured in order to measure packet transmission delay. Throughput is defined as the rate at which packets are delivered by the network for a particular traffic pattern. Each network is designed to operate at its maximum frequency with the assumption that processor tiles operate on their own frequency domain asynchronously with respect to the interconnection network, similar to recent industry many-core chips.

Zero-load network latency and both synthetic and application-level traffic patterns are used in order to analyze impacts of the proposed router architecture on the NoC. This factor is widely used as a performance metric for traditional interconnection networks which gives a lower bound on the average latency of a packet through an empty network in which a packet never contends with other packets to obtain resources. It does not depend on type of the generated traffic patterns as there is no contention among routers to access the interconnection resources.

Figure 3G:
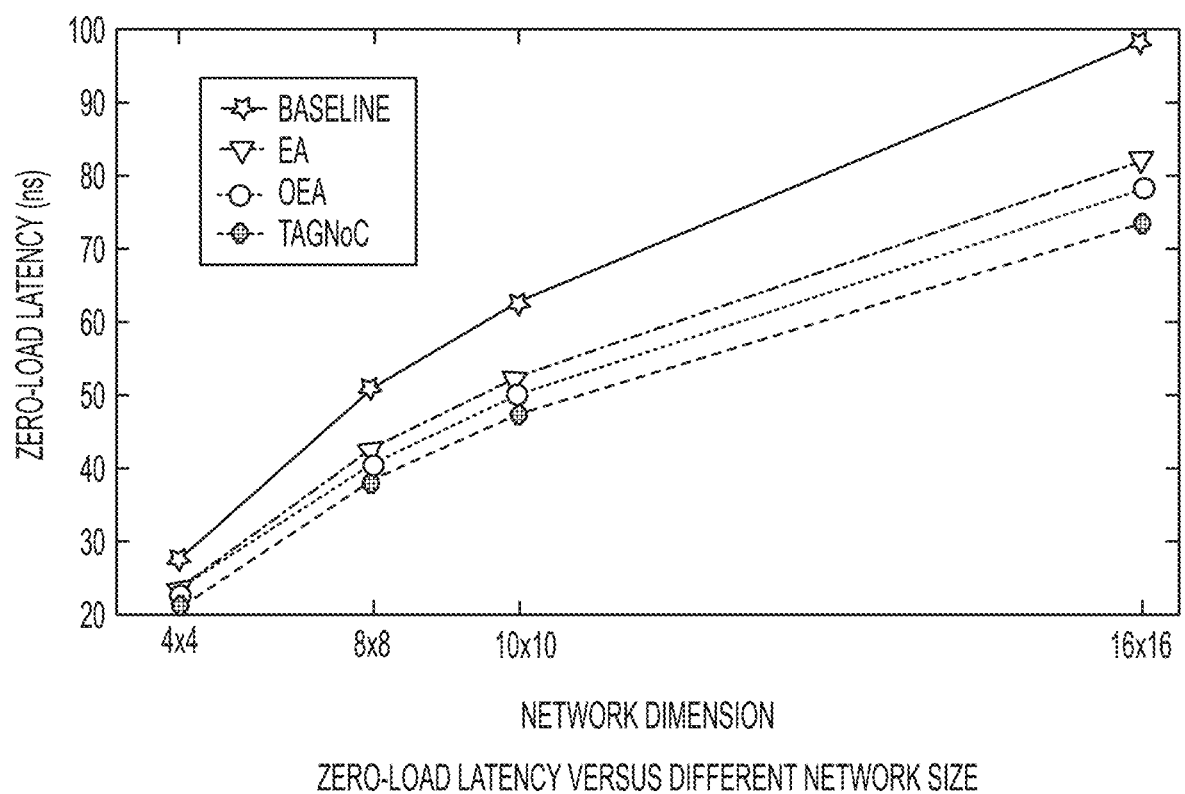
FIG. 3G illustrates the impact of proposed architectures on zero-load latency for different number of nodes under the uniform random traffic pattern for baseline, EA, and TagNoC methods.

The zero-load latency in this experiment, is implemented by the injection rate of 0.1%. The impact of proposed architectures on zero-load latency for different number of nodes under the uniform random traffic pattern is plotted as shown in FIG. 3G for baseline, EA, and TagNoC methods. All EA, OEA, and TagNoC methods require the same number of clock cycles with different clock cycle time since they have different routing unit architectures. FIG. 3G shows that as the network size increases, the latency for all methods increases. The performance of source routing methods scales much better than the baseline architecture for a fixed network size. In a 100-node, 10×10 mesh network the zero-load latency of TagNoC technique is 26% less than baseline method.

Synthetic Performance

Spatial distribution of messages in interconnection networks are considered using traditional synthetic traffic pattern to evaluate the latency of baseline and proposed routing approaches. These synthetic traffic patterns include Bit_complement, Bit_rotate, Bit_reverse, Neighbor, Shuffle, Tornado, Transpose, and Uniform. Packets with variable data flit sizes are injected to routers in this experiment, for each of traffic patterns as the NoC designs are expected to support multiple applications. FIG. 3H illustrates the average packet latency versus offered load for all the approaches under running synthetic traffics as a function of aggregate offered load for mesh network of 16 nodes. Latency and offered load are reported in units of nanoseconds and packet/cycle/node, respectively. According to the experimental results, the performance of the EA, OEA, and TagNoC routing algorithms are better than the baseline method for the majority of synthetic traffics.

TABLE 3.4

System configuration parameters

| Parameter | Value |
| --- | --- |
| Cores | 16 |
| Topology | 4 × 4 mesh |
| Processor | SPARC |
| L1 Cache I/D | 64 KB, 2-way, 3-cycle access |
| L2 Cache | Shared, 6-cycle bank access |
| Cache Coherence Protocol | MESI |
| Memory Access Latency | 220 cycles |
| Packet Size | 22 bytes |
| Flit Size | 16 bits |
| Buffer Depth | 8, 16-bit entries/port |
| Switching Scheme | Wormhole |
| Routing Algorithm | Dimension Ordered Routing |

The only exception is the Bit_reverse traffic for higher injection rate in which baseline has better performance than EA method. The turning point of injection rate for the synthetic traffic patterns is between 0.35-0.55 packets/node/cycle (see FIG. 3H). With higher injection rates than the turning point 0.45 packets/node/cycle the average latency of all approaches under running synthetic traffics rise sharply until the network is saturated, while in TagNoC approach the network is saturated at higher injection rate, which provides a better performance for all synthetic traffics.

Application Performance

Figure 3I:
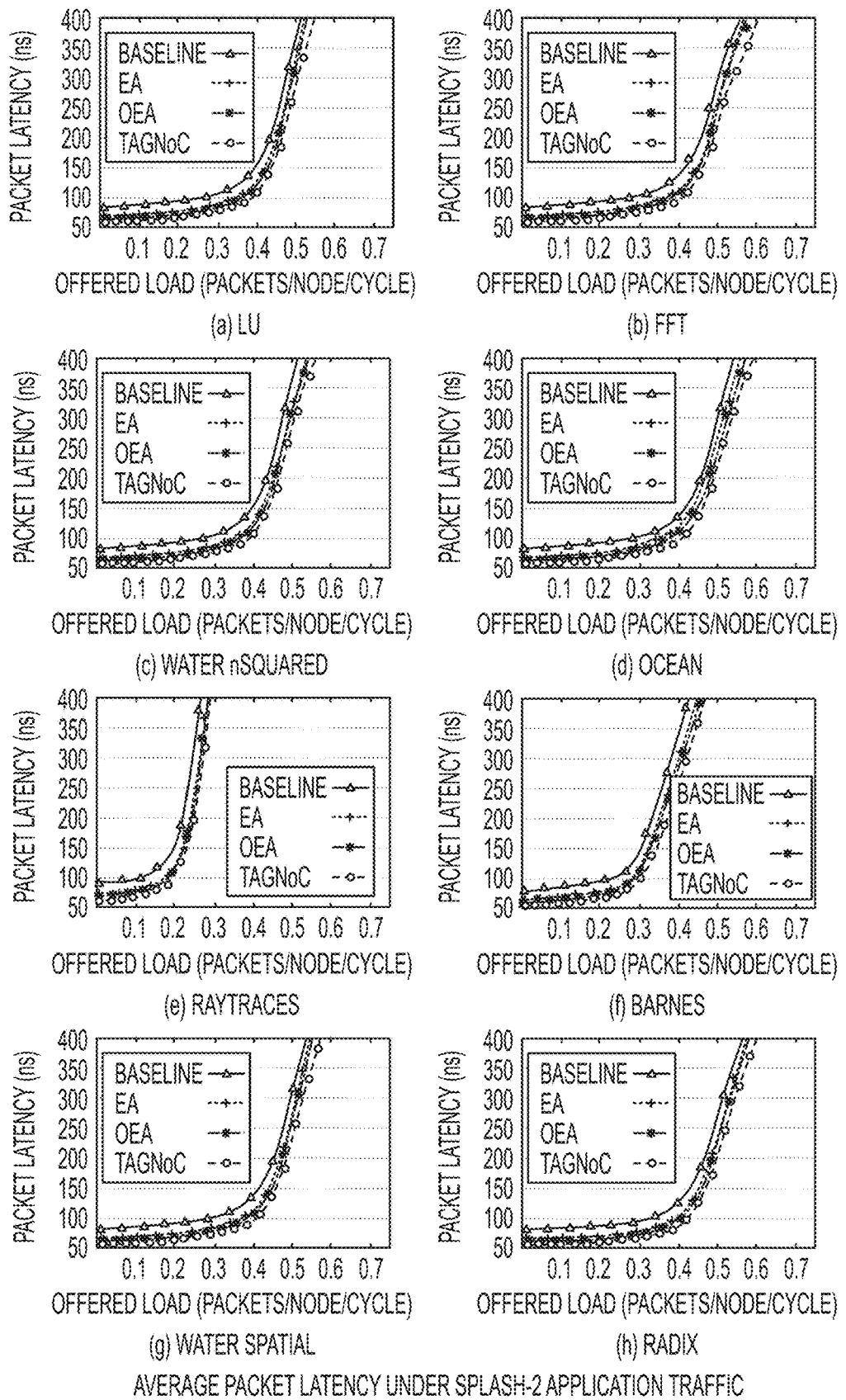
FIG. 3I illustrates the average packet latency versus offered load for the baseline, the TagNoC, and the source routing approaches under running SPLASH-2 application traffics as a function of aggregate offered load for mesh network of 16 nodes.

Application traces are obtained from the GEMS simulator using the SPLASH-2 application benchmark suites. Full simulation system parameters are reported in Table 3.4. The average packet latency versus offered load for the baseline, the TagNoC, and the source routing approaches under running SPLASH-2 application traffics as a function of aggregate offered load for mesh network of 16 nodes are plotted in FIG. 3I.

The reported average packet latency for SPLASH-2 traffics demonstrate similar results of performance reports as reported for synthetic traffics, although the turning point of diagrams for SPLASH-2 application traffics is between the offered load of 0.2-0.4 packets/node/cycle. TagNoC architecture has a better performance for all application traffics (see FIG. 3I). This is because packets are buffered for shorter time through intermediate routers and can be quickly routed; the NoC is able to handle higher injection rates. The other conclusion of this fact is supporting shorter clock cycle time in TagNoC approach as compared to other methods. With this feature the NoC is able to support cores with higher operational frequencies.

3.3.3 Power Consumption

The power consumption and area overhead all discussed architectures are obtained by a combination of cycle-accurate RTL router simulation, Verilog synthesis, and performing post-synthesis gate-level simulation. The Verilog synthesis is done by Synopsys Design Compiler with TSMC 40 nm standard cell library and post-synthesis gate-level simulation is done by Synopsys PrimeTime in order to extract experimental results.

Figure 3J:
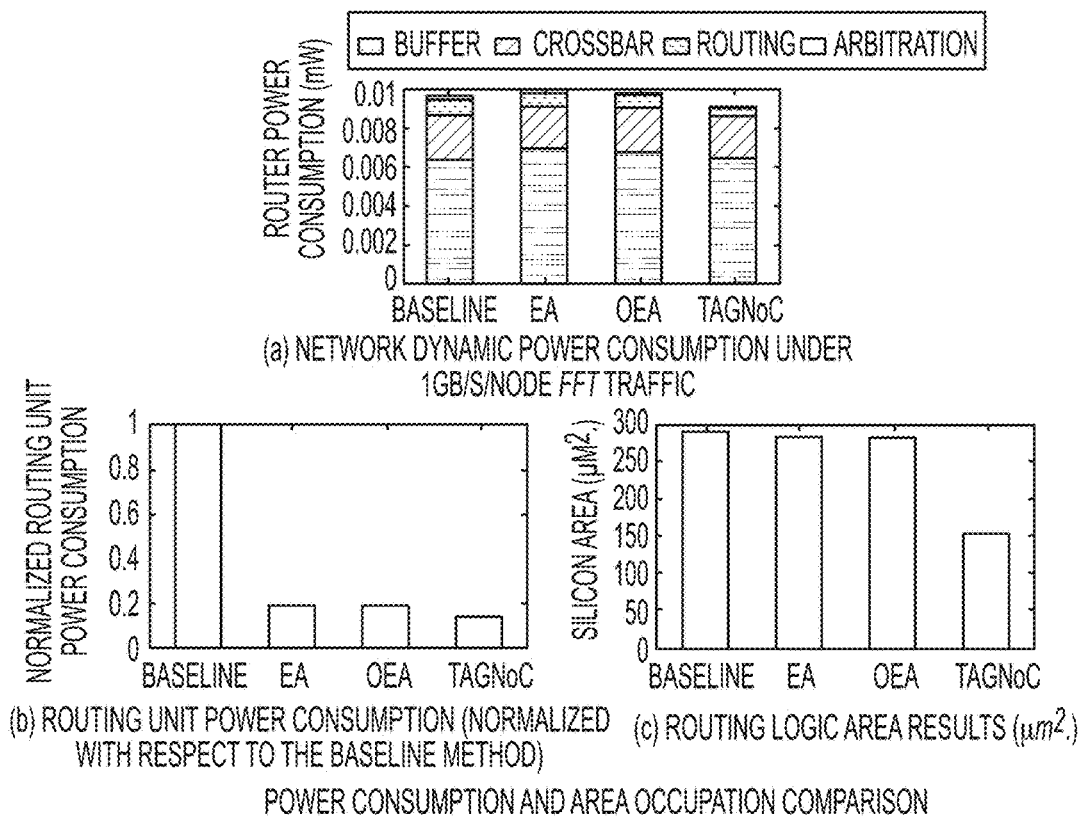
FIG. 3J illustrates power consumption and area occupation comparison.

In FIG. 3J, (a) shows dynamic power consumption under a 1 GB/s/node fft traffic load for a 16-node network with the injection rate of 0.5 packets/node/cycle. NoC with TagNoC router architecture is reported as the lowest power consumer in contrast to other approaches since it eliminates extra comparison circuits. However, total dynamic power consumption of the baseline, the TagNoC, and other source routing techniques do not increase since they all employ the same buffer, crossbar, and arbiter components. Dynamic power consumption of the routing management unit of different approaches are compared separately in order to highlight improvements of TagNoC technique (see (b) in FIG. 3J). The extra power consumption of NI to generate the extra routing information bits is reported in Table 3.5 in terms of micro-watt ($\mu W$), which are negligible due to their tiny logic, as expected. It should be noted this extra power consumption is imposed once per packet only during packet injection into the router.

As it is shown in (b) in FIG. 3J, EA/OEA methods as source routing algorithms consume considerably less power than the baseline distributed routing. This is due to

TABLE 3.5

NI power overhead for extra routing information computation

| Power consumption ($\mu W$) | TagNoC | EA | OEA |
| --- | --- | --- | --- |
| Dynamic power | 0.69 | 9.066 | 10.86 |
| Leakage power | 18.2 | 210.94 | 186.9 |
| Internal power | 2.42 | 23.2 | 20.43 |
| Total | 21.37 | 243.18 | 218.23 |

TABLE 3.6

Router clock periods

| Architecture | Clock period |
|---|---|
| Baseline | 0.7466 ns |
| EA | 0.8196 ns |
| OEA | 0.7801 ns |
| TagNoC | 0.7328 ns | the elimination of routing logic in EA/OEA approaches. But, at the router level it can be observed that EA/OEA methods consume slightly higher power than the baseline. The reason behind this observation is that in EA/OEA methods the number of header bits imposed by the routing algorithm is more than the baseline method which leads to more power consumption. It is shown that TagNoC architecture consumes power approximately 83% and 27% less than the baseline router and EA/OEA architectures.

3.3.4 Frequency Results

Table 3.6 summarizes the minimum clock cycle time for baseline and other methods, extracted using Synopsys Design Compiler. Due to shifting the header bits, EA and OEA routing circuits need higher clock cycle time in comparison with baseline method as shown in Table 3.6. TagNoC is reported as the fastest technique by 2%, 12%, and 6% less clock period comparing to baseline, EA, and OEA techniques.

3.3.5 Area Analysis

Area values of routing logic for all the baseline, EA, OEA, and TagNoC architectures are illustrated in FIG. 3J, plot (c). Since they do not impact the buffer, arbiter, and crossbar components, there is no difference between them. Based on the experimental results the area of input buffer, crossbar switch, and arbiter for all the architectures are reported 9471 $\mu m^2$, 520 $\mu m^2$, and 1065 $\mu m^2$, respectively. As it is depicted in 36, TagNoC routing logic occupies 53% less than the distributed router embedded with baseline routing algorithm. In total, TagNoC router architecture needs 138 $\mu m^2$ (2%) less silicon area than baseline router due to elimination of conventional routing unit. Overall, the total TagNoC router saves area by elimination of routing logic. The reason that EA and OEA methods seem to occupy approximately the same amount of logic as baseline is because of applying a shift register in their architecture design. They use this shift register to drop some parts of header flits and push the rest to the front once the header flit passes each intermediate router.

CHAPTER 4: RELIABILITY CHALLENGES IN 3D NOC

The need for reliability assessment of 3D NoC architecture has become critical with shrinking CMOS technologies. The anticipated fabrication geometry in 2018 scales down to 8 nm with projected 0.6 v supply voltage, which results in more transistors on the same die area and tighter noise margin. With theses features higher error rates are expected and consequently the probability of a chip failure is rising. In addition, applying power and performance aware techniques such as power gating, power density, prefetching methods, or even non-ideal threshold and supply voltage scaling exacerbate the failure probability in 3D NoC architectures.

As discussed in Chapter 3, TSV-based 3D design is the most promising solution for 3D integrations of future on-chip interconnections as compared to other radical technologies, but the impact of sub-micron TSVs on future 3D NoCs is still an active area of research.

Consequently, the mass production of 3D ICs for consumer electronic products are not reliable enough without a systematic and thorough reliability assessment. Quantitative (analytical) and qualitative (experimental) techniques are well-known fault forecasting methods, as discussed in Chapter 2. Both of these methods need a comprehensive study on the sources of faults and their effects, which is the focus of this chapter. These features should be addressed in order to develop the authentic fault models and fault metrics as a part of the reliability evaluation of a given 3D NoC architecture. The goal of this chapter is to highlight the reliability challenges of TSV-based 3D NoCs design. More specifically, the potential physical-level faults in 3D NoC, their corresponding logic-level models, and their effects on the functionality of 3D NoC components are covered in this chapter.

4.1 Physical-Level Potential Faults in 3D NoC

Figure 4A:
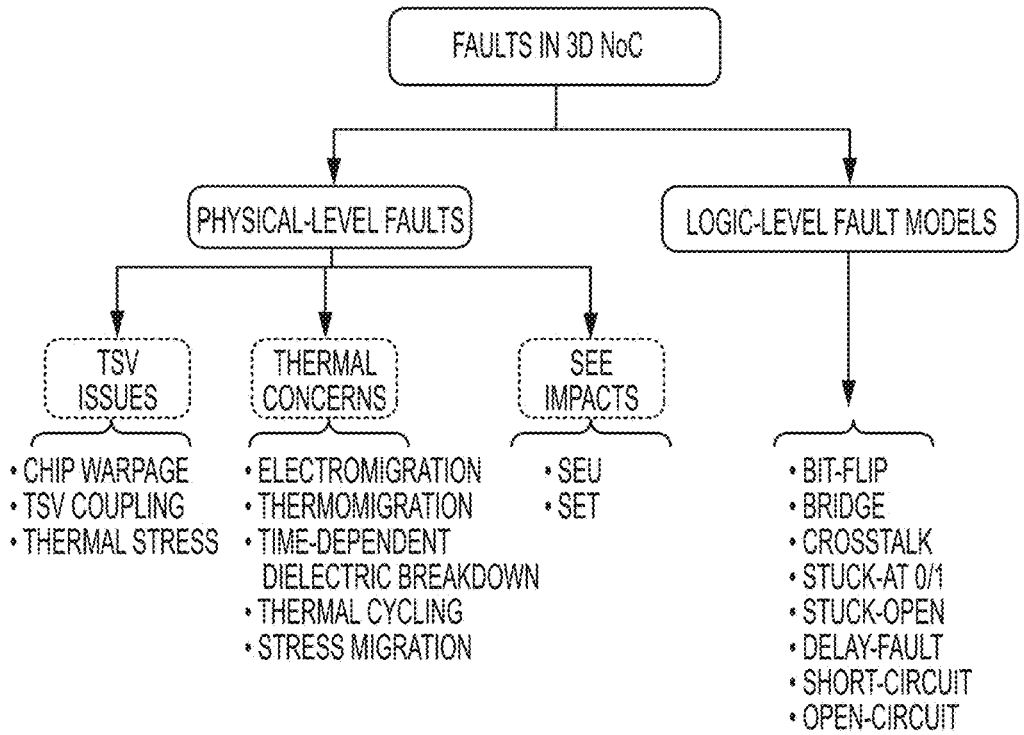
FIG. 4A summarizes the potential physical faults, affecting the performance of 3D NoC design.

Based on discussion of Chapter 2, either of internal or external causes results in active faults. At the physical-level, a failure mechanism is the mechanical or chemical action that actually causes the manufactured circuit to perform different than what is expected. FIG. 4A summarizes the potential physical faults, affecting the performance of 3D NoC design. As shown in this figure, TSV issues, thermal concerns, and SEE impacts are the main physical sources of faults in future 3D NoC designs. It is unlikely that existing technology becomes ubiquitous in near future until there are solutions for these issues. These physical fault sources influence behavior of 3D NoC during packet transmission. Thermal concern has effects on both 2D planar and vertical links, while SEE impacts more transistor of 2D planar designs. The presented categorization in 38 enhances the accuracy and efficiency of both fault injection and signal observation steps as major operations of a fault injector tool. It is also useful for providing more realistic formal equations in analytical techniques. Each of these three major physical faults in 3D NoC environment, which are individually divided into smaller subcategories, are discussed in the following subsections.

4.1.1 TSV Issues

3D NoCs are expected to offer various benefits such as higher bandwidth, smaller form factor, shorter wire length, lower power, and better performance than the traditional 2D NoCs. These advantages may not be completely achieved because of chip warpage, TSV coupling, and thermal stress as major TSV failure causes.

Chip warpage: When TSVs are used for vertical interconnects, it may lead to chip damage, since the TSVs are arranged in a non-uniform manner. The other reason is that the thermal expansion of Si and Cu are different, resulting in chip compression stress. Typically, TSVs are placed on the peripheral or the center of a chip. TSV-related defects might occur in the fabrication process of TSV placement, in the bonding of the TSVs to the next layer like wafer warpage. The wafer warpage is considered a fabrication defect as a result of annealing process; it is more interesting for test engineers rather than researchers with fault evaluation or fault-tolerant design expertise.

TSV coupling: TSV (intra-die) links have larger capacitance values than 2D wires (inter-die links), which consequently increase the latency of 3D signal paths. Although buffer insertion method has been proposed with the goal of delay reduction, but it imposes extra area and power consumption overheads. The unexpected delay of data transmission through TSVs, depends on fabrication technology, physical parameters and design factors of TSVs. This is because the occupied die area by TSVs is quite significant which in turn compromises the wire length benefit of 3D ICs. On the other hand, small TSVs causes larger capacitance values depending on the liner thickness and doping concentration of the substrate. Meaning that, small TSVs have less area overhead, but they cause serious delay overhead.

Furthermore, this will be more critical considering the CMOS technology integration results in tighter timing requirements for circuits though TSV scaling and CMOS technology scaling are independent. So, the TSV coupling is one of the major issues for the future 3D NoC designs. In more details, TSV coupling may result in delay because of mutual coupling effects between adjacent TSV pairs. The term TSV coupling refers to capacitive and inductive couplings among neighbor TSVs. Electric field results in capacitance coupling and magnetic field is a source of inductive coupling.

Inductive coupling among neighbor TSVs is more critical in higher frequency data transmissions, while capacitive coupling is more challenging in lower range of frequencies. TREAT, discussed in more detail in Chapter 5, is able to simulate the effect of capacitive TSV-to-TSV coupling fault models as dynamic fault injection.

Thermal stress: The mismatch between the Coefficient of Thermal Expansion (CTE) of a TSV fill material and the silicon induces a residual thermal stress in the region surrounding the TSV. The thermal stresses can drive interfacial delamination between the TSV and the Si matrix, damaging the on-chip wiring structures. It can affect the carrier mobility due to the piezoresistivity and degrading the performance of the MOSFET devices. Thermal stress can also degrade the saturation current of the transistor down to 30%. This parameter limits the maximum permitted number of TSVs on 3D NoC by increasing the Keep-Out Zone (KOZ) parameter.

4.1.2 Thermal Concerns

Thermal concerns and effective heat removal methods are highly demanded in 3D NoC designs since on-chip circuits are stacked on top of each other and packed densely. Temperature cycling and thermal shock accelerate fatigue failures depending on the environmental temperature range. Thermomigration is mass transport driven by a temperature gradient, which unbalances a homogeneous alloy under a temperature gradient. Thermomigration is not a concern in Al and Cu interconnect technology; but it is now recognized as a serious reliability problem for flip chip solder joints in 3D packaging.

Transistors, contacts, multi-layered Cu, Al interconnects, and solders joints are the sources of heat in 3D designs. The majority of power consumption is attributed to transistors, because the resistivity of silicon is much higher than metals and there are more than a billion transistors on advanced chips. Furthermore, the heat generated by solder joints is much lower than the transistor and interconnects metallization; it affects locally the area surrounding (underfill) solder bumps. The polymer-based underfill has a low glass transition temperature, so the thermal concern may change the viscosity of the underfill. The flow of the underfill reduces its role in the protection of the bump as well as the chip. Thermal concern is considered as waste-heat that increases the conductor temperature, resulting in more joule heating. Thermal concern increases the device temperature and affects atomic diffusion. Four main thermal issues in 3D NoCs are reported in the following subsections:

Electromigration: Electromigration is a failure mechanism where electrons flowing through metal (Al, Cu) lines collide physically with the metal atoms, causing the metal atoms to migrate and form voids in the metal lines which leads to increased metal line resistance and disconnection. Electromigration is a key failure mechanism that determines the long-term reliability of metal lines. It strongly depends on the material of the metal. Copper has more resistance against electromigration as compared to Aluminum. It also depends on the running temperature of the system.

Time-Dependent Dielectric Breakdown (TDDB): The importance of leakage power has increased dramatically as technology scales down. Leakage (off-state) current has a direct relation with temperature while it has reverse relation with on-state current of a transistor. Additionally, leakage current of MOSFET gates depends on the quality and thickness of oxide gate. When the leakage current of gate oxide reaches its limitation, the breakdown may happen which results in the failure of device. Furthermore, thin gate oxides and their silicon/silicon-dioxide interface are affected by various physical mechanisms like Hot Carrier Injection (HCI), Negative Bias Temperature Instability (NBTI), and TDDB. TDDB has been considered among researchers as a significant failure mode for deep sub-micron technologies. TDDB is one of the main issues for high temperature in thin oxides. It is much more critical in 3D designs because of thermal concerns and thermomigration effect among the layers.

Stress migration: Stress migration is a failure mechanism in which the applied stress to metal lines causes the metal atoms to be crept. Stress is generated in the metal lines (Al, Cu) used in the IC due to temperature differences between the heat treatment process in the manufacturing process and the operating environment temperature. This stress can cause composition deformation in metal lines, resulting in short-circuits between metal lines, or vacancies in the metal lines causing creep and converge in a single location which consequently form a void. In more details, stress migration occurs due to the interaction between the metal line stress and the metal atom creep speed. Whereas the metal atom creep speed increases at high temperatures, the stress acting on the metal lines decreases at high temperatures, so there is known to be temperatures peaks at which stress migration occurs.

Thermal cycling: Thermal cycling is the process of cycling through two temperature extremes. It causes cyclic strains and develops cracks in a similar way to natural usage and weakens the joint structure by cyclic fatigue. The effect of thermal cycling gets worse in 3D design, since the temperature of different layers are not the same and there is always a thermal flow between layers. Thermal cycling may also affect other thermal issues such as electromigration, stress migration, and thermal stress.

4.1.3 Single Event Effect (SEE) Impacts

SEEs induced by heavy ions, protons, and neutrons become an increasing limitation of the reliability of electronic components, circuits, and systems. SEE has been the main concern in space applications, with potentially serious consequences for the spacecraft, including loss of information, functional failure, or loss of control. It can be destructive or transient, according to the amount of energy deposited by the charged particle and the location of strike on the device. ICs malfunctions due to radiation effects from high energy alpha particles at ground level are a major concern because of continued technology size scaling. The electron carriers are collected by the electric field and cause the charge collection to expand resulting in a sudden current pulse. The diffusion current dominates until all the excess carriers have been collected, recombined, or diffused away from PN junction area. To investigate the effects of physical SEE faults on electronic systems at system level is considered by researchers to establish and verify the target system's robustness with a reasonable level of accuracy in shorter time. In general SEE is divided into two main categories: Single Event Upset (SEU) and Single Event Transient (SET).

SEU: It is a change of state caused by ions or electromagnetic radiation striking a sensitive node in a microelectronic device. These phenomena can affect the behavior of sequential circuits such as memory cells, register files, pipeline flip-flops, and cache memories. The sensitivity of both PMOS and NMOS transistors are high when they are off. The upset rate of can be estimated by having the knowledge of the mechanism by which radiation particles cause the anomaly. Traditionally, two different major space radiation sources ending in SEUs were: high energy protons and cosmic rays, specifically, the heavy ion component of either solar or galactic origins. The heavy ions cause direct ionization within a device while protons can make a large contribution to the overall upset rate. However, within the Earths atmosphere and at the ground level, neutrons are the most frequent cause of SEUs.

SET: It is a temporary variation in the output voltage or current of a combinational circuit due to the passage of a heavy ion through a sensitive device results in an SET. In analog devices, SETs called Analog Single Event Transients (ASETs), are mainly transient pulses in operational amplifiers, comparators or reference voltage circuits. When a charged particle hits a logic cell sensitive node in the combinational logic, it generates a transient pulse in a gate that may propagate in a path and eventually be latched in a storage cell.

As the goal of TREAT is to present a run-time reliability evaluation tool for 3D NoC, the chip warpage is not considered as a fault library in the TREAT. However, it can be easily added as a simple predefined permanent fault library in case it is needed. In addition, to study the effects of thermal stress on TSVs and thermal concerns needs a full system simulation to profile the chemical interaction of materials with different CTEs. In other words, the physical parameters of TSVs are critical in accuracy of any proposed dynamic thermal concern and thermal stress fault models for 3D structures. So the current version of TREAT is not able to model dynamic thermal stress and thermal concerns, but they are supported as static fault libraries in the current version of TREAT. As discussed earlier due to structural implementation of TREAT any fault library model can be added later as a plug-in to the TREAT.

4.2 Logic-level Fault Models

To model the presented faults in Section 4.1.1 at the physical-level, one has to develop an accurate reliability evaluation of 3D NoC, but it is time consuming as compared to logic-level or higher level modeling. To model the physical fault effects by the logic-level fault model is preferable in order to keep the complexity low and simulation time short, while meeting the required accuracy. The logic-level fault models which are capable of modeling each of the presented physical faults in 3D NoC environment are also shown in FIG. 4A. Evaluating the reliability of 3D interconnection architecture at the logic-level enforces and facilitates the process of fault injection as a fault forecasting method.

Logic-level fault models represent the effect of physical faults on the behavior of the modeled system. The results of early studies with logic-level fault models provide the basis for fault simulation, test generation, and other testing analysis applications. A higher level fault model allows derivation of the inputs that test the chip without any knowledge of characteristics of physical-level failure causes. The accuracy of logic-level fault modeling will be increased by covering all the necessary areas of testing analysis. In addition, the physical-level is not adapted for the simulation of complex designs such as 3D NoCs because of their long simulation time. This approach decreases the complexity by employing a single logic-level fault model for different technologies, and representing the effects of physical faults which are not completely understood.

Logic-level model of 3D NoC for the qualification test must be close enough to the physical-level to include all the unwanted impacts of existing physical faults on the system. Understanding causes and effects of physical faults prevents extreme computation time augmentation in logic-level modeling by providing an intelligent fault modeling technique. Table 4.1 summarizes the causes and correlated logic-level fault models for each of the introduced physical faults. A brief description of all the represented logic-level fault models in Table 4.1 are presented in the following paragraphs:

Bit-flip: It is used to emulate the effects of SEU and other transient disturbances. A bit-flip in any resource will only manifest itself once this resource is read to perform an operation. Activating several of them at the same time results in modeling Multiple Event Upset (MEU) physical faults.

TABLE 4.1

Physical faults and their corresponding logic-level fault models

| Physical Fault Name | Cause | Logic Fault Model |
|---|---|---|
| Chip warpage | Crack in Micro-bumps [109] | Open-circuit |
| TSV coupling | Increase path delay [59, 62] | Delay-fault |
| | May result in a wrong logic function switch and cause unintentional flip in the target signal | Bit-flip |
| Thermal stress | Affects carrier mobility of transistor which degrades the performance [91] | Delay-fault |
| Electro-migration | Increase wire resistance [102] Disconnection | Delay-fault Open-circuit |
| TDDB | Dielectric breakdown of the gate dielectric film influences on transistor behavior | Stuck-at-0-1 |
| Stress migration | It deforms composition in metal lines or makes vacancies (atom holes) in the metal lines, forming a void by creeping and converging in a single location [75] | Open-circuit Short-circuit |
| Thermal cycling | Interfacial crack [94] | Open-circuit Delay-fault |
| SEU | Electrical noise induced by high energy ionizing particles on sequential circuits | Bit-flip |
| SET | Electrical noise induced by high energy ionizing particles on combinational circuits | Stuck-open |

Stuck-at: If there are short circuits to the ground or to the supply voltage, a stuck-at-0 or stuck-at-1 fault has occurred, respectively. These sorts of faults can be modeled by forcing a signal to logical value of 0 or 1.

Bridging: It models a situation in which two signals are connected to each other when they should not. This may result in a wired-OR or wired-AND logic function.

Stuck-open: It models an open circuit in the drain or source interconnects of parallel transistors in combinational logic gates which can occur during the operation.

Delay-fault: It represents physical faults where the signal eventually carries the correct value, but more slowly (or rarely, more quickly) than normal.

Open-circuit: The open-circuit fault model simulates increasing the resistance of wires to an extremely high value, ceasing the current flow.

Short-circuit: Short circuit models any unwanted wiring connections in the system.

4.3 Fault Effects on 3D NoC

Figure 4B:
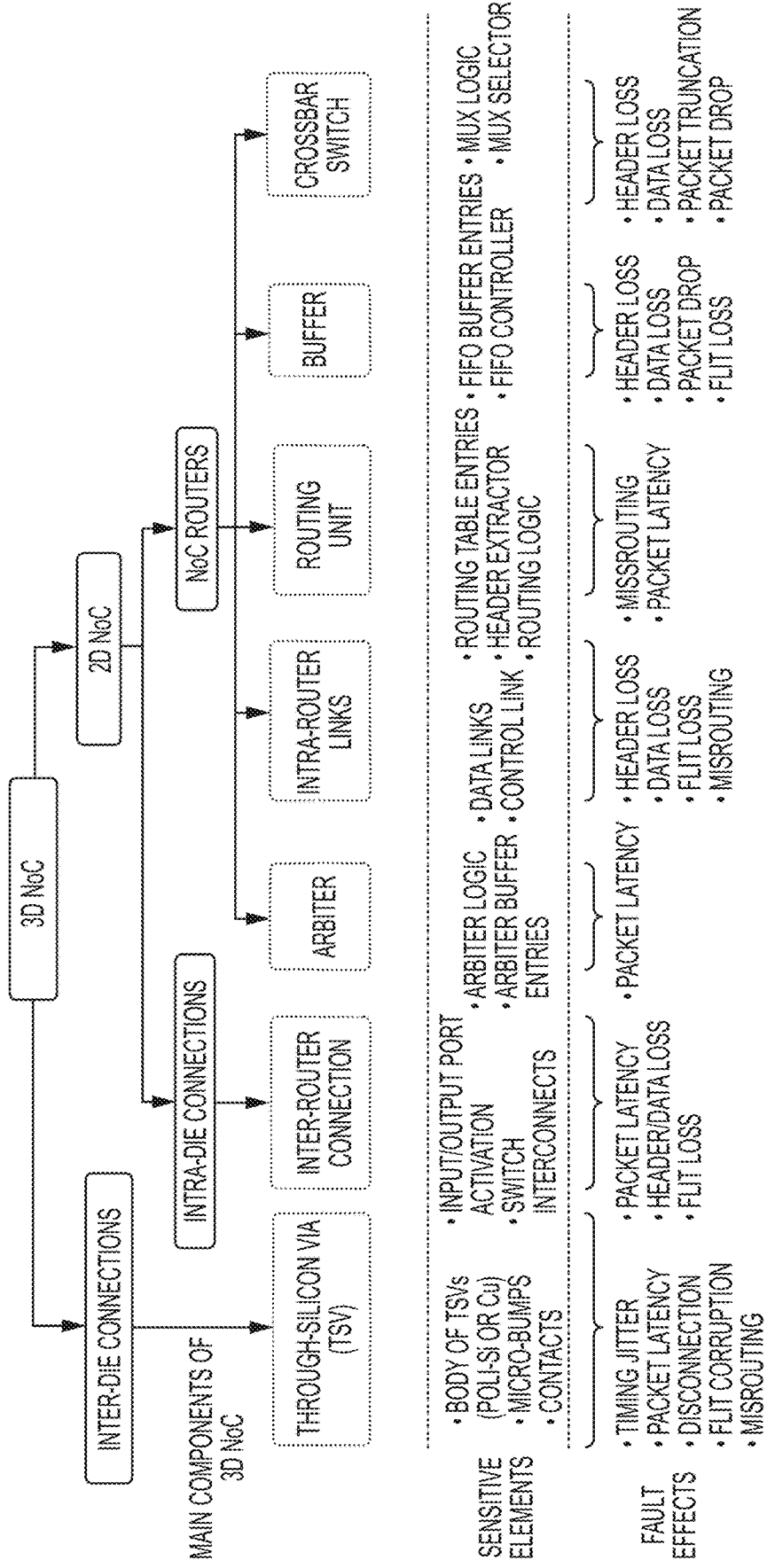
FIG. 4B illustrates the vulnerable components of 2D planar NoC and TSV links.

The potential faulty locations are precisely recognized by exploring 3D NoC architecture in addition to the physical fault sources in Section 4.1. 3D NoC is composed of different components and links, including 2D planar structures bound by inter-die links as discussed in Chapter 3. The vulnerable components of 2D planar NoC and TSV links are itemized in FIG. 4B. Categorizing sensitive components of 3D NoC results in more accurate and faster reliability analysis evaluation. Therefore, a reliability analysis tool can utilized this information to model the related fault models in specified location rather than considering the whole design with random component selection. In addition, different sources of fault have different effects in 3D NoC components which are itemized in FIG. 4B. These fault effects can be utilized for any 3D-NoC specific reliability evaluation metrics and some of them are applied in TREAT. These effects include header/data flit loss, packet drop, packet truncation, packet latency, misrouting, timing jitter, flit corruption, and disconnection. Reporting the percentage of each of these metrics is a an important approach to compare the reliability of any fault-tolerant design. A brief description of them is listed next.

Header/data flit loss: It represents any header/data flit alteration of an incoming packet. It would happen if there is any problem with the logic circuit of crossbar switches, FIFO controller, or internal connections among components inside a router. Header flit loss which has a lower probability than data flit loss is more critical. A packet might never reach its expected destination, if a header loss occurs.

Packet drop: The incoming packet will be skipped or forwarded to an invalid output port if a fault occurs in input buffer pointers/counters or output switch.

Packet truncation: It happens when erroneously a data flit is recognized as a tail flit, where one or more data flits from the end of a packet will be lost.

Packet latency: Packet latency is the result of the router arbitration malfunction because of a fault inside the arbiter logic, internal connections, or TSV connections. TSV issues and some of the thermal related faults may change the conductivity of TSVs or internal links by changing their physical structures.

Misrouting: Misrouting is the consequence of fault occurrence on either header flit while transferring among NoC architecture components or on comparator modules of routing unit component. It can be resolved if it happens because of any transient faults. Permanent faults in a routing unit component result in extra number of packet transmissions between adjacent routers and consequently causing congestion in some parts of the network.

Timing jitter: The short-term variations of a digital signalâ€™s significant instants from their ideal positions in time is called timing jitter. It is a significant, and usually undesired, factor in the design of almost all communications links. The delay caused by temperature variation and TSV coupling, leads to a timing jitter, which is more significant for TSV because of its size.

Flit corruption: Flit corruption in a packet happens when a fault occurs in the data path of a router. It may occur in intra-router links, crossbar switch components, or TSV link.

Disconnection: Different types of faults may cause the vertical link components (TSV body, contact, micro-bump) to fail. Electromigration affects the body and micro-bumps, causing the path to be implied as an open link or disconnected.

TREAT uses some of these effects as reliability metrics that are discussed in more details in Chapter 5 in which the framework of the TREAT is presented.

CHAPTER 5: TREAT FRAMEWORK

TREAT is a fault-injection based reliability analysis framework for 3D NoC environment. It uses logic-level fault models to evaluate the effects of physical faults which were discussed in Chapter 4. These fault models are added to TREAT as fault model libraries and they are inserted into the target model components based on user's request. TREAT is capable of activating static and dynamic fault models through two separate simulations set-ups. The current version of TREAT is able to model SEU, SET, TDDB, Thermal cycling, Thermal stress, and Electromigration physical faults through a static fault injection process. It is also able to estimate the effects of TSV coupling physical fault in 3D NoC designs through a dynamic fault injection process. It has been developed in a structural way to support future plug-in fault models. It traces the given Verilog HDL description of a 3D NoC design regardless of its description types (behavioral, structural, or data flow) to accomplish the fault injection process. This chapter describes the major components of TREAT in addition to the static and dynamic fault modeling implementation in TREAT.

5.1 TREAT Components

Figure 5A:
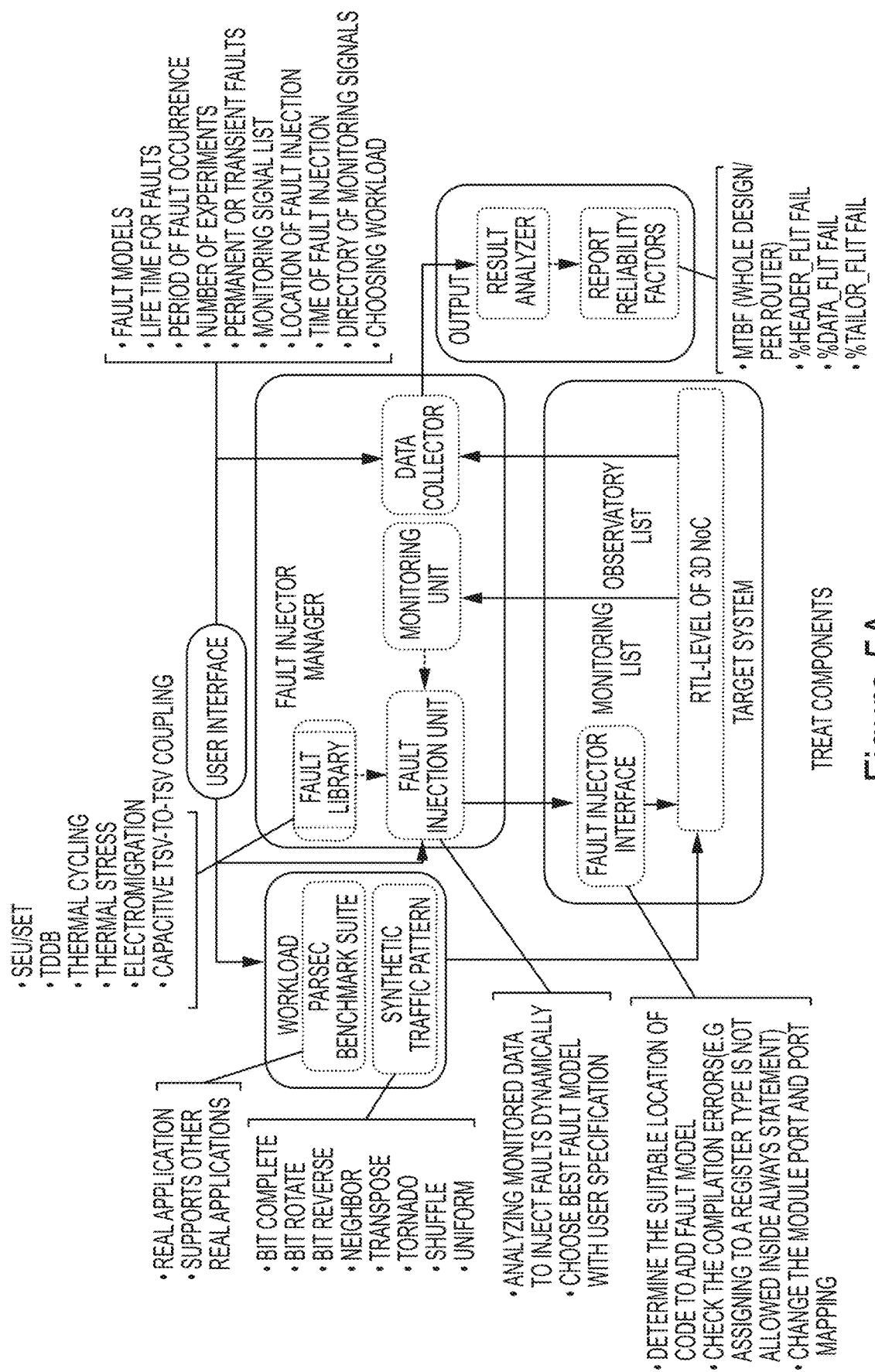
FIG. 5A illustrates modules in a Three-Dimensional NoC Reliability Evaluation Automated Tool (TREAT) in accordance with some embodiments described herein.

Similar to a typical fault injector tool, TREAT is composed of five major modules including: workload, user interface, fault injector manager, target system, and statistics report components. These modules with their subcompoents are illustrated in FIG. 5A. This figure represents the modified version of FIG. 2C, in which the basic components of a typical fault injector tool are discussed.

The workload component is necessary to evaluate the reliability of different components by running various traffic patterns. More variety of workload applications is desired to guarantee all routers are active during reliability evaluation process with different network congestion spots. TREAT actually employs the NI component of THENoC which interprets both synthetic and real data traffics and converts them into appropriate transmission packets as discussed in Chapter 3. But, it is also able to generate synthetic traffic applications such as random with uniform distribution and permutation traffic patterns. For permutation traffic such as bit complement, bit rotate, bit reverse, neighbor, transpose, tornado, and shuffle, there is a unique destination for all source nodes.

The user interface module in TREAT interprets the given user defined information to accomplish the fault injection process. A sample set of information from the user is listed in FIG. 5A, which is mostly needed for the goal of static fault injection routine. More specifically, TREAT traces through all of these predefined values and stores them in a hash data structure, which is accessed periodically during fault injection process.

The fault injector manager is able to monitor the 3D NoC (target system) to implement dynamic fault injection and it also interacts with user interface to accomplish static fault model experiment. In more details, this component is composed of fault library, fault injection unit, monitoring unit, and data collector subcomponents. The fault library contains all the predefined fault models for TREAT. The supported fault models in TREAT are shown in FIG. 5A. Some of the physical faults such as SEE faults depends on environmental conditions while some others like capacitive TSV-to-TSV coupling are data dependent as discussed in Section 5.3. Due to structural implementation of TREAT, it is able to support the state of the art and future fault models. The fault injection unit is responsible to update the target files for the fault injection process by accessing the fault library, user information, and the feedback of the target system. The feedback of the 3D NoC facilitates the process of dynamic fault injection. The monitoring unit is capable of profiling the predefined monitoring list signals. It also analyzes the profiled signals and sends the results toward the fault injection unit subcomponent. Data collector is the other subcomponent of fault injector manager which profiles the observatory list signals with the goal of reporting reliability evaluation statistics.

Target system is the RTL model of the system which is going to be evaluated. THENoC is employed in this experiment, to verify the functionality of the TREAT. The fault injector interface as the major subcomponent of target system is responsible for injecting faults. The locations and time of fault injections are chosen randomly for static fault models in TREAT. More specifically, it declares all faulty signals in the top module of the target system in order to activate user defined fault models. It also automatically distributes all faulty signals over the smallest modules of 3D NoC design based on the user preference. To reach this goal, it updates all the needed modifications through the port definition and port mapping sections of top module down to the smallest ones. The result of this process supports the HDL syntax in which the target system is implemented, without changing the functionality. Since THENoC simulator is implemented in Verilog, the presented fault injector interface supports Verilog syntax for the goal of injection process. Unlike to many existing fault injector tools, TREAT does not need to merge all the HDL implemented module files into single file. It only needs the knowledge of design hierarchy in which, the top module and smaller components are specified. In addition, in case of having a vector faulty signal, TREAT is able to choose the index numbers randomly or based on the user preference. For dynamic fault injection experiments, TREAT is able to inject the faults run-time based on the feedback from the system, ending in more accurate reliability evaluation.

And finally, the statistics report module of TREAT is responsible to provide the reliability evaluation metrics. In case of static fault modeling, TREAT automatically runs the same simulation for various injection time and fault activation periods and stores the values of user defined signals in separate files, called faulty runs. TREAT also runs the simulation once without any fault activation and stores the values of user defined monitoring signals as a golden run. The result analyzer subcomponent compares the results of faulty and golden (faultless) experiments to present the reliability evaluation of the given 3D NoC design. This component reports the effect of psychical fault models which can be considered as evaluation metrics in TREAT. In dynamic fault injection process, there is no need to repeat the faulty experiments for several times since faults are accurately injected wherever and whenever they should happen by profiling the run time system. In this cases the effects of them on the functionality of different components of 3D NoC are reported as reliability evaluation metrics. Both static and dynamic fault injection processes in TREAT are explained in the following sections.

5.2 Static Fault Models in TREAT

Static fault models are employed to disrupt the values of user defined signals with predefined timing characteristics. Fault model injection time and life time are two major of these timing characteristics. For TREAT, static fault models are activated with a random uniform distribution function. TREAT guarantees to inject faults when the target system is stable. The life time of the static fault models are also defined by a random function with exponential distribution. The average value of this exponential distribution is requested from the user. TREAT runs the experiment for each of the static fault models for the predefined number of times specified by the user. In each iteration, the random function chooses different injection time and life time for the chosen fault model. The accuracy of reliability evaluation increases as more the number of simulations are repeated. However, there is a trade-off between the accuracy of the static fault modeling and simulation time.

Figure 5B:
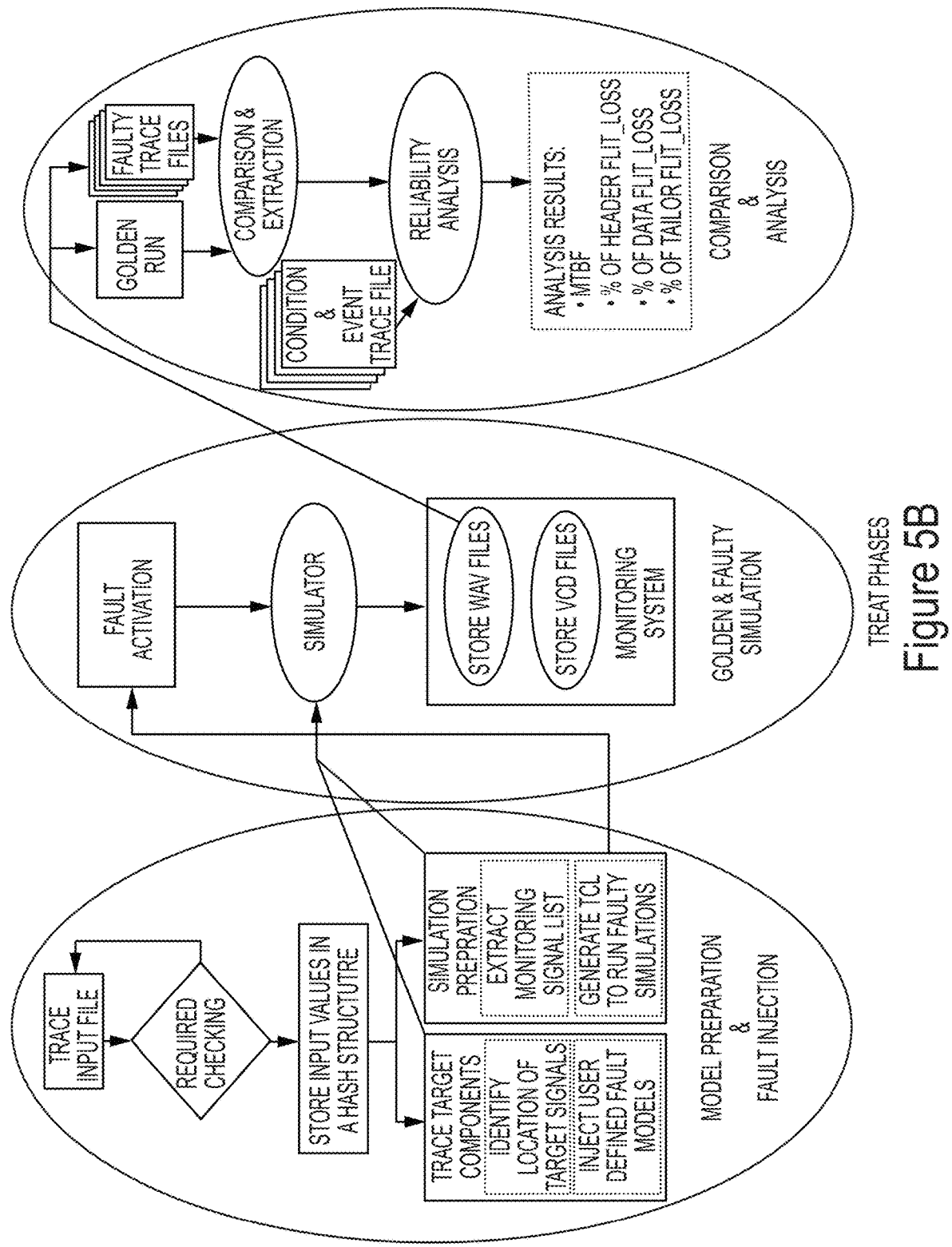
FIG. 5B illustrates the three phases for the reliability evaluation of static fault models.

FIG. 5B illustrates the three phases for the reliability evaluation of static fault models. These phases include: (1) Model Preparation and Fault Injection, (2) Golden and Faulty Simulation, and (3) Comparison and Analysis, which are further discussed in the following subsections.

5.2.1 Model Preparation and Fault Injection

In this phase, the user input values are traced and stored in a hash data structure. This hash data structure is used several times during the fault injection process. TREAT warns if there is a conflict in the user defined input values. For example if the total number of requested faults in a component is less than the requested number of fault models for the same component, TREAT prompts a warning message. Or if different fault models are defined to affect the same signal, TREAT notifies the user.

TREAT uses the input values to generate tcl commands for cadence incisive simulator tool as a part of automatic fault injection process. These commands can be simply replaced in case of applying any other simulator tools. It also provides the corresponding tcl commands to profile the user defined monitoring signals. In addition to simulation preparation files, the fault models are also inserted into the given Verilog models of the 3D NoC. TREAT recognizes the faulty signals and then inserts fault models differently based on how they are assigned in the target Verilog models. In other words, it uses different fault injection methods for concurrent and sequential structures to support Verilog syntax rules.

TREAT keeps track of different sequential block statements to assure the same requested signal is infected during the fault injection process. Also if there are multiple assignments for a given signal under different conditions inside sequential statement, all of them are infected with the same fault. For example if the given signal tx is assigned with different values inside different case statements they are all infected with the same fault if signal tx, is selected by user. With this consideration the effect of faulty signal is evaluated regardless of the 3D NoC operation, resulting in more accurate reliability evaluation reports.

Furthermore, TREAT is able to choose the victim indices of faulty vector signal or it uses the predefined indices by the user. In case of random index selection, TREAT is smart enough not to choose the same index numbers randomly. For example, if the vector data with the size of 32 bit is chosen as a faulty vector, TREAT will choose randomly 4 different index numbers by keeping track of all the previously generated random numbers.

5.2.2 Golden and Faulty Simulation

In this phase a script file is called to run the whole simulation process for both faulty and golden runs. This script actually employs the generated tcl commands in previous phase of fault injection. TREAT profiles the user defined monitoring signals in two different database formats: Simulation History Manager (SHM) and Value Change Dump (VCD) formats databases. In both of these data base formats, all the signals' events with their event time are captured. The size of these files depends on the simulation time and also the number of events on them. TREAT uses tcl commands to store only the signals which are defined by the user to save both simulation time and memory.

The VCD file is actually an ASCII file which includes header information, variable definitions, and the value changes for specified variables in a given design. The value changes for a variable are given in scalar or vector format, based on the nature of the variable. TREAT is embedded with an open source VCD parser which is able to interpret the value, time, and hierarchy of specified signals. The alternative database is the SHM one, which is a cadence proprietary waveform database, to store the selected signals. The current version of TREAT uses SHM database to report reliability evaluation reports. However, as discussed it also provides the VCD files and their interpreted versions for the same monitoring signals if needed.

5.2.3 Comparison and Analysis

The last phase of TREAT provides the reliability analysis reports of the given 3D NoC design. In this phase, the SHM database of the faulty runs are compared with the golden run. This comparison is accomplished by running another script in which the values of monitoring signals are compared automatically. To recognize whether the signal values mismatch are because of timing delays or not, depends on the method of 3D NoC implementation. In other words, in some cases the signal value mismatch can be resolved by applying a fixed time shifting operation. If the given model of 3D NoC is able to provide a unique ID for each flits, TREAT is able to distinct the packet latency failure from the other types. But the current version of TREAT reports an inconsistency of two simulation experiment, if the signal values are not the same or they have same values in different timing slots.

TREAT is able to report analysis results such as: MTBF, % header flit loss, % data flit loss, and % tail flit loss. More specifically, it can report these values in different granularity for each signals, module, or the whole system. It is also able to differentiate these values for each experiment or fault models.a Providing the MTTF values is also possible by TREAT, but MTTF values are defined for none repairable systems (permanent fault modeling). Because of the importance of transient faults in future many-core systems, only transient fault model implementation are reported in this experiment; MTTF values are not reported as reliability analysis results.

As discussed in Chapter 4 reporting other reliability metrics such as packet latency needs to keep track of all the flits and depends on the test bench of the 3D NoC model. THENoC is able to report these values but current version of TREAT does not provide other reliability metrics independently.

5.3 Dynamic Fault Models in TREAT

In addition to different static fault models, one of the advantages of TREAT compared to other fault injector tools is the capability of supporting dynamic fault models. With this methodology, the accurate location and time are determined for fault injection process based on the dynamic monitoring of the system. In other words, for dynamic fault models only a single experiment is needed. This feature compresses the simulation time dramatically with high level of reliability evaluation accuracy. Capacitive TSV-to-TSV coupling is the dynamic fault model supported by TREAT, which is discussed in this section.

Figure 5C:
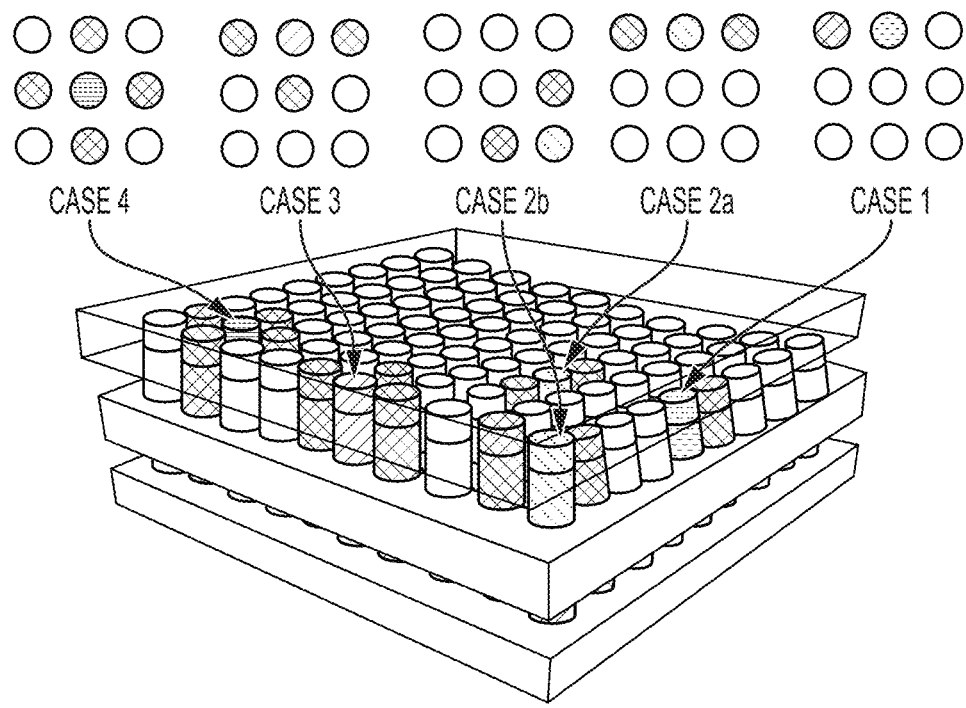
FIG. 5C illustrates all the possible locations of a victim TSV (each in a different color) relative to active adjacent (shown in gray).

TSV-to-TSV coupling is a major source of crosstalk between adjacent TSVs. Looking at the cross-sectional view of a TSV bundle, it is assumed for the sake of analysis that mutual coupling is due only to neighboring TSVs that are directly adjacent, not diagonally adjacent. This is because the distance of diagonal TSVs is larger than adjacent TSVs, which is also assumed by other research groups. The presented Capacitive TSV-to-TSV Coupling (CTTC) categorizations is based on this assumption. On the other hand, the number of neighboring TSVs can vary depending on whether they are located in the middle or on the border of TSV meshes. FIG. 5C illustrates all the possible locations of a victim TSV (shown in patterns: continuous horizontal lines, dashed horizontal lines, continuous slant lines, dashed slant lines) relative to active adjacent (shown in pattern: crossed lines). The crossed line pattern and other patterned TSVs in FIG. 5C represent aggressors and victims, respectively.

In this Section an analysis of the current flow in TSVs is first presented which is the fundamental concept for proposed dynamic fault model. Then the circuit-level model of TSV used for this experiment in addition to classification of CTTC effects are explored. This classification is based on the maximum capacitive coupling by a victim TSV, while the value of the resulting crosstalk depends on the TSV current flow direction. Finally, the CTTC effects on timing requirements of the circuits as well as dynamic fault modeling process in TREAT are discussed.

5.3.1 Current Direction in TSV

Figure 5D:
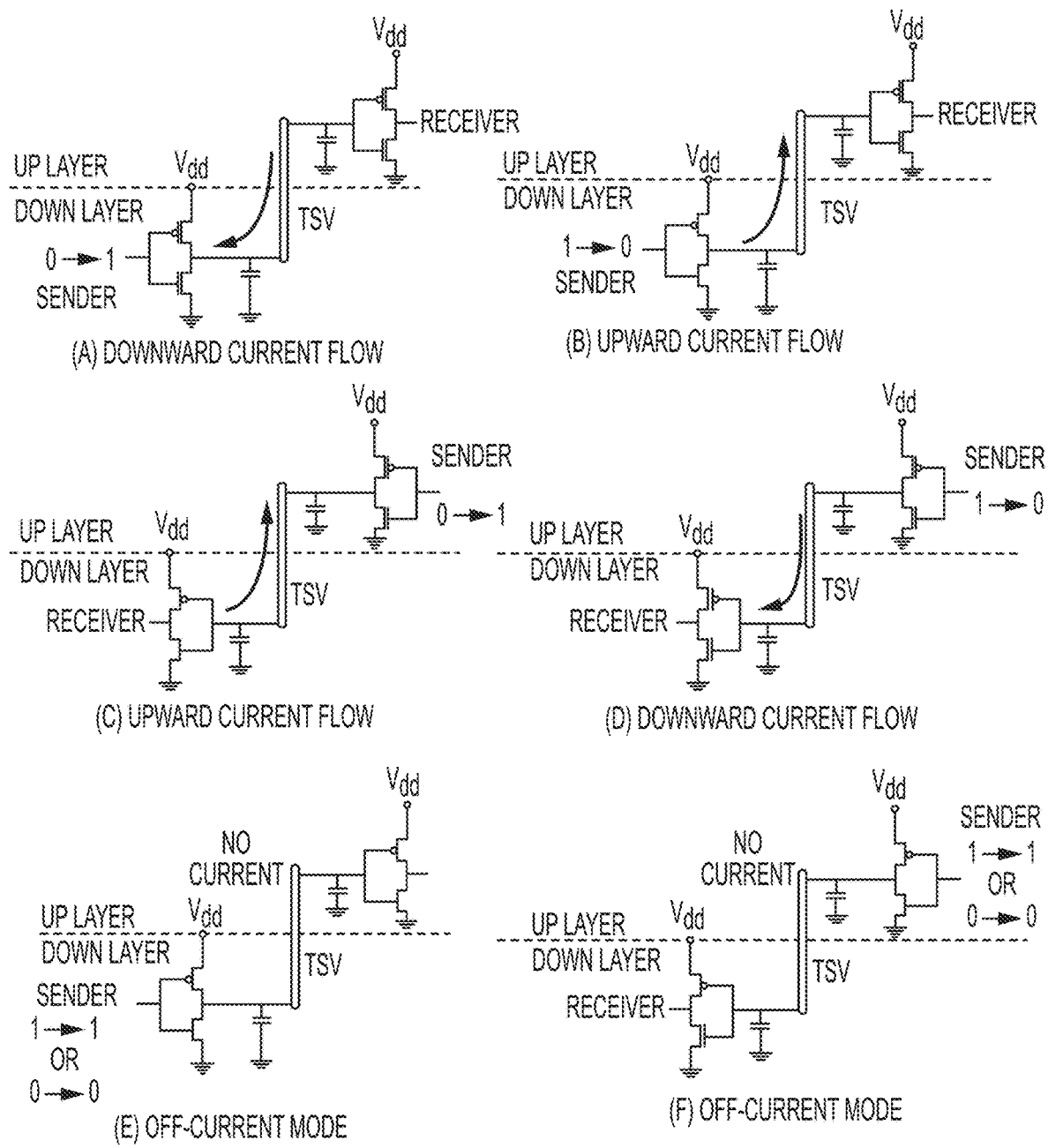
FIG. 5D illustrates the six possible cases of current flow direction in TSV.

In order to characterize the effects of capacitive and inductive coupling between TSVs used in a CMOS digital circuit, it is first necessary to characterize the direction of current in a given TSV, based on the direction of the data signal and the type of data transition present. The six possible cases are illustrated in FIG. 5D. According to these cases a TSV has three possible current flow directions including: Upward ($\otimes$), Downward (e), and No-current ( ) For the cases where the data is transmitted from an upper to a lower layer, case (a) in FIG. 5D shows that the TSV current is conducted downward if its voltage makes a high-to-low transition; case (B) in FIG. 5D shows that the TSV current is conducted upward if its voltage makes a low-to-high transition. For the cases where the data is transmitted from an upper to a lower layer, the currents are in the opposite direction of those indicated in FIGS. 5D, (A) and 5D, (B), as shown in FIGS. 5D, (C) and 5D, (D), respectively. If there is no output data transition on the TSV, then no current will conduct, as shown in FIGS. 5D, (E) and 5D, (F). This is because there is no potential difference between two sides of a TSV. In the rest of this disclosure a TSV without an electric current is called an inactive TSV. Furthermore, in the following subsections, all possible TSV current flow configurations resulting in different inductive and capacitive parasitic noises are used to classify CTTC.

5.3.2 CTTC Circuit-Level Modeling

A framework consisting of multiple TSVs at circuit-level using Synopsys HSPICE is implemented in this experiment, to study the sources of CTTC effect. Developing TSV simulation framework allows extracting the realistic accurate CTTC effect for different parameters. The coupled TSV structure is modeled as a lumped RLC circuit. The lumped RLC circuit circuit-level model can be employed for this experiment.

Figure 5E:
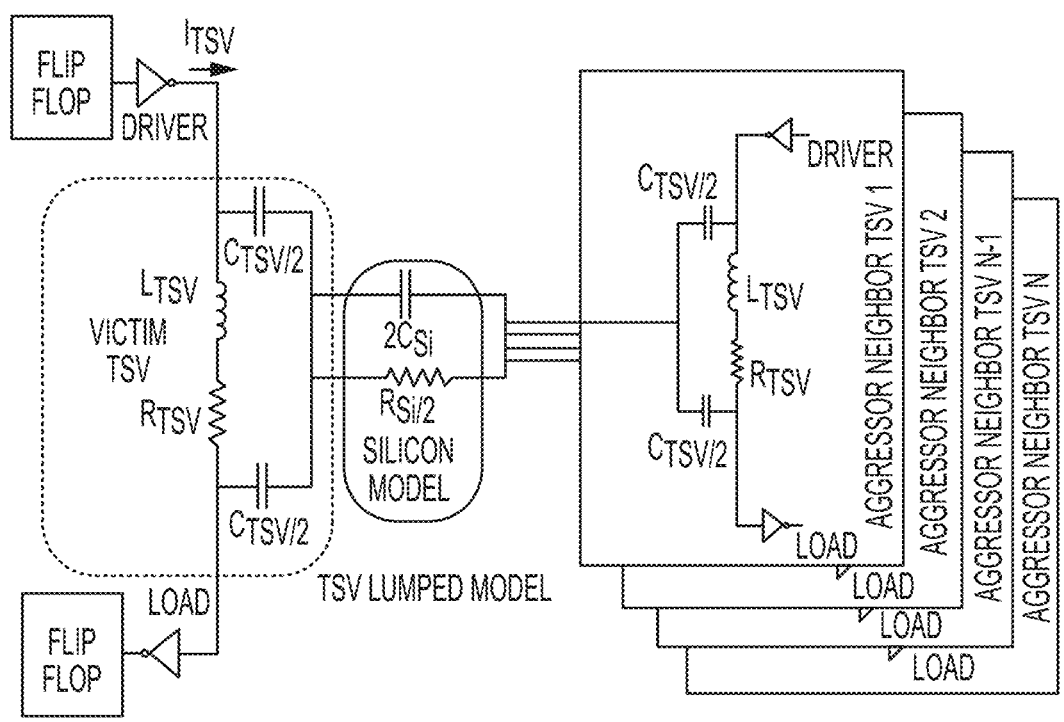
FIG. 5E illustrates the circuit-level model of TSV.

FIG. 5E illustrates the circuit-level model of TSV applied in this experiment, in which $R_{TSV}$, $L_{TSV}$, $R_{si}$, $C_{si}$, and $C_{TSV}$ represent TSV resistance, TSV inductance, substrate resistance, substrate capacitance, and oxide capacitance, respectively. The value of the circuit elements are modeled based on physical and operational parameters of TSVs such as oxide thickness, silicon substrate height, TSV radius, and TSV pitch and by material properties like dielectric constant and resistivity. The actual values of these physical parameters are extracted from ITRS reports. The thermal impact is also considered in the TSV model. Furthermore, since the parasitic capacitive effect of a diagonal neighboring TSV is less than ⅓ of an adjacent TSV neighbor, only the effect of adjacent TSV neighbors are examined in this experiment. However, our fault model can be expanded to support more TSVs as well.

In this analysis, a TSV is connected to the output of an inverter (driver) on one side and to the input of another inverter on the other side (load). These inverters are needed to record the propagation delay and its dependency to parasitic capacitive noises. Two flip-flops, one before the driver inverter and one after the load inverter are inserted to capture the parasitic capacitive effects on timing requirements of the circuit. The input data pattern with output data pattern to catch the parasitic capacitive effects are compared.

Predictive Technology Model (PTM) FinFET transistor models are employed to implement inverters and flip-flops. Then a comprehensive set of simulations is performed on the developed TSV framework. The impact of operational frequency, temperature, technology, TSV radius, and TSV oxide thickness are investigated which is discussed in 5.3.4. SPICE model of TSVs are employed to examine the CTTC effect among a victim and its aggressor TSVs.

The range of all of these parameters are also chosen according to ITRS and industrial interconnect reports. The minimum TSV depth normally is about 40-100 µm which is projected to reach 30-40 µm by 2018. A copper TSV in standard Si-bulk technology is expected to have minimum via diameter of 2-4 µm, 1:20 minimum aspect ratio, 4-7 µm minimum via pitch, 0.5 µm oxide thickness ($t_{ox}$), and there can be up to 2-8 die per stack. TSV diameters and pitches are two to three orders of magnitude larger than transistor channel gate lengths. Furthermore, in order to reach a high yield rate, manufacturers typically impose a minimum TSV density in order to maintain the planarity of the wafer during chemical and mechanical polishing. For example, Tezzaron requires that there be at least one TSV in every 250 µm×250 µm area.

Figure 5F:
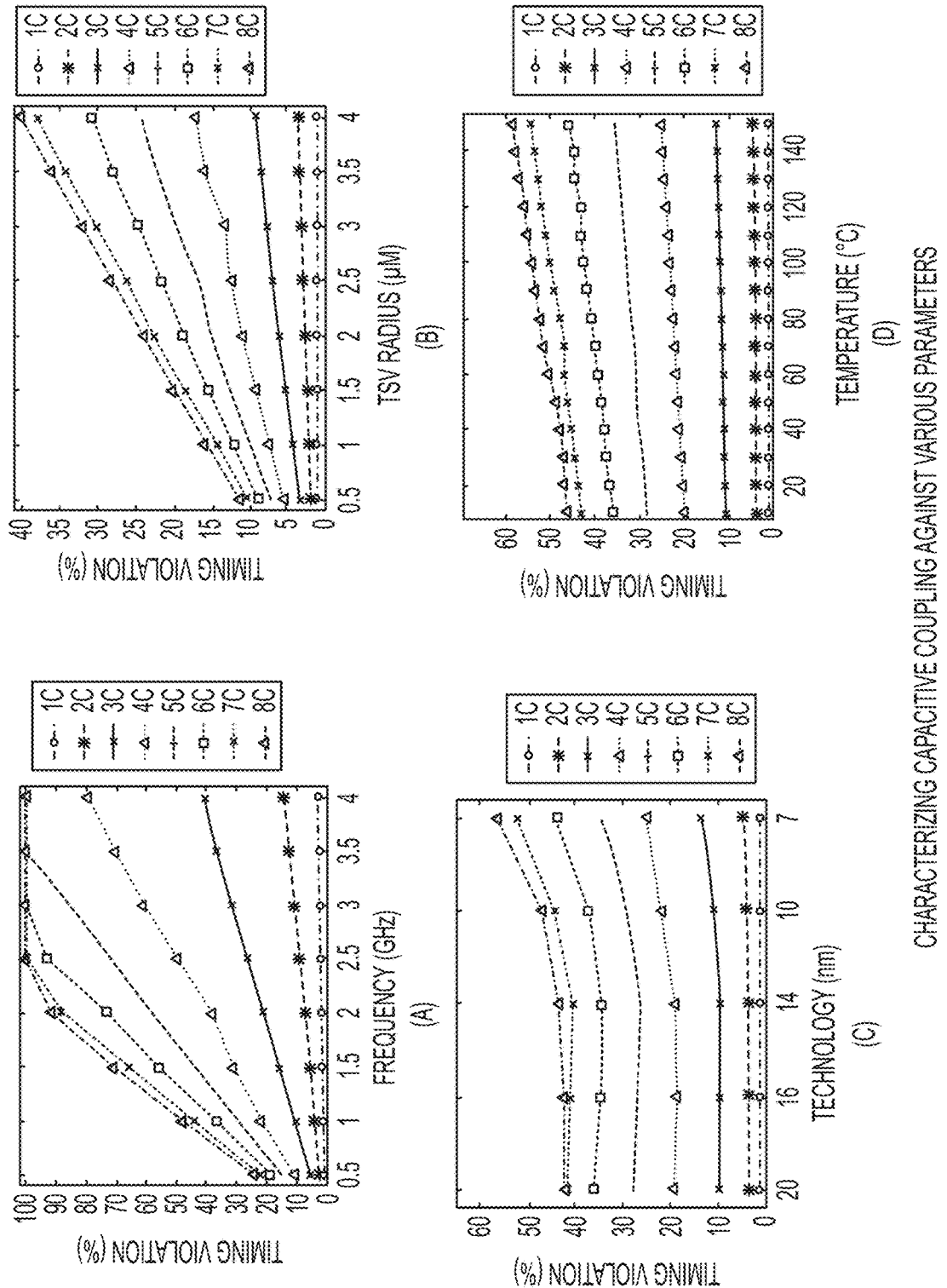
FIG. 5F illustrates the characterization for a range of operational frequency and different TSV parameters.
Figure 5F:
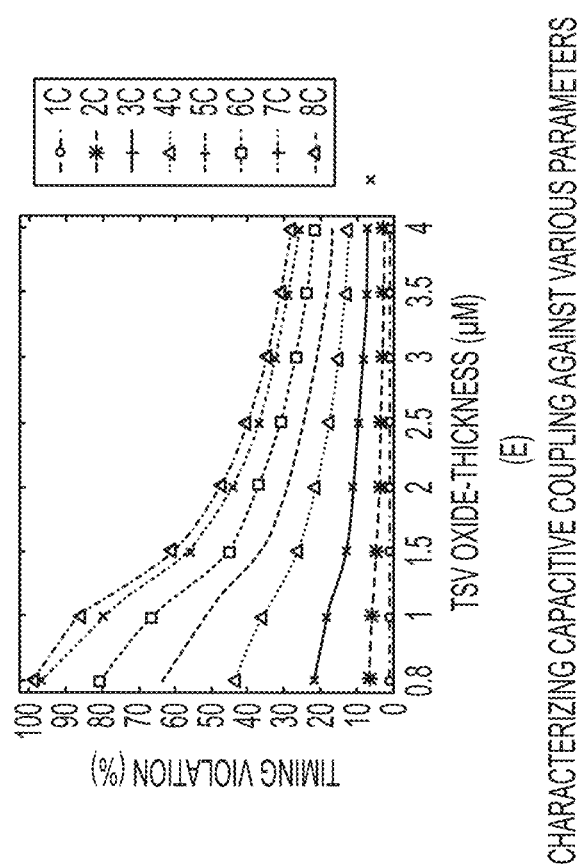

The characterization for a range of operational frequency and different TSV parameters is elaborated in FIG. 5F. In all of these graphs the vertical axis is the additional delay, relative to the clock period, caused by the parasitic capacitive coupling, which is given by:

$$TV = \frac{APD - NPD}{T_{clk}} = f_{clk}(APD - NPD) \quad (5.1)$$

where APD refers to Actual Path Delay (when there is CTTC), NPD refers to Nominal Path Delay (when there is no CTTC), $T_{clk}$ is clock period, and $f_{clk}$ is the clock frequency.

In FIG. 5F, (A), increasing clock frequency does not have tangible effect on the CTTC severity, but TV is increasing linearly for larger operational frequencies. This is because tighter timing requirements are needed in higher operational frequencies. For a TSV pair with a constant pitch, as the radii of the TSVs increase, more capacitive coupling is observed; this results in larger TV values as shown in FIG. 5F, (B). As the technology scales down the input capacitance of the flip-flop seen by the TSV decreases, resulting in larger coupled voltage on the TSV (shown in FIG. 5F, (C)). The permittivity of the silicon rises as a weak linear function of temperature, which results in an increase in capacitive coupling, also increasing coupling and TV, as depicted in FIG. 5F, (D). Finally, as shown in FIG. 5F, (E), thicker oxide provides better isolation and reduces the value of capacitive coupling, resulting in less capacitive coupling and consequently less TV.

5.3.3 CTTC Effect on TV

Having analyzed and modeled the CTTC, the effect on realistic data traffic using PARSEC benchmark has been evaluated. This realistic data benchmark is run on the circuit-level model of 64 TSVs for various configurations. The TV values on the receiver side of each TSV is captured. A configuration is a set of physical parameters including TSV radius, length, pitch, oxide thickness, and process technology, operating frequency, and temperature. The configuration values are selected in a way to cover different CTTC effects.

Figures 5G, 5H:
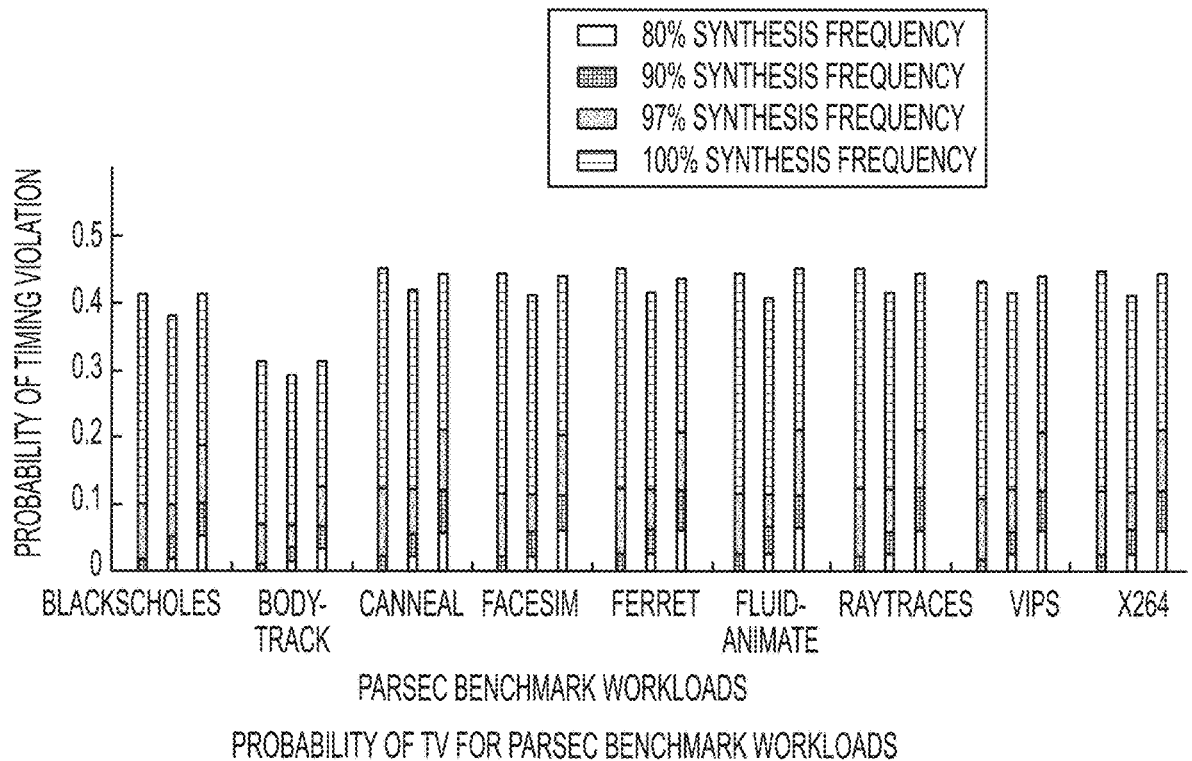
FIG. 5G shows the probability of TV for PARSEC benchmark workloads for three different TSV configurations.
FIG. 5H shows an example of current matrix generation process for the given data bits values in a mesh of 3×3 TSVs.

FIG. 5G shows the probability of TV for PARSEC benchmark workloads for three different TSV configurations. Each group of three bars in this figure from left to right refer to configurations A, B, and C in Table 5.2.

In addition, the TV probabilities are reported for different percentage of maximum synthesis frequencies. The results show that, the percentage of TV for lower synthesis frequency drops down for all workloads, however, an average of 40% TV at 100% synthesis frequency still confirms the importance of CTTC analysis for TSV-based 3D-NoC architectures. Furthermore, the result of FIG. 5G shows how CTTC limits the maximum operational frequency of 3D NoCs. The reported values in FIG. 5G are based on running PARSEC benchmarks under different conditions which are listed in Table 5.2. The reason is that the propagation delay of TSVs are extended as an effect of CTTC. In other words, the circuit is able to handle more percentage of TV with lower operational frequency.

5.3.4 CTTC Classification

A capacitive coupling classification is presented here based on the severity of CTTC parasitic values which depends on TSVs' current flow. On the other hand, the current flow direction of a TSV is data-dependent as discussed in Subsection 5.3.1; consequently CTTC depends on the data pattern. The previous ($Data_{i-1}$) and current ($Data_i$) data bit values of a TSV's driver should be evaluated in order to identify the current flow of each TSV. Assuming the effect of adjacent neighbor TSVs is higher than diagonal ones, the capacitive coupling between an adjacent pair of TSVs is represented in this experiment, by 0C (if they both have the same current direction), 1C (if one of them is inactive and the other is active), 2C (if they are both active with reverse current direction). The total capacitive coupling voltage on the victim TSV is equal to the sum of voltages coupled by each aggressor on the victim TSV. Therefore, the total CTTC can be quantified as:

$$CTTC_{tot} = \Sigma_{i=1}^{N} |d_{vic} - d_{agg_i}| \quad (5.2)$$

where $CTTC_{tot}$ is the total capacitive coupling factor on a given TSV (which is used in categorizing capacitive coupling types in 7), N represents the number of adjacent aggressors for a victim TSV, and d is the current direction for the corresponding TSV. The current direction d in Equation 5.2 represents an upward current with +1, a downward current with −1 and no-current with 0.

FIG. 5H shows an example of current matrix generation process for the given data bits values in a mesh of 3×3 TSVs. It also shows the generated CTTC factors for all TSVs, caused by their adjacent neighbors. $CTTC_{tot}$ factor on the victim TSV (situated in the middle one) for given data bit values in FIG. 5H is equal to 5C, which is the sum of generated capacitive coupling values by each adjacent TSV neighbors.

There are $3^5=243$ possible TSV arrangements for 5 TSVs with three possible current flows, resulting in different capacitive coupling values from 0 C to 8 C. Many of these 243 arrangements generate the same capacitive coupling values, which are quantified in terms of their frequency and probability of occurrence in Table 5.1. A sample pattern resulting in each capacitive coupling is also shown in this table. The maximum $CTTC_{tot}$ in this representation is equal to 8 C, if the middle TSV has reverse current flow comparing to all of its neighbors, as shown in the most right column in Table 5.1.

In addition, these capacitive coupling values can disrupt the timing requirement of a 3D IC based on the operational and TSV physical parameters. This issue, called Timing Violation (TV) in this experiment, is defined as additional delay to TSV lines caused by parasitic coupling capacitance. The effect of CTTC for each of the capacitive coupling types presented in Table 5.1 are characterized at the circuit-level model.

5.3.5 CTTC Fault Model

Circuit-level simulation takes much longer than system-level simulation. This approach considers the effects of circuit-level representation of CTTC for a system-level platform to reduce simulation time while maintaining accuracy. This operation is performed at runtime by monitoring the data signals that are being transmitted through TSVs in order to identify where and when potential faulty TSVs occurred. Next these faulty candidate TSVs are triggered with the observed effect at the circuit-level of CTTC fault.

Figure 5I:
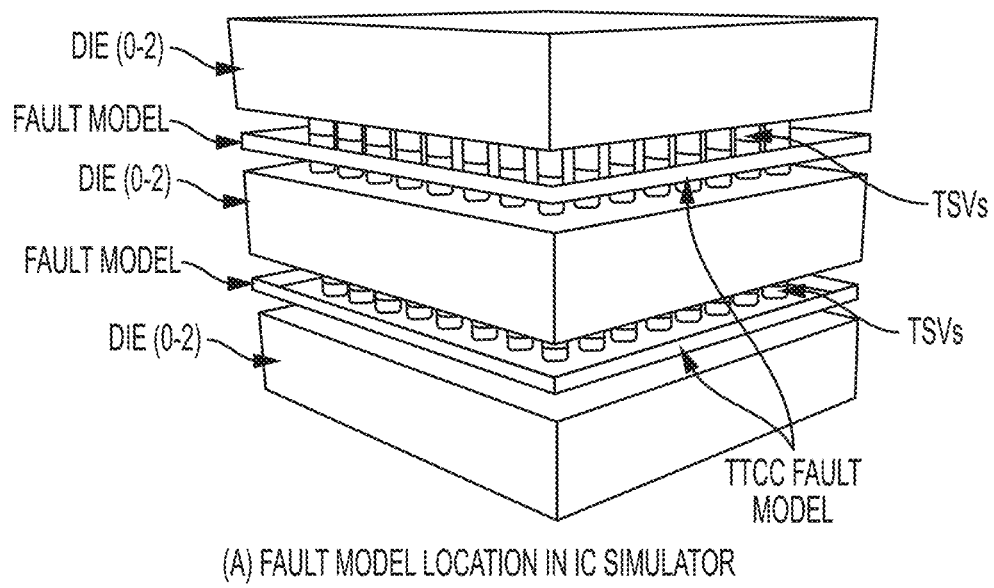
FIG. 5I shows the 3D-NoC framework and the proposed CTTC fault model.
Figure 51:
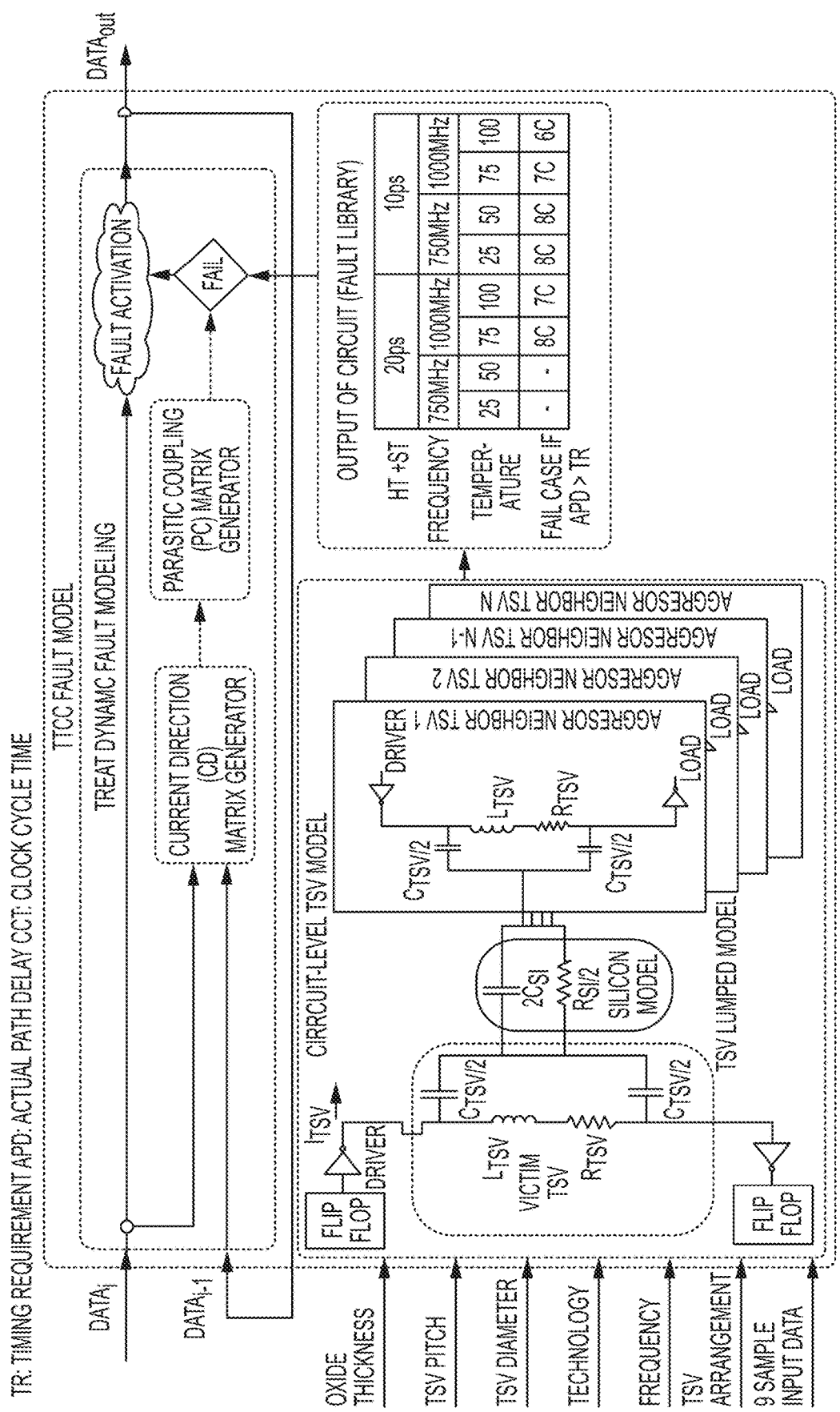

FIG. 5I shows the 3D-NoC framework and the proposed CTTC fault model. The fault model is envisioned to be employed as an intermediate component among TSVs connecting routers in different dies, as shown in FIG. 5I, (A). This fault model does not affect the functionality of 3D-NoC; it only decides the time and location of fault activation through the TSVs based on data input patterns and the provided fault library at the circuit level. FIG. 5I, (A) depicts the functionality of the proposed fault model in details. The input parameters of the circuit-level model are TSV arrangement configuration (number of rows and columns) connected to 3D-NoC, operating frequency, process technology, silicon oxide thickness, TSV-to-TSV pitch, TSV length, and TSV diameter. The output of this model is a table, which shows the corresponding parasitic capacitive factors violating the timing requirements for each configuration. An example of the fault library table is shown in FIG. 5I, (B). This output is used as a fault library in TREAT, in which the parasitic capacitive factors are extracted by comparing the transmitted ($Data_{t-1}$) and ready to transmit ($Data_t$) data bits through TSVs. With this configuration the CTTC fault model decides intelligently and accurately when and where a CTTC fault should be activated. The steps of this methodology are as follows:

Step.0 Configuration and Setup: Prior to instantiating and utilizing the devised CTTC fault model, first it needs to be configured and setup. In this phase, input parameters of the model such as the TSV length, TSV diameter, TSV pitch, oxide thickness of TSVs, process technology, frequency, and temperature are specified. Frequency and temperature parameters are defined as a range with a specific granularity to support dynamic changes at run-time. The other inputs of the circuit-level model is all the possible data inputs resulting in 9 parasitic capacitive factors from 0 C to 8 C.

Step.1 Capturing transferred data: In this step, the data bits transferring through TSV links (Up/Down port) are captured as the input of fault model at run-time. These captured data bits are adjusted if the fault activation condition is met.

Step.2 Data analysis to determine the TSV current directions: At this step, the current directions of all TSVs are identified. The previous ($Data_{t-1}$) and current ($Data_t$) data-bit values of a TSV's driver are profiled and compared in

TABLE 5.2

| Different configuration of TSV arrays | | | |
|---|---|---|---|
| Configuration | A | B | C |
| radius μm | 3 | 3 | 2 |
| length nm | 15 | 20 | 25 |
| pitch μm | 9 | 9 | 6 |
| $T_{ox}$ μm | 3 | 2.5 | 1 |

TABLE 5.2-continued

| Different configuration of TSV arrays | | | |
|---|---|---|---|
| Configuration | A | B | C |
| Technology nm | 20 | 16 | 10 |
| Max Freq. GHz | 1 | 1 | 1 |
| Temperature ° c. | 50 | 75 | 100 |

TABLE 5.1

| CTTC categorization with occurrence probability of each type | | | | | | | | | |
|---|---|---|---|---|---|---|---|---|---|
| Types | 0C | 1C | 2C | 3C | 4C | 5C | 6C | 7C | 8C |
| Sample pattern | ⊙⊙⊙ ⊙ | ⊙⊙⊙ ○ | ⊙⊙⊙ ⊗ | ⊙⊙⊙ ⊗ | ⊙⊙⊗ ⊗ | ⊙⊙⊗ ⊗ | ⊙⊙⊗ ⊗ | ⊙⊗⊗ ⊗ | ⊗⊗⊗ ⊗ |
| Occurrence frequency | 3 | 16 | 44 | 64 | 54 | 32 | 20 | 8 | 2 |
| Occurrence probability | 0.01 | 0.07 | 0.18 | 0.26 | 0.22 | 0.13 | 0.08 | 0.03 | 0.01 | order to recognize the current direction of each TSV. The output of this stage is stored as Current Direction (CD) matrix.

Step.3 Determine the induced capacitive coupling case for each TSV: Looking at the current direction of each TSV and its adjacent neighbors, in this step an appropriate capacitive case is assigned per TSV. Now the fault library generated at pre-runtime is used to look up the timing delay associated for the corresponding case and is recorded as Parasitic Coupling (PC) matrix.

Step.4 Map circuit-level faults to system level delay fault/failure for each TSV: Considering the timing requirement parameter of the destination receiver flip-flop (input buffer of receiver router), at this point, using PC matrix, the decision for faulty TSVs is made and an appropriate fault is applied to the detected faulty TSVs. If the reported timing delay associated with the capacitive case violates the timing requirement of the receiver logic, then the data bit is assumed faulty. The fault type, depending on the specified delay tolerance for the circuit, can be either a "delay fault" or a "glitch fault". However, if the specified timing requirement of flip-flop tolerates the undesirable propagation delay because of CTTC, then this fault will not have any impact and it is ignored in the model. Now the data is ready to be forwarded towards destination. Also a copy of last transmitted data (flit) is maintained for subsequent current direction determination.

CHAPTER 6: TREAT EVALUATION

A case study is presented in this chapter to show the capability of TREAT in reliability evaluation of a 3D NoC platform. A cycle-accurate simulation, on the 64-node 3D mesh NoC is performed in this experiment. The parameterizable THENoC (see Chapter 3) simulator is applied as the target system in this experiment. More details about the simulation parameters such as the network and packet properties are summarized in Table 6.1.

The fault injection characteristics and experimental results for both static and dynamic faults are reported, separately. As discussed in Chapter 5 these simulations are executed through separate processes. In case of static fault injection, for each of the injected faults the simulation is repeated for user defined number of times, and they are all compared with the result of golden run. But, in dynamic fault injection a single experiment for each fault is enough to analyze the effect of capacitive coupling on functionality of TSVs in terms of TV (defined in Chapter 5).

TABLE 6.1

System configuration parameters

| Parameter | Value |
|---|---|
| Topology | 3D fully connected Mesh |
| Network Size | (4x4x4) 64 Routers |
| Flit Size | 32 bits |
| Buffer Depth | 8, 16-bit entries per port |
| Switching Scheme | Wormhole |
| Routing Algorithm | Dimension ordered routing |
| Simulator | THENoC [117] |
| Frequency | 1 GHz |
| Simulation time | 10000 ns |

6.1 Static Fault Injection Parameters and Experimental Results

As discussed in Chapter 5, TREAT interprets the user defined fault injection characteristics in order to launch the static fault modeling evaluation through THENoC simulator. The fault injection properties first discussed in this section and then the reliability evaluation metrics reported by TREAT are presented.

6.1.1 Static Fault Injection Characteristics

Transient faults can be the major cause of failure in systems and they occur more frequently than permanent faults. This experiment evaluates the effects of transient faults although TREAT is able to model permanent fault by updating the life time with the total running time value. This experiment is actually based on injection of 2048 transient faults in various points of THENoC. Repeating each experiment for 5 times results in 10240 transient fault injection process.

In this experiment, THENoC frequency is defined as 1 GHz, and fault life time for each fault model is defined by an exponential distribution with average of 5 ns. The fault injection process is executed when THENoC is stable. In this experiment, THENoC is simulated for 10000 ns and the fault models are injected randomly with uniform distribution in the simulation time gap between 1000 ns to 9000 ns. The fault models are distributed through major components of THENoC simulator without affecting the functionality of 3D NoC platform unless they are activated. The fault locations and their quantity is chosen based on complexity of each component and major physical fault causes in each component (as discussed in Chapter 4).

TABLE 6.2

Fault injection distribution

| Fault model | Buffer | Header extractor | Swatch | Routing unit | Tailor detector | Arbiter |
|---|---|---|---|---|---|---|
| Bit-flip | 50% | — | — | 28.5% | — | 25% |
| Stuck-at-0/1 | 12.5% | 50% | 87.5% | 28.5% | 50% | 25% |
| Delay-fault | 25% | 50% | 12.5% | 28.5% | 50% | 25% |
| Open-circuit | 12.5% | — | — | 14.25% | — | 25% |
| Total fault distribution though components | 25% | 6.8% | 25% | 25% | 6.8% | 12.5% |

Table 6.2 summarizes the percentage and location of injected faults through different components of THENoC for this experiment. As expected more portion of fault models are injected through the buffer, routing unit, and switch components of THENoC. Also no Bit-flip fault is injected through the header extractor, switch, and tail detector components since they are all composed of combinational circuits.

Furthermore, this experiment considers single fault effects although TREAT is also able to support multiple fault modeling with minimal modification of the function that is responsible to generate simulation commands. In other words, the fault models are activated and their effects are observed, separately.

6.1.2 Experimental Results

Figure 6A:
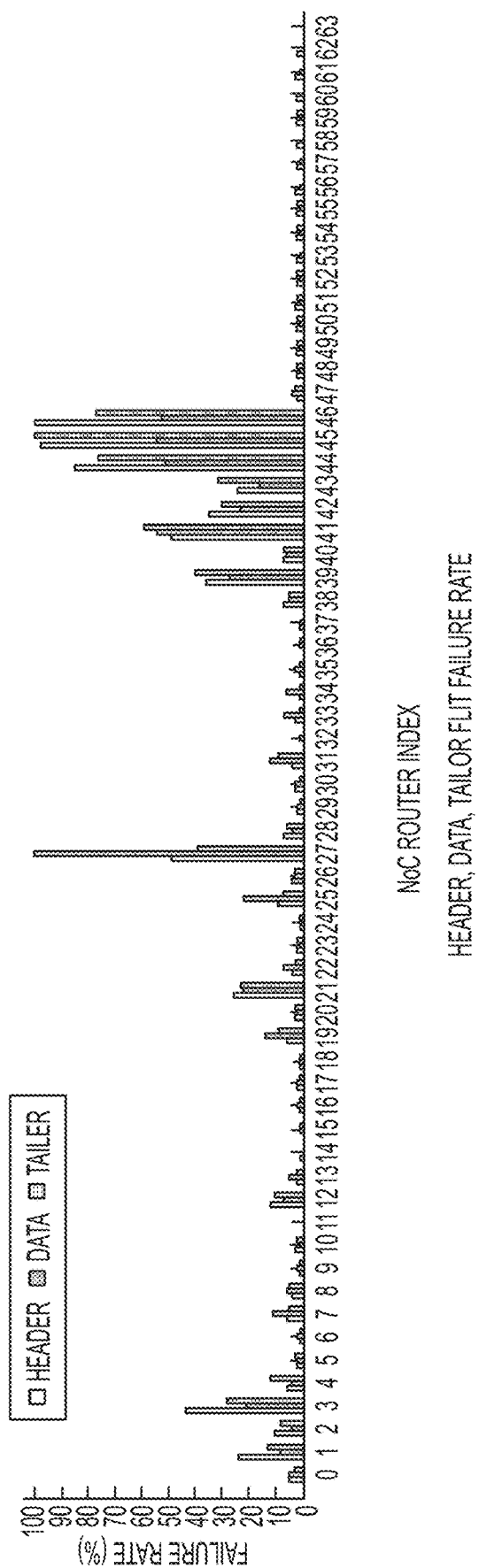
FIG. 6A presents the percentage of header, data, and tail flit loss for each router.

One of the capabilities of TREAT is to report the percentage of header, data, and tail flit loss for different level of granularities such as per router, per component, and even per signal. These values for each router are presented in FIG. 6A. The values in this figure are normalized to the maximum failed router. Different failure rate for header, data, and tail flits are reported for each router under running FFT traffic through THENoC, in this experiment. The reason is that the source-destination pairs of routers are not uniformly selected in FFT traffic. For example, in this experiment, no router send packet to any of the routers with index number higher than 48.

Figure 6B:
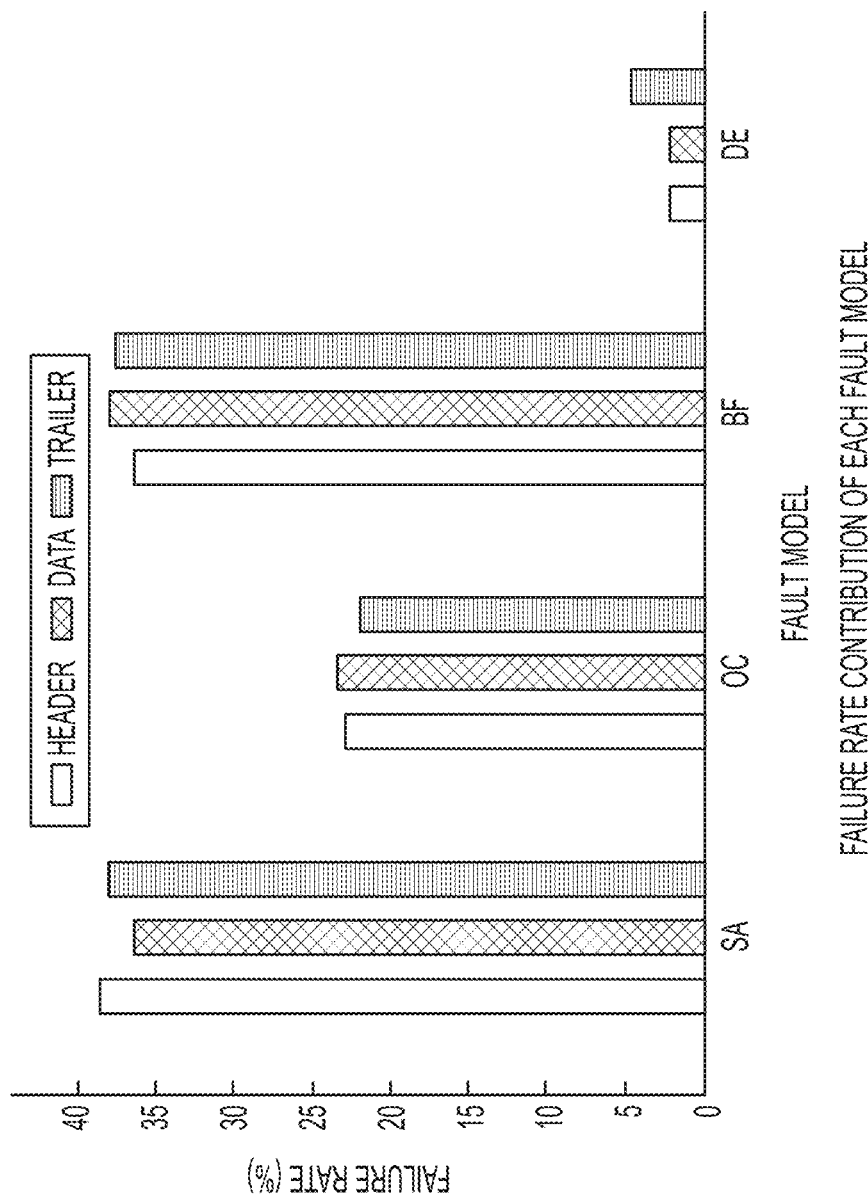
FIG. 6B presents the effect of each category of injected faults on the 3D NoC design and its components.

TREAT is also able to trace the input fault mapping table to categorize failure percentage of all flit types caused by each injected of fault models. With this fault mapping table, it is able to report the effect of each category of injected faults on the 3D NoC design and its components. These results are presented in FIG. 6B, in which SA is Stuck-at, OC is Open-circuit, BF is Bit-flip, and DE is Delay-fault. As shown in this figure, the importance of Bit-flip and Stuck-at logic-level fault models are higher than Open-circuit and Delay-fault in terms of header, data, tail flit loss rate. Although the reported experimental results depend on the running traffic pattern, but with this information a fault-tolerant designer is able to choose more efficient robust methods against major faults in some specific parts of the 3D NoC architecture.

Figure 6C:
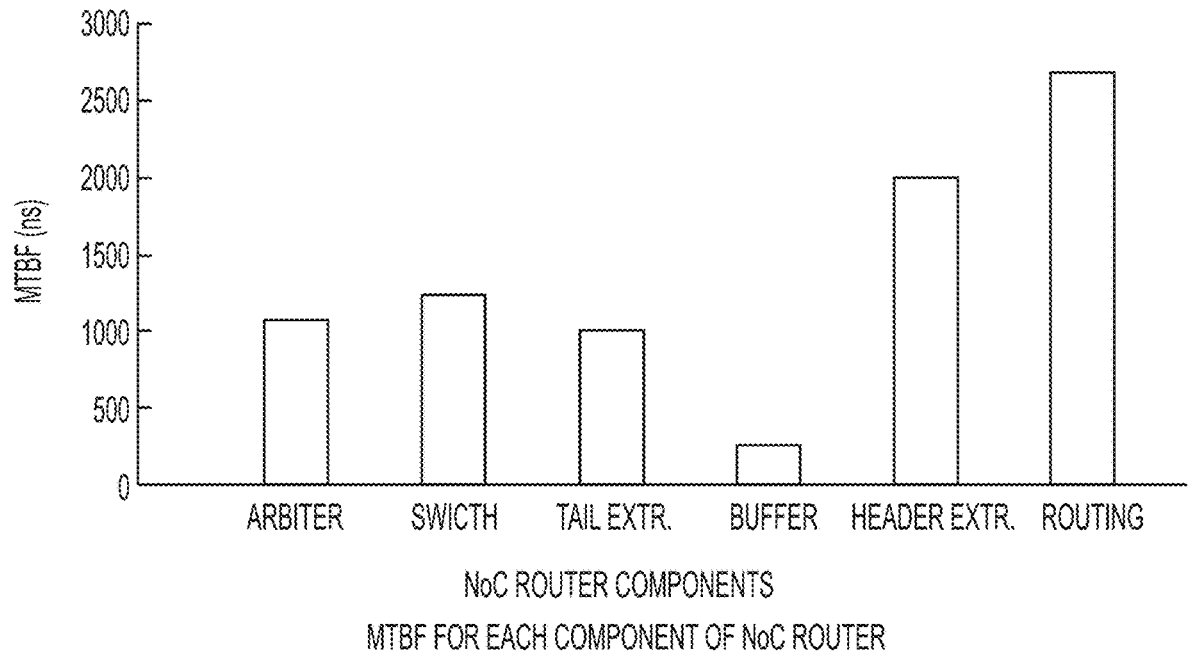
FIG. 6C reports the MTBF for major components of THENoC which are selected for the fault injection process.

The other capability of TREAT is to provide the MTBF for different level of granularities in 3D NoC design. FIG. 6C reports the MTBF for major components of THENoC which are selected for the fault injection process. According to the experimental results, the MTBF of buffer component is considerably less than the other components, which shows the necessity of fault-tolerant design for this component.

6.2 Dynamic Fault Injection Parameters and Experimental Results

TREAT is also able to inject CTTC faults as dynamic fault modeling in 3D NoC environment. In this section first, the accuracy of the proposed fault model is evaluated. Then, the rate of TV occurrences by running PARSEC benchmark traces in THENoC through vertical links is reported. Finally, the density of CTTC effects over TV parameter in a matrix of TSVs for a specific synthetic traffic is illustrated as the other output of TREAT. These reports are presented to show the capabilities of TREAT for dynamic fault injection evaluation. They are all major parameters for 3D-NoC designers to assess their design's sensitivity against CTTC under various TSV physical parameters and operating conditions accurately.

The proposed CTTC fault model is implemented as a dynamic fault model inside TREAT which is called during the data transmission through TSVs at runtime to locate and trigger the parasitic capacitive for the specific configuration of TSVs with the given physical parameters, as elaborated in Chapter 5.

Prior to running the simulation, each configuration is run in HSPICE and the result is passed as a static configuration library to the TREAT. By extracting the circuit-level results from HSPICE (fail cases) and analyzing current direction matrix, the fault model detects the CTTC fault and triggers the corresponding TSV on-the-fly. The fault model operation is detailed in Chapter 5 and is illustrated in FIG. 5I, (B).

6.2.1 Fault Model Accuracy

In order to demonstrate the accuracy of the proposed fault model, a comparison is made with a crosstalk fault model. These faults are activated with the uniform random distribution. The comparison shows that the accuracy of conventional fault model for TSVs is substantially insufficient.

First, TREAT is used to profile the number of fault occurrences for a TSV bundle using the proposed CTTC fault model under running random traffic. Then, using conventional fault model, the 3D-NoC simulation is run for 10000 iterations while in each experiment, faults are injected randomly across the TSV bundles. These simulations are repeated with different configurations, where a failing case is the result of parasitic capacitive with a minimum value of 8 C, 7 C, 6 C, 5 C, 4 C, and 3 C capacitive coupling values. In random fault injection, the reported probability of each case in Table 5.1 is employed as a parameter for random function generation process. For example, if 6c parasitic coupling results in failure based on the circuit-level simulation for a given configuration, the failure probability of a TSV in random simulation will be equal to the sum of occurrence probability of 8 C, 7 C, or 6 C cases which is 10/81 (as reported in Table 5.1). For a fair comparison, the occurrence probability of capacitive coupling higher than 4 C and 6 C for TSVs on the corner and boundaries in a TSV bundle are also extracted.

Finally the results of these two set of experiments are compared to measure the reliability analysis inaccuracy of conventional random fault injection in modeling the CTTC effects in 3D NoC environment.

Figure 6D:
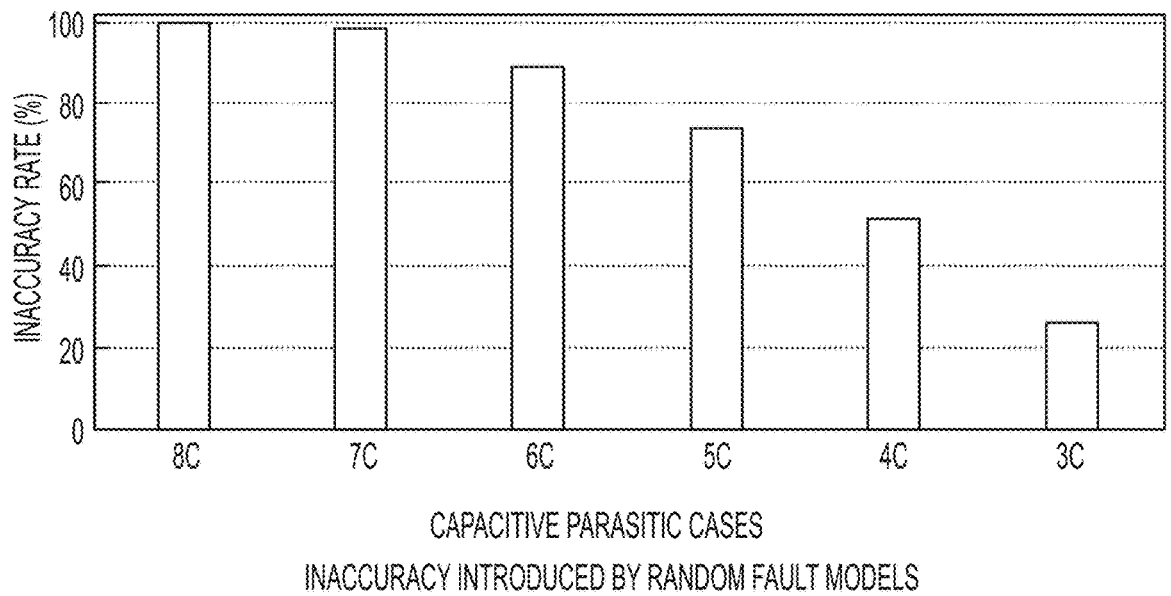
FIG. 6D shows the inaccuracy introduced by random fault model distribution for different TSV configurations (leading to different failing cases).

FIG. 6D shows the inaccuracy introduced by random fault model distribution for different TSV configurations (leading to different failing cases). The inaccuracy of 0% means the random distribution matches the model's probability of occurrence, while 100% inaccuracy implies that the random distribution does not predict the corresponding fault type occurrence. It is observed that randomly distributed faults across the 8×8 TSV bundle introduces almost 99% inaccuracy for a given TSV specification leading to 8 C capacitive coupling case. In other words, if the circuit-level simulations shows the 8 C capacitive coupling case results in failure the random fault modeling is almost inaccurate for all the experiments. However, inaccuracy percentages decrease as the factor of failing cases of parasitic capacitive reduces. The reason is that the occurrence probability of parasitic capacitive with smaller values are higher than the ones with larger factors. Consequently, the percentage of inaccuracy decreases for smaller parasitic capacitive causing failure. However, even with these considerations the 26% inaccuracy for 3 C parasitic capacitive value is still reported.

6.2.2 CTTC Fault Characterization

Figure 6E:
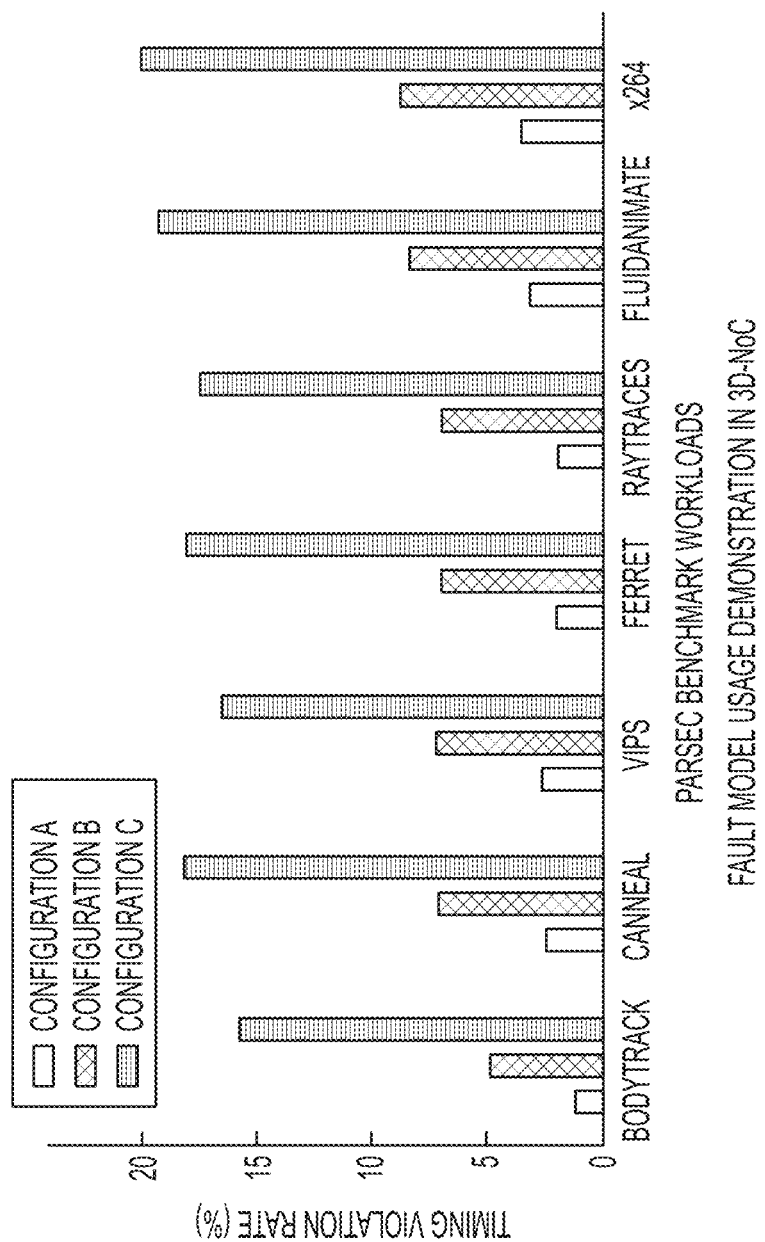
FIG. 6E shows the ratio of TV occurrence over total number of data transmission in vertical links for three different configuration at 90% synthesis frequency.

In order to demonstrate the effects of network traffic on CTTC fault, the PARSEC benchmark traces were collected using GEM5, and then injected them into THENoC which its specifications is summarized in Table 6.1. FIG. 6E shows the ratio of TV occurrence over total number of data transmission in vertical links for three different configuration at 90% synthesis frequency. The reported experimental results in FIG. 6E are based on running PARSEC benchmark for different conditions which are discussed in Table 5.2. For Configuration C, an average of 18% TV is observed because of running at higher temperature and low TSV oxide thickness both exacerbate the CTTC effects. As the configuration parameter values get relaxed, the TV due to CTTC also decreases accordingly.

Figure 6F:
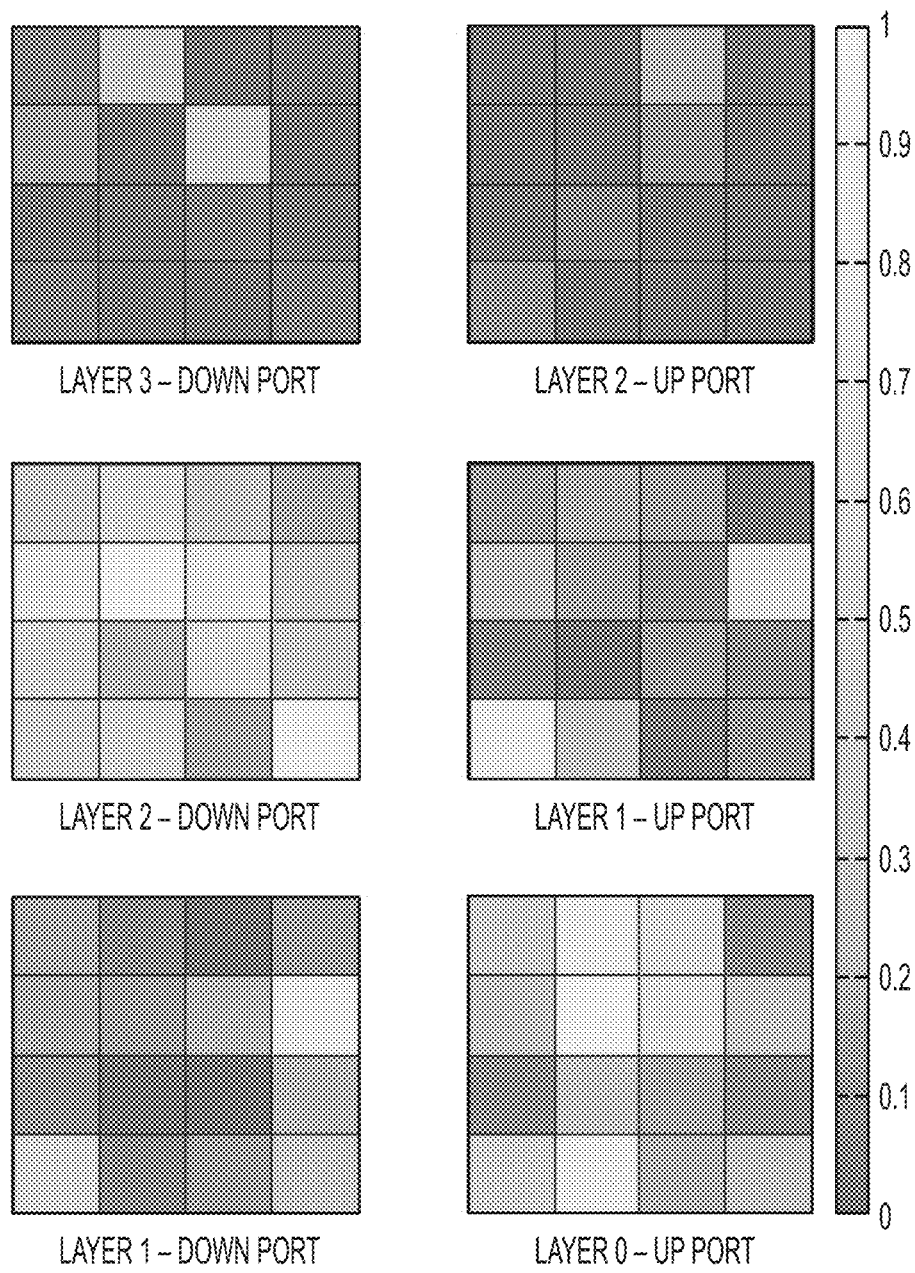
FIG. 6F illustrates a Capacitive TSV-to-TSV Coupling fault density map for the 4×4×4 simulated network with Canneal workload traffic.

Finally, CTTC fault density map for the 4×4×4 simulated network with Canneal workload traffic is depicted in FIG. 6F. This figure illustrates 4×4 NoC routers of a specific layer sending data to their lower/upper layer routers (Down port/Up port). The values are normalized to the maximum number of TV in entire 3D-NoC. The layer 0 down port and layer 3 up port are not shown since they do not exist. With this map designers have proper estimation which TSVs for a specific application are more resilient and which of them are not. It can be seen that the data transmission from layer 2 downward layer 1 cause a large number of CTTC faults.

CHAPTER 7: FAULT MITIGATION CODINGS FOR TSV-BASED 3D ICS

As a side project of this disclosure two separate methods have been proposed to alleviate the unwanted effects of both capacitive and inductive TSV-to-TSV coupling issue in 3D ICs. These methods are called: Inductive TSV-to-TSV Coupling Mitigation (ITCM) and TSV-to-TSV Capacitive Coupling Mitigation Algorithm (TCMA). A designer can choose either approach based on the operational frequency of the target system. The proposed method in this chapter does not include any information redundancy and the simulation results are based on circuit-level simulations.

7.1 Proposed TCMA Technique

The probability of 7 C and 8 C capacitive coupling emergence are reduced by applying by TCMA method in which the flits are adjusted before transmission. Mitigation is chosen in this experiment since eliminating all 7 C and 8 C capacitive coupling imposes a complex architecture which is not scalable for any size of TSV meshes. In this section, the proposed baseline TCMA is discussed first which can be used in smaller interconnections. Then the limitation of the baseline approach for larger interconnections is highlighted. Finally, the enhanced TCMA is presented which supports larger mesh of TSVs.

7.1.1 Baseline TCMA

The TTCC is data-dependent as described in Section 5.3. The basic idea of the baseline TCMA is to encode, if necessary, the consecutive data bits transmitting over the TSVs in order to mitigate the frequency of 7 C and 8 C capacitive coupling. This method does not limit any pattern of data transmission bits by encoding them before transmission and decoding them in receiver side, if needed. The inversion operation is chosen as a simple but light and efficient practical coding method in TCMA in order to keep the overhead low, while mitigating TTCC noise. In a mesh of TSVs, a single bit per row is needed in TCMA to determine whether the inversion process is needed or not at the receiver side. TCMA stores the last transmitted data bit of each TSV and compares it with the available data bit which has not been transmitted yet. The current direction matrix of all TSVs is generated by comparing these successive data bits as described in Section 5.3. Then the capacitive coupling for each of TSVs are calculated based on the current direction of its neighbor TSVs. Each row of 2D array of TSVs including 8 C or 7 C parasitic capacitance values is nominated for the data encoding process. By encoding the ready to transmit data bits, 8 C capacitive coupling will be 2 C and 7 C capacitive coupling will be 1 C or 3 C in this method.

7.1.2 Enhanced TCMA

Although the baseline TCMA reduces the quantity of 8 C and 7 C parasitic capacitance values, but it may have some undesirable side effects by converting a row of data bits. For some special data patterns, converting a single row of data bits may generate unexpected 8 C or 7 C parasitic capacitance values, which happens in a mesh of TSV with more than 3 rows or 6 columns. These special cases are called bad configuration in the rest of this chapter.

Figure 7A:
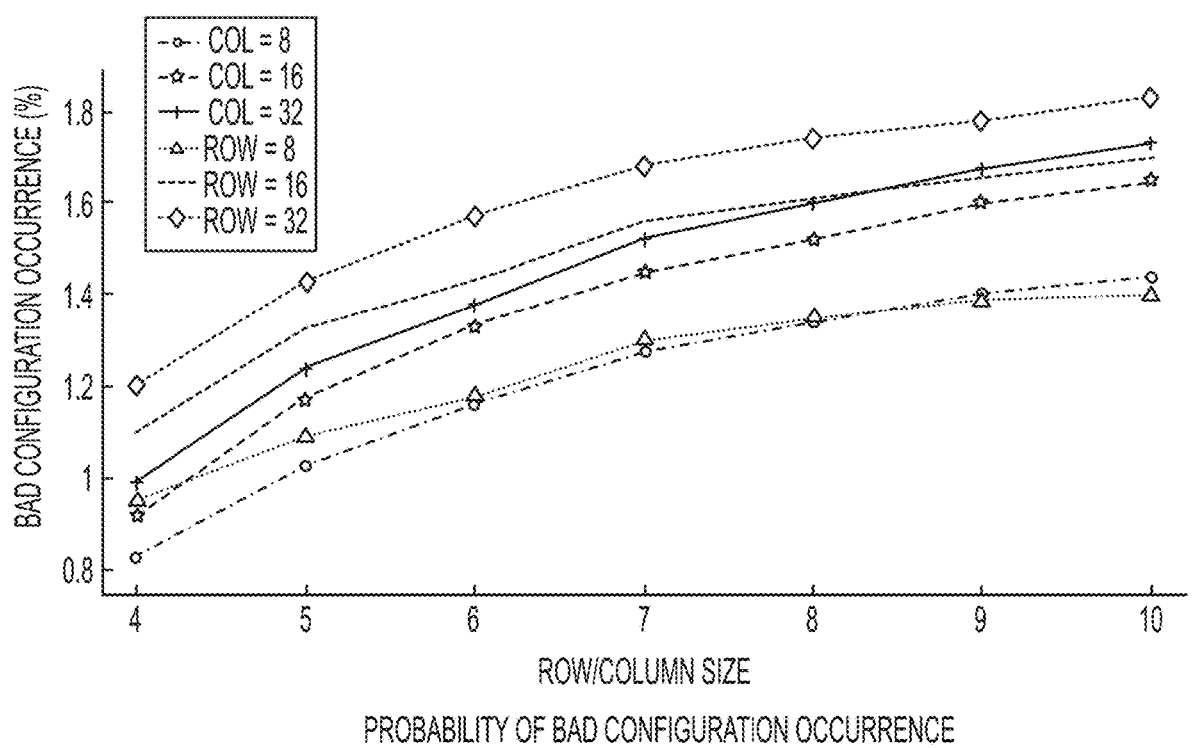
FIG. 7A shows the probability of bad configuration occurrences in different mesh size of TSVs.

A bad configuration is a subset of TSV mesh which potentially generates unexpected 8 C or 7 C parasitic capacitance values by converting a single row of data bits. In more details, the row encoding affects the other data bits of the same row or the data bits in predecessor or successor rows in 2D matrix of TSVs. Since the probability of bad configuration occurrence is low, specially for smaller matrices of TSVs, the baseline coding is still efficient for smaller data buses (less than 64 bits) which are considered in 3D Network-on-Chip (3D NoC applications). FIG. 7A shows the probability of bad configuration occurrences in different mesh size of TSVs.

This experiment is done by running the Monte Carlo simulations for 10000 iterations for different row/column dimensions. According to experimental results the reported percentage of bad configuration for all of the experimented dimensions is less than 2%. The baseline coding is not scalable for larger data buses (more than 64 bits) which are applied in 3D memory applications according to the increasing trend in FIG. 7A. The enhanced version of TCMA is devised for these sorts of application to make sure the encoding process of a selected data bit of TSVs does not worsen the total capacitive coupling. First, the bad configuration concept is explored in detail and then the proposed solution is presented.

TABLE 7.1

Current flow or tsvs before and after encoding

| Sent data | Ready to send data | $CF_{bi}$ | $CF_{ai}$ |
|---|---|---|---|
| 0 | 0 | ○ | ⊙ |
| 0 | 1 | ⊙ | ○ |
| 1 | 0 | ⊗ | ○ |
| 1 | 1 | ○ | ⊗ |

Figure 7B:
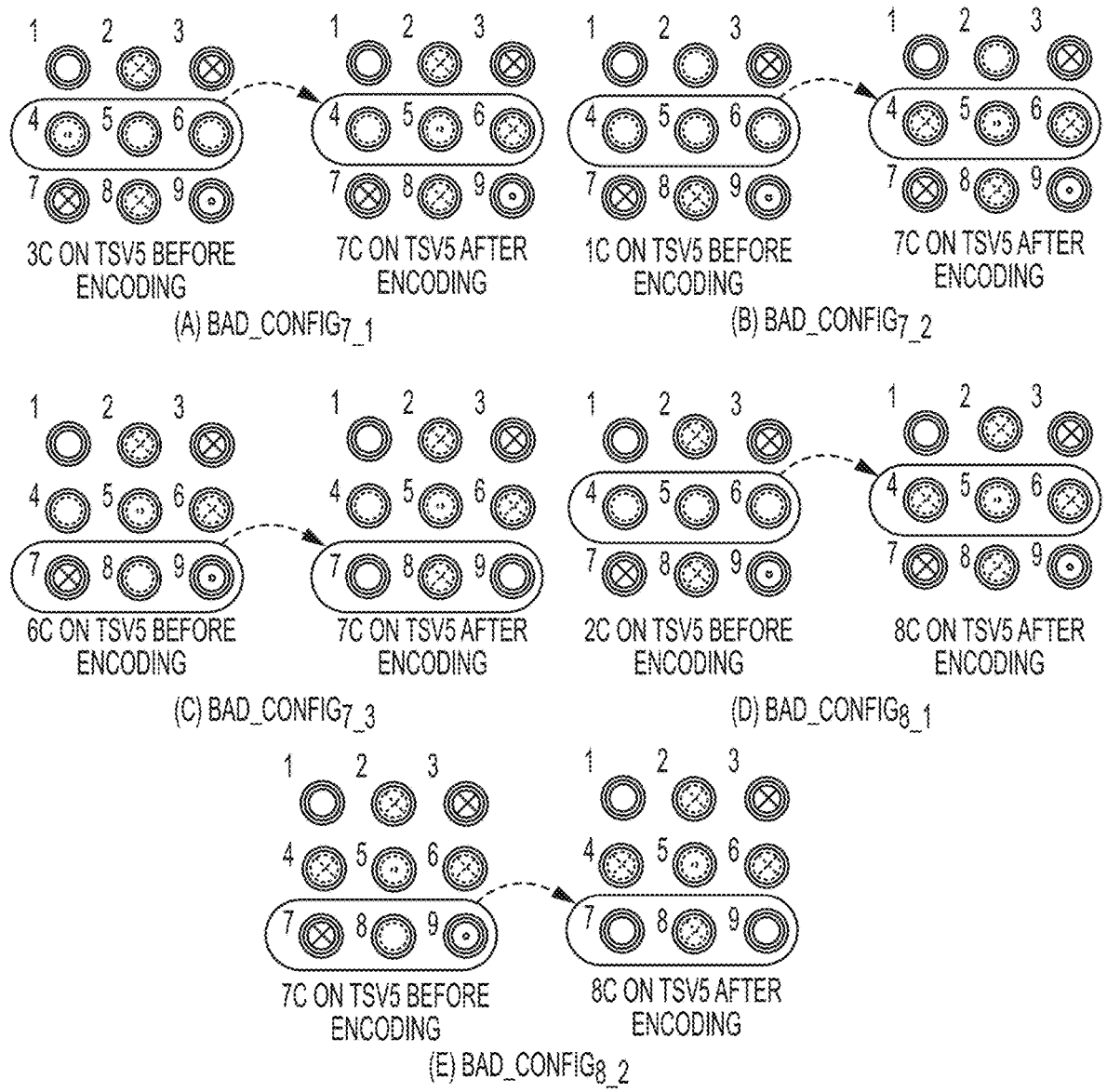
FIG. 7B illustrates five cases in a top view of a 2D array of TSVs in a 3×3 mesh of TSVs.

Table 7.1 summarizes the TSV current flow direction before and after encoding its ready to send data bit. $CF_{bi}$ shows the current flow of TSV before inverting the ready to send data, while $CF_{ai}$ represents the current flow of TSV after inversion. Based on this table an inactive TSV current flow ( ) may convert to active TSV (either e or ⊗), while an active TSV (either of the e or ⊗) is converted into an inactive one ( ) after inverting the ready to send data bits. Based on the experimental result analysis, a bad configuration occurs in five cases, while two of them are potential to generate unwanted 8 C capacitive coupling and the other three may generate unwanted 7 C capacitive coupling. They are called bad_config$_{8\_1}$, bad_config$_{8\_2}$, bad_config$_{7\_1}$, bad_config$_{7\_2}$, and bad_config$_{7\_3}$. FIG. 7B illustrates these five cases in top view of 2D array of TSVs in a 3×3 mesh of TSVs. The candidate row for inversion is recognized by dashed lines in this figure. It also shows the capacitive coupling value of middle TSV in the recognized row by dashed lines before and after encoding process. Each of these bad configurations affects the result of baseline coding with some conditions which are discussed in the following.

In the baseline method and in case of encoding, the 3 C capacitive coupling, if any, is converted into 7 C (see FIG. 7B, case (A)) by encoding the second row of 2D array of TSVs with following four conditions:

There are exactly two inactive TSV next to each other in potential row for encoding process as in TSV5 and TSV6.

TSV2 and TSV8 are active with the same current direction.

The current direction of TSV6 after encoding should be the same as the current direction of TSV2 and TSV8.

The current direction of TSV5 should be reverse of the current direction in TSV2, TSV6, and TSV8 after encoding.

The 1 C capacitive coupling is converted into 7 C (see FIG. 7B, case (B)) by encoding the second row of 2D array of TSVs with following four conditions:

There are at least three inactive TSV next to each other in potential row for encoding process as in TSV4, TSV5, and TSV6.

Either of TSV2 or TSV8 is inactive and the other should be active.

The current direction of TSV4 and TSV6 after encoding should be the same as the current direction of either TSV2 or TSV8 which was active.

The current direction of TSV5 after encoding should be reverse of the current direction of TSV4, TSV6, and either TSV2 or TSV8 which was active.

The 6 C capacitive coupling is converted into 7 C (see FIG. 7B, case (C)) by encoding the third row of the 2D array of TSVs with following four conditions:

The 2 C capacitive coupling is converted into 8 C (see FIG. 7B, case (D)) by encoding the second row of 2D array of TSVs with following four conditions:

There are at least three inactive TSVs beside each other in potential row for encoding process like TSV4, TSV5, and TSV6.

TSV2 and TSV8 are active with same current direction.

The current direction of TSV4 and TSV6 after encoding should be the same as the current direction of TSV2 and TSV8.

The current direction of TSV5 should be reverse of the current direction in TSV2, TSV4, TSV6, and TSV8 after encoding.

The 7 C capacitive coupling is converted into 8 C (see FIG. 7B, case (E)) by encoding the third row of 2D array TSV, if the following conditions are satisfied:

In capacitive matrix there is a 7 C capacitive coupling in predecessor row which is selected for encoding. The inactive TSV should be also in the selected row for encoding.

TSV8 has the reverse current direction of TSV5 after encoding.

The probability of bad configuration presence in a mesh of TSVs is very low since all the discussed conditions should be satisfied simultaneously. However, the goal of the enhanced TCMA, which is summarized in Algorithm 1 is to guarantee the encoding process will not worsen the total number of 7 C and 8 C capacitive coupling in a 2D array of TSVs. In the enhanced version of TCMA the encoding process will be done if the total number of 7 C and 8 C capacitive coupling in capacitive matrix is higher than the total number of bad configuration in each row.

Algorithm 1 Enhanced TCMA coding algorithm

```
1:  AMAT ← Sent data bits
2:  BMAT ← To be sent data bits
3:  CMAT ← Current direction of each TSV generated by AMAT & BMAT
4:  CAPMAT ← Capacitive parasitic noise of each TSV generated by CMAT
5:  INV ← Redundant vector for inversion process decision at receiver side
6:  for each R ∈ Rows do
7:      for each C ∈ Columns do
8:          if CAPMAT[R][C] == 8 or CAPMAT[R][C] == 7 then
9:              78C_counter + +
10:         end if
11:         if (there is a bad configuration bad_config_{7_1} bad_config_{7_2} or bad_config_{7_3})
            then
12:             bad_config_7_counter + +
13:         end if
14:         if (there is a bad_config_{8_1} or bad_config_{8_2}) then
15:             bad_config_8_counter + +
16:         end if
17:     end for
18:     if (78C_counter > bad_config_7_counter + bad_config_7_counter) then
19:         Encode the BMAT[R]
20:         INV[R]=1
21:     end if
22: end for
```

In capacitive matrix there is a 6 C capacitive coupling in predecessor row which is selected for encoding in a way that TSV5 has reverse current direction of TSV2 and either of TSV4 or TSV6.

TSV8 which is in the nominated row for encoding is inactive.

One of TSV4 or TSV6 is inactive and the other should be active with reverse current direction of TSV5.

The current direction of TSV8 after encoding should be same as current direction of TSV2 and either of TSV4 or TSV6 which was active.

7.1.3 TCMA Elaboration and Evaluation

Figure 7C:
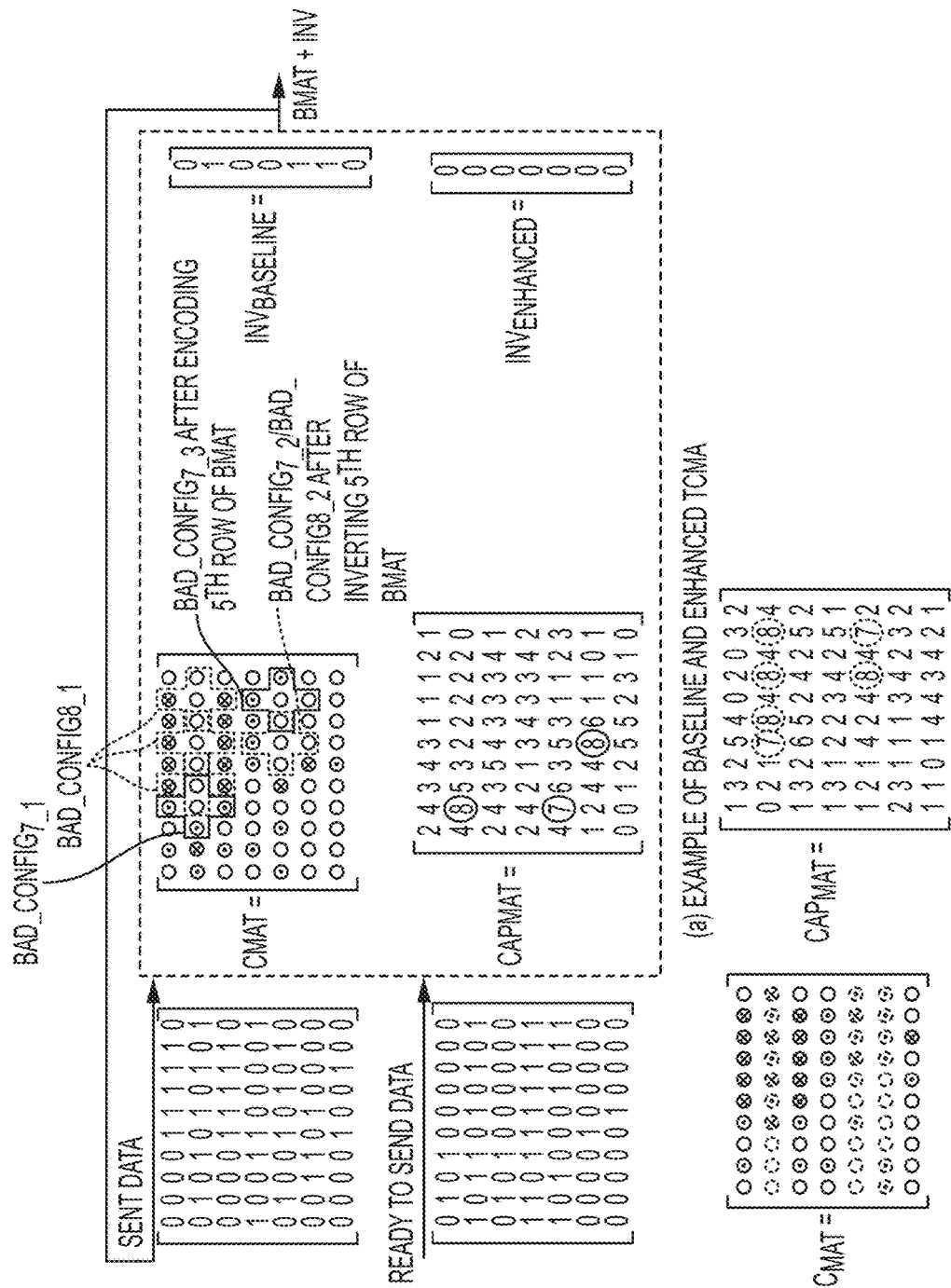
FIG. 7C illustrates some baseline algorithm issues.

In FIG. 7C, case (a) illustrates an example of the baseline and enhanced algorithm for 7×10 given AMAT and BMAT matrices. These matrices and the ones which are used in following sentences are defined in Algorithm 1. This dimension has been chosen to show the advantages of the enhanced approach over the baseline technique for higher bandwidth data buses. First, CMAT and then CAPMAT matrices are generated form the sent (AMAT) and not sent yet (BMAT) data lines. The current flow of each TSV is presented with the same method as discussed in Section 5.3. Then, CAPMAT is generated from CMAT by counting the total mutual capacitive parasitic difference between each TSV and its adjacent neighbors. The INV matrix is evaluated in the receiver side to extract the original data values if they are encoded. $INV_{baseline}$ of this example shows that the second, fifth, and sixth rows of the BMAT matrix have been encoded since there are 8 C or 7 C parasitic capacitance values in these rows of CAPMAT matrix. Since the number of 7 C and 8 C capacitive coupling are not higher than the number of bad configuration in enhanced method, the $INV_{enhanced}$ shows none of the rows the BMAT has been encoded.

Since the encoding decision is supposed to be done row by row in one direction (from top to bottom in this example) or reverse, the unwanted generated 7 C and 6 C in fifth row of CAPMAT are potential to generate 8 C and 7 C, respectively by encoding the sixth row of BMAT. Due to the presence of 8 C in sixth row of CAPMAT, it is selected for encoding process and both of bad_config$_{7\_3}$ and bad_config$_{8\_2}$ generate undesirable 8 C and 7 C in fifth row of CAPMAT which is shown in FIG. 7C, case (b). However, the enhanced algorithm prevents all of these bad effects by predicting them.

Figure 7D:
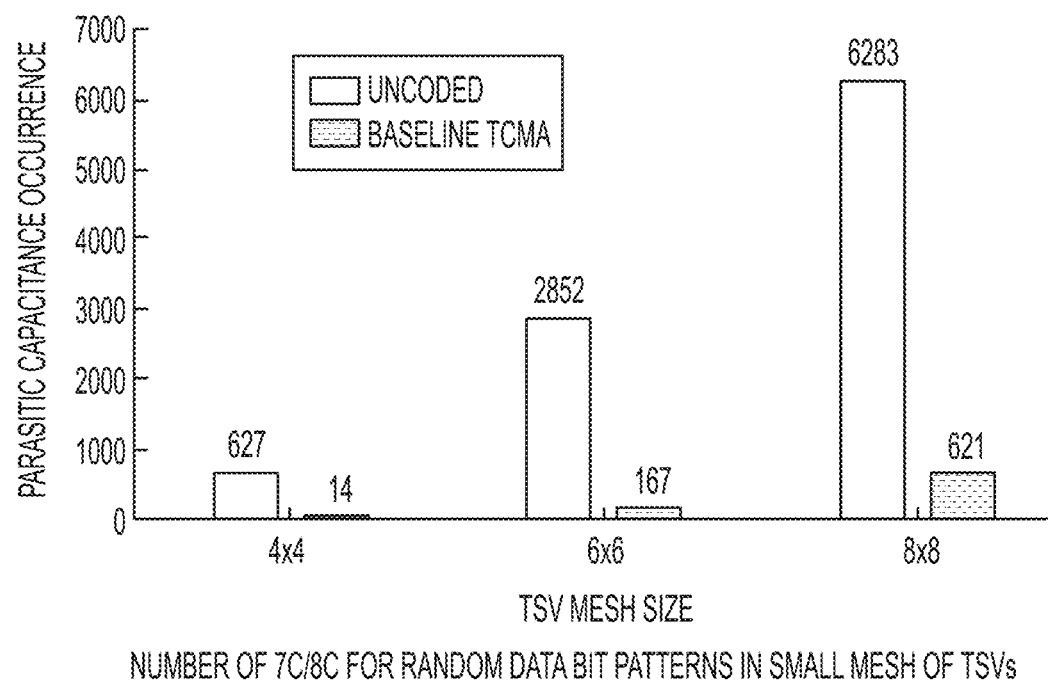
FIG. 7D shows the total number of 7 C and 8 C capacitive coupling before and after applying the baseline TCMA for different mesh size of TSVs.

To evaluate the advantages of the baseline TCMA for smaller mesh size, Monte Carlo simulations for 10000 iterations on different sizes of TSV mesh are examined. The total number of 7 C and 8 C capacitive coupling before and after applying the baseline TCMA for different mesh size of TSVs is shown in FIG. 7D. It is depicted that the mitigation rate of 7 C and 8 C capacitive coupling after applying the baseline TCMA are almost 98%, 94%, and 90% for 4×4, 6×6, and 8×8 mesh of TSVs. The information redundancy of the baseline TCMA method for these sizes of mesh of TSVs are 25%, 16%, and 12%, respectively. However, the mitigation rate of the baseline TCMA is increased for large mesh of TSVs, as expected. This is because of the probability of bad configuration occurrence rises by increasing the sizes of TSV meshes. The Monte Carlo simulations for 10000 iterations for larger mesh of TSVs are also examined for both baseline and enhanced TCMA to show the advantages of enhanced TCMA. Although the mitigation rate of total number of 7 C and 8 C capacitive coupling values is increasing by using larger mesh of TSVs, enhanced TCMA prevents encoding process if the result is worsen. This is shown in FIG. 7E, plot (a), in which the mitigation rate of 7 C and 8 C capacitive coupling occurrence by applying enhanced TCMA are always higher than baseline approach.

PARSEC benchmark as a realistic data traffic for large size of mesh of TSVs are also applied to check the performance of the baseline and enhanced TCMA. Memory traces of PARSEC applications have been employed in this experiment, which are extracted by the PIN tool, a dynamic binary instrumentation framework for the IA-32 and x86-64 instruction-set architectures. The total number of 7 C and 8 C parasitic capacitance values for memory traces of PARSEC application workloads through the TSVs are reported for a 8×32 mesh of TSVs in FIG. 7E, plot (b). The migration rate of TCMA for Blackscholes, Facesim, Vips, and Raytraces are between 80%; to 90% and for the rest of them is almost 70%. Although the differences between the mitigation rates of baseline and enhanced TCMA are not very much, but the result of enhanced method is always better than baseline as it is expected. In other words, it is always guaranteed that by applying the enhanced TCMA the total number of 7 C and 8 C capacitive coupling will never be worse off because of the bad configuration presence.

In order to evaluate the proposed coding methods, the baseline and enhanced TCMA encoders are implemented in Verilog and synthesized by Synopsys Design Compiler using 28 nm TSMC library (1.05V, 25° C.). Table 7.2 reports the synthesis results as representing power consumption and occupied area. The latency of the enhanced method is reported by the critical path including: registers latching the adjusted output data bits toward the feedback input for subsequent CMAT computation. In other words, it does not depend on the dimension of TSV arrays. According to the logic synthesis, the latency of the baseline and enhanced TCMA are reported as 69.5 ps and 74.9 ps for all the given TSV dimensions in Table 7.2. The feasibility of both proposed coding algorithms are confirmed by considering the obtained coupled capacitive coupling mitigation and its tangible footprint and power consumption. Decoder units are not implemented in this experiment, since they are only composed of a comparator and a mix of inverter gates. They are much lighter than encoder components in terms of area, power consumption, and latency.

TABLE 7.2

| | Hardware synthesize results | | | |
| --- | --- | --- | --- | --- |
| | Baseline | | Enhanced | |
| Mesh size | Area ($\mu m^2$) | Power ($\mu W$) | Area ($\mu m^2$) | Power ($\mu W$) |
| 8 × 8 | 918 | 2340 | 1096 | 3000 |
| 8 × 16 | 1818 | 4520 | 2173 | 5900 |
| 16 × 8 | 2094 | 5260 | 2165 | 5880 |
| 8 × 32 | 3321 | 8840 | 4331 | 11700 |
| 32 × 8 | 4086 | 11000 | 4323 | 11700 |

7.2 Inductive TSV-to-TSV Coupling Analysis and Mitigation

Similar to the presented analysis of CTTC effect, the effect of Inductive TSV-to-TSV Coupling (ITTC) is also reported in this section first and then the proposed ITCM technique is presented which is able to mitigate the undesirable effect fo ITTC effects.

7.2.1 ITTC Characteristics

Although the capacitive coupling is a well known source of noise in TSV-based 3D ICs, inductive coupling has also some undesirable effects like overshooting and supply/ground bounces. This is because inductive coupling generates high amplitude noise pulses with short durations comparing to capacitive coupling.

In order to evaluate the effect of ITTC, a 3×3 array of TSVs is modeled in HSPICE, in which the middle TSV is considered to be the victim.

In simulations, the top end of each TSV is connected to the output of an inverter, which drives the input of another inverter connected to the bottom end of the TSV. Similar to CTTC evaluation, PTM library are used to implement inverters and circuit-level model of TSVs are both simulated by Synopsys HSPICE tool.

Figure 7F:
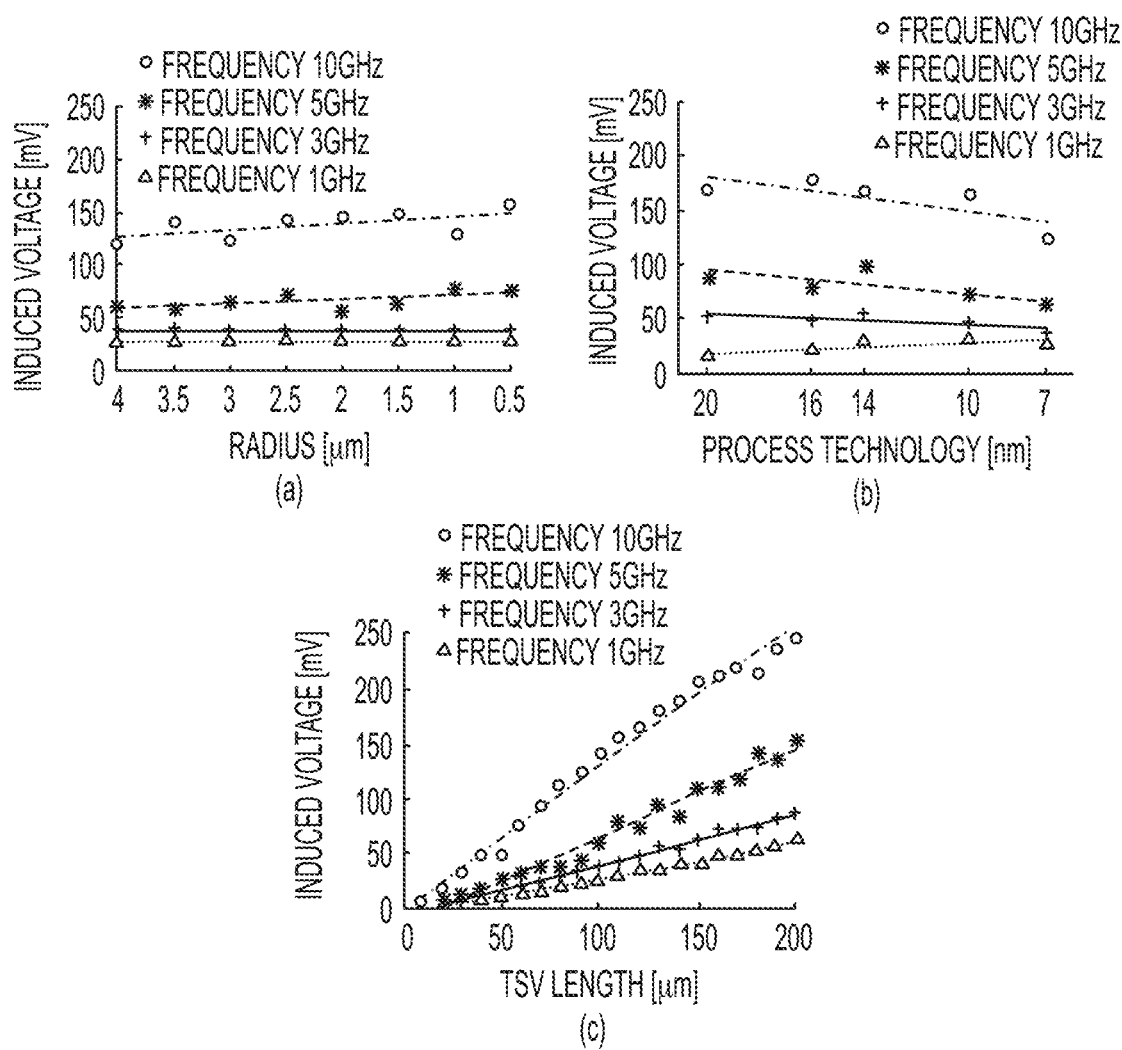
FIG. 7F presents plots that characterize inductive coupling against various parameters.

The worst-case induced voltage on the victim TSV is reported as regression lines for different TSV radii (FIG. 7F, plot (a)), process technologies (FIG. 7F, plot (b)), and TSV lengths (FIG. 7F, plot (c)) over different frequencies. As TSVs become longer the magnetic flux linking the two TSVs increases proportionally. Thus the coupling voltage between victim and aggressor TSVs and hence the total inductive coupled voltage increase as the length of the TSVs increase (see FIG. 7F, plot (c)).

Although the linkage flux between two TSVs is a strong function of the length, its dependence on the TSV radius is very weak. Changing the radius of cylindrical TSVs affects mutual inductance by changing the magnetic field because of TSV aggressors and the exposed surface to the linkage flux. As long as the current distribution in a TSV remains almost symmetric, assuming proximity effect and other high order effects are trivial, and the magnetic field created by an aggressor is almost constant. In other words, the TSV radius changes effect on the magnetic field of TSVs is not critical. Since the length of the TSV is at least an order of magnitude longer than its radius, the second effect is small, but the linkage flux and the mutual coupling decreases slightly as the radius increases (see FIG. 7F, plot (a)).

As shown in FIG. 7F, plot (b), induced voltage is a weak function of the process technology. As processes scale down, the gate capacitance becomes smaller while the rise time and fall time of the voltages become shorter. Overall the charging and discharging current of gate capacitance remains almost constant. The same current that charges (or discharges) the gate capacitance passes through TSV and causes the inductive coupling to neighboring TSVs. Inductively coupled voltage remains almost constant for different technologies. As technology advances and supply voltage shrinks, the coupled voltage becomes a greater portion of the $V_{dd}$ and increases the probability of error. Consequently, the length of TSVs has a major impact on inductive coupling, resulting in unexpected noises in 3D NoC, as the number of layers increases.

TABLE 7.3

ITTC categorization with occurrence probability of each type

| Types[1] | 0L | |1|L | |2|L | |3|L | |4|L |
|---|---|---|---|---|---|
| Sample pattern | ⊙⊗⊕⊗⊙ | ⊙⊙⊕⊗⊙○ | ⊙⊙⊕⊙⊗ | ⊙⊙⊕⊙⊙ | ⊙⊙⊕⊙⊙ |
| Occurrence frequency | 19 | 32 | 20 | 8 | 2 |
| Occurrence probability | 0.23 | 0.39 | 0.25 | 0.1 | 0.03 |

[1]The absolute values are exactly same as α values in Equation 7.1

If the inductive coupling voltage caused by a single horizontal or vertical neighboring TSV is β, then the total inductively coupled voltage on a victim TSV, $V_{Icoupl_{tot}}$, is proportional to αβ, where the value of integer α depends on the current flow direction and arrangement of active neighboring TSVs, as will be shown shortly. Assuming the electromagnetic proximity effect and other high-order effects are negligible, $V_{Icoupl_{tot}}$ is equal to sum of the voltages induced by each aggressor TSV, based on Faraday's law:

$$V_{Icoupl_{tot}} = \sum_{i=1}^{N} V_{Icoupl_i} = \sum_{i=1}^{N} M_{v,i} \frac{dI_i}{dt} \sim \alpha\beta \quad (7.1)$$

where N is the total number of aggressors, $V_{Icoupl_i}$ is the voltage coupled on the victim by $i^{th}$ aggressor, assuming all other aggressors have constant current. $M_{v,i}$ is the mutual inductance between $i^{th}$ aggressor and victim TSVs. $I_i$ is the current of $i^{th}$ aggressor TSV. The $M_{v,i}$ is found from Equation 7.2.

$$M_{v,i} = \frac{\mu_0}{2\pi}\left[l\ln\left(\frac{l+\sqrt{d_i^2+l^2}}{d_i}\right) + d_i - \sqrt{d_i^2+l^2}\right] \quad (7.2)$$

where $d_i$ is the distance of $i^{th}$ aggressor from the victim TSV and l is the length of a TSV.

Since the effect of inductive coupling crosstalk caused by diagonal neighboring TSVs is less than that caused by adjacent TSVs, they are not considered in this analysis. With this assumption an ITTC is classified into five different classes based on the number and arrangement of active neighbors for a victim TSV. This classification is based on the absolute value of a for a given victim TSV caused by active neighbor TSVs. Each victim TSV has four neighbors in horizontal or vertical directions. These neighboring TSVs can be either active or inactive. An active TSV may have upward or downward current directions, while there is no current flow in an inactive TSV. As a result, there are $3^4$=81 possible configurations of TSV neighbors for a victim TSV. Since many of these 81 arrangements have similar |α| values, the behavior of all 81 configurations is summarized in Table 7.3. The absolute value of a is reported here since the sign of a is chosen by the direction of its neighbor TSVs' current direction which are all similar and symmetric. In other words, the same effect occurs if all adjacent neighbor TSVs of a victim TSV have upward or downward current flow. Based on this classification, there are 5 different types of ITTC as shown in the first row of Table 7.3, which are quantified in terms of their frequency and probability of occurrence. The e, ⊗ symbols in Table 7.3 represent the upward and downward TSV current flow directions, respectively. The ⊕ symbol represents a victim TSV regardless of its current direction which does not impact the proposed analysis.

A sample pattern resulting in each parasitic inductance in range of 0 L to |4| L is also shown in Table 7.3. The maximum $V_{Icoupl_{tot}}$ in this representation is equal to |4|, if all adjacent neighboring TSVs have the same current flow, while it will be 0 if each pair of neighboring TSVs has reverse current flow or if all the adjacent neighboring TSVs are inactive. The frequency and probability of occurrence for each presented types of ITTC are also reported in this table.

7.2.2 Proposed ITCM Technique

Shield insertion on a chip and TSV placement with a safe distance approaches have been proposed to mitigate mutual coupling, but they are not efficient. Similar to TCMA method the sequence of bits of each flits are adjusted in the proposed ITCM technique. This goal is not achievable for all data patterns due to intrinsic randomness property of the data, therefore the purpose of the proposed coding method is to rearrange the data bits to replace the majority of larger total inductive coupling values by smaller ones. As a practical approach for data-bit adjustments, the inversion operation is chosen. Data bit inversion is done at the receiver side to retrieve the original data-bit patterns. The overhead of this method is the extra bits, to decide the inversion process at the receiver side. Considering one bit for each of the data bits imposes a 100% information redundancy, in the proposed algorithm the inversion operation is performed for each row with a single bit overhead.

| Algorithm 2 ITCM algorithm |
|---|
| 1: AMAT ← Sent data bits |
| 2: BMAT ← To be sent data bits |
| 3: CMAT ← Current flow direction of each TSV |
| 4: PMAT ← α values in Equation 7.1 for each TSV |
| 5: IMAT ← Inversion intention for each TSV |
| 6: for each R ∈ Rows do |
| 7:     for each C ∈ Columns do |
| 8:         UP ← CMAT[R−1][C] |
| 9:         DOWN ← CMAT[R+1][C] |
| 10:        if PMAT[R][C] == 1 then |

Algorithm 2 ITCM algorithm

```
11:            if UP == 0 then
12:                IMAT[R-1][C] = BMAT[R-1][C]
13:            else
14:                IMAT[R-1][C] = 1
15:            end if
16:        else if PMAT[R][C] == 2 then
17:            if UP == -1 or DOWN == -1 then
18:                if UP == -1 then
19:                    IMAT[R-1][C] = 1
20:                else
21:                    IMAT[R+1][C] = 1
22:                end if
23:            else if UP == 1 and DOWN == 1 then
24:                IMAT[R-1][C] = 1
25:                IMAT[R+1][C] = 1
26:            else if UP == 0 and DOWN == 0 then
27:                IMAT [R-1][C] = BMAT[R-1][C]
28:                IMAT [R+1][C] = BMAT[R+1][C]
29:            else if UP == 1 and DOWN == 0 then
30:                IMAT[R-1][C] = 1
31:                IMAT[R+1][C] = BMAT[R+1][C]
32:            else if UP == 0 and DOWN == 1 then
33:                IMAT [R-1][C] = BMAT[R-1][C]
34:                IMAT[R+1][C] = 1
35:            end if
36:        else if PMAT[R][C] == 3 then
37:            if UP == 1 and DOWN == 1 then
38:                IMAT [R-1][C] == 1
39:                IMAT[R+1][C] == 1
40:            else if UP == 0 then
41:                IMAT[R+1][C] == 1
42:                IMAT[R-1][C] == BMAT[R-1][C]
43:            else
44:                IMAT[R-1][C] == 1
45:                IMAT [R+1][C] == BMAT[R+1][C]
46:            end if
47:        else if PMAT[R][C] == 4 then
48:            IMAT[R-1][C] == 1
49:            IMAT[R+1][C] == 1
50:        end if
51:    end for
52: end for
53: for each Row ∈ IMAT do
54:    Decides whether the inversion is needed or not
55: end for
```

Algorithm 2 summarizes the proposed inductive coupling mitigation coding method for positive $\alpha$ values. There is a similar algorithm for negative $\alpha$ values, in which all the IMAT[i][j]=BMAT[i][j] assignments from line 10 to line 50 of Algorithm 2 are replaced by IMAT[i][j]=$\overline{\text{BMAT}}$[i][j]. AMAT and BMAT input matrices are the two consecutive data flits, which AMAT has been sent while BMAT is planned to be sent. The proposed algorithm is able to invert the values of BMAT matrix based on the values of AMAT matrix, as shown in Algorithm 2. In this algorithm, first the current flow direction of each TSV is calculated by considering the data-bit pattern of the corresponding elements in AMAT and BMAT, resulting in matrix CMAT. Then, PMAT ($\alpha$ values for each TSV) is generated by adding the values of its corresponding vertical and horizontal neighbors in CMAT based on Equation 7.1. There is a chance of row inversion for each row, if conditions of the proposed algorithm are satisfied, as shown in Algorithm 2 with the goal of replacing majority of larger values in PMAT by smaller ones.

In the proposed method, each TSV votes for inversion of its vertical neighbors to create IMAT. The decision of inverting data pattern of adjacent rows in IMAT matrix may conflict each other, as inversion of a single row of IMAT matrix is suggested for one of its adjacent row while it is not recommended for the other one. The proposed coding algorithm addresses these dependencies and takes the best decision considering the optimization of each row and their effect on the data. In this case, the net benefit of inversion of each row should be calculated to find the best inverting decision for different rows of IMAT matrix. There is a trade-off between the degree of inductive coupling mitigation and performance/complexity of the design. The proposed algorithm ignores the inverting process, if there is any conflict of decision in inverting adjacent rows of IMAT matrix in order to save the timing constraints. Finally, based on the number of inversion requests in each row the inversion decision is made. It should also be noted that the encoding and decoding processes are only needed at source and destination Network Interfaces (NI), also since NoC routers require the header information, header flit is not encoded; B-bit (B shows the number of rows) inversion indication bits are added to the header flit of the packet to prevent imposing extra TSVs.

Figure 7G:
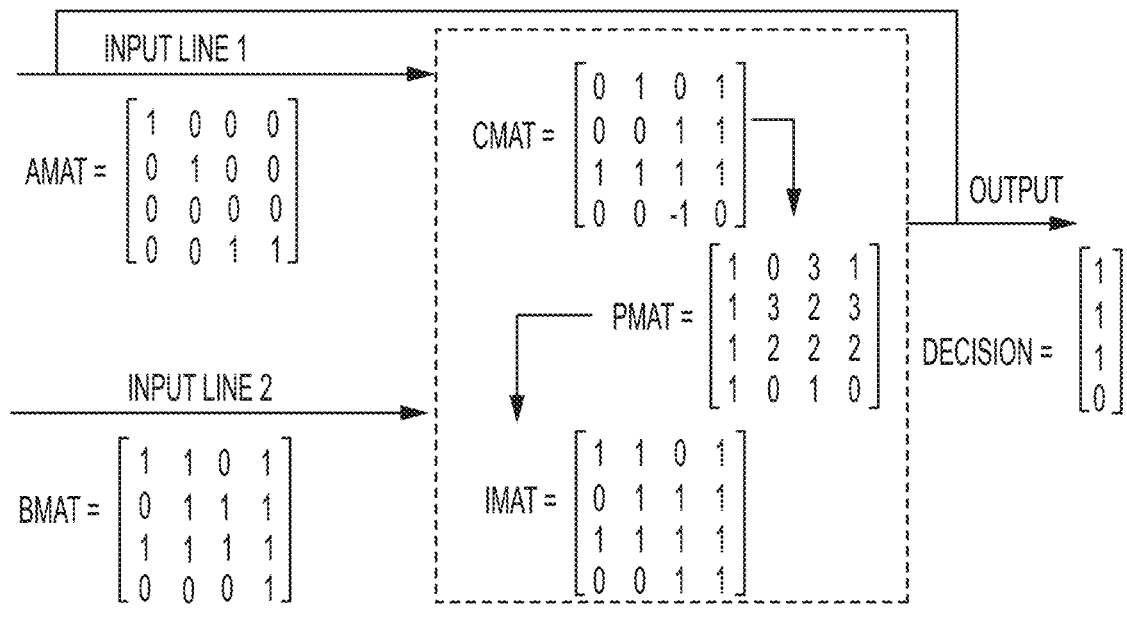
FIG. 7G illustrates an example of the proposed algorithm for given AMAT and BMAT as consecutive flits through a 4×4 mesh of TSV.

FIG. 7G illustrates an example of the proposed algorithm for given AMAT and BMAT as consecutive flits through a 4×4 mesh of TSV. Any changes from '0' to '1' in the corresponding elements of AMAT and BMAT matrices is represented as 1 in CMAT, while the reverse changes is shown by -1. A given element of CMAT will be 0 if it corresponding element in AMAT and BMAT are the same. Then PMAT is generated from CMAT by adding the neighbors' values in the corresponding element of CMAT matrix. For example, the PMAT [1][1] is equal to 3, which is the summation of CMAT[0][1], CMAT[1][0], CMAT[2][1], and CMAT[1][2]. Finally, IMAT matrix is created by examining all elements of PMAT through the if conditions of the Algorithm 2. The values of IMAT[0][1] and IMAT[2][1] are both 1 since the condition of line 36 in Algorithm 2 (PMAT[1][1]==3) is satisfied. The remaining of values of IMAT matrix is completed by tracing the proposed algorithm. Decision vector which is sent to the receiver side is generated by voting the number of '1' values of each row in IMAT matrix. If the sum of all values in each row is greater than the half size of TSV array columns, the corresponding element of the decision vector becomes 1 and the inverted values of the corresponding row of BMAT are transmitted through the TSV lines.

7.2.3 ITCM Method Evaluation

In order to evaluate the efficiency of the proposed ITCM approach, two different designs have been modeled; one embedded with encoder/decoder to implement the proposed ITCM approach, and the other without encoder/decoder components. Similar to evaluation of the CTCA both random and realistic applications (PARSEC benchmark traces) have been used.

Figure 7H:
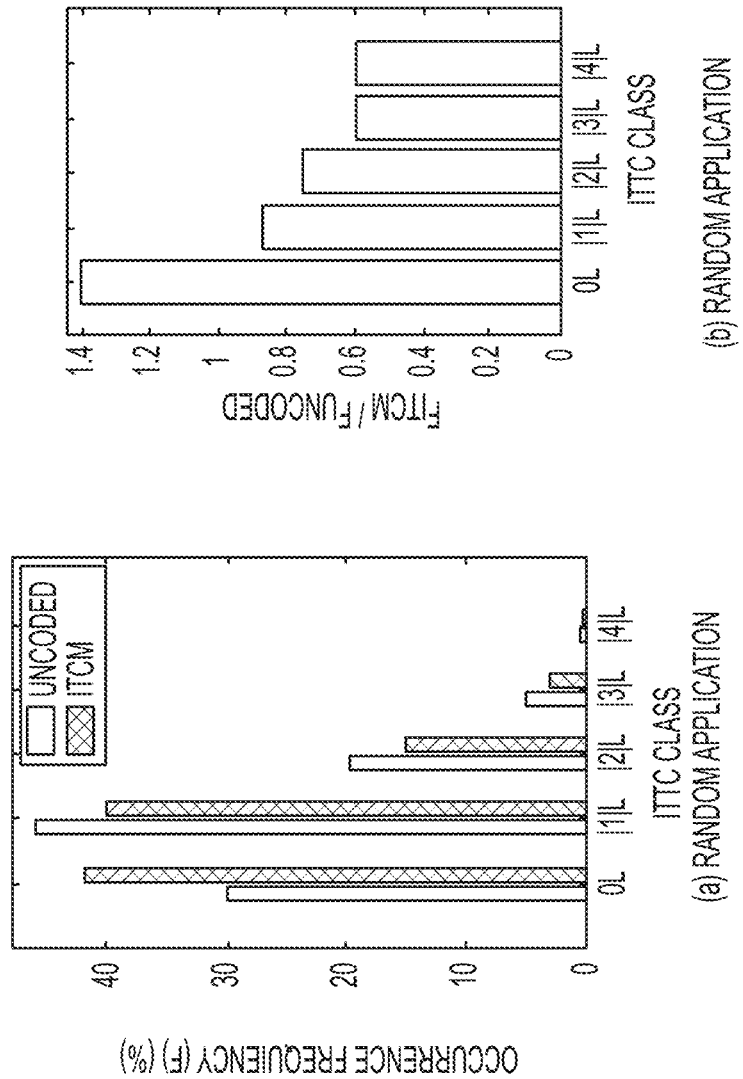
FIG. 7H presents plots that evalute the efficiency of ITCM for an 8×8 TSV bus.

FIG. 7H, plot (a) shows the occurrence percentage of all possible ITTC categories in an 8×8 TSV bundle in both uncoded (left bar) and coded (right bar) models for random data traffic. In FIG. 7H, plot (a), there are 5 pairs of columns, where the left one refers to the uncoded system and the right column refers to the coded system. FIG. 7H, plot (a), also reports the mitigation factor for each class of ITTC. As is evident from plots (a) and (b) in FIG. 7H, the majority of inductive coupling with larger a values are replaced by smaller ones by using the proposed ITCM method. FIG. 7H, plot (c), shows the occurrence frequency of each of the ITTC classes for different applications of PARSEC benchmark workload traffic before and after using the ITCM approach.

Similar to FIG. 7H, plot (a), the right column for each application reports the inductive coupling values in a coded system while the left one shows inductive coupling values for the uncoded one. In FIG. 7H, plot (c), for each workload the left bar represents the uncoded and the right bar shows the coded approach results. As expected the percentage of the inductive coupling with smaller a values in the coded system is much higher than similar ones in the uncoded system. Encoder of the ITCM approach was implemented in Verilog and synthesized by Synopsys Design Compiler using 28 nm TSMC library (1.05V, 25° C.), for estimating the overhead cost. The latency, power consumption, and area occupation of the proposed encoder are summarized in Table 7.4. But, the decoder unit synthesis result is not reported, since it is only composed of a comparator and a mix of inverter gates. It is considerably less complex than the encoder component in terms of area, power consumption, and latency.

TABLE 7.4

Hardware synthesis results of ITCM

| Bus size | Area | Latency | Power |
|---|---|---|---|
| 64-bit | 7290 µm$^2$ | 14 ps | 5.34 mW |
| 128-bit | 13851 µm$^2$ | 20 ps | 10.06 mW |
| 256-bit | 30200 µm$^2$ | 29 ps | 20.23 mW |
| 512-bit | 61786 µm$^2$ | 41 ps | 40.48 mW |

CHAPTER 8: CONCLUSION 3D technologies promise increased system integration at lower cost and reduced footprint. They support performance improvement such as increased bandwidth and easier reuse by mixing and matching existing silicon. The fabrication process is becoming somewhat mature. However, reliability issues need to be addressed for an eventual transition from laboratory to production. The goal of this project is to develop a Three-Dimensional NoC Reliability Evaluation Automatic Tool (TREAT), for the first time, as an analysis tool to analyze effects of static and dynamic faults in 3D NoC architectures. This approach allows injecting faults into the 3D NoC platform dynamically by monitoring the status of links and components to decide where and when to inject faults accurately. The proposed tool reports the strength of different components in terms of reliability based metrics. TREAT is useful for fault-tolerant designers at the early stage of the design to save time and cost.

In more detail, in this research first all possible potential sources of physical faults in 3D NoC environment have been studied. The impacts of all the potential physical faults on 3D NoC components are also addressed to use them as reliability metrics in TREAT. All the main components of a 3D NoC router architecture and sensitive entities with their possible responses to physical faults are categorized in this disclosure. An HDL model of 3D NoC environment as a platform to run experiments is also designed and implemented as a part of this project. Then, the physical causes of faults in logic-level are modeled and applied as fault libraries in TREAT. TREAT is able to model to support both static and dynamic fault injections. It has been developed in a structural way to support future plug-in fault models. In static fault injection phase TREAT runs the simulation for number of times which is defined by the user. TREAT guarantees to inject faults when the target system is stable. The life time of the static fault models are also defined by a random function with exponential distribution. By comparing the value of selected signals and their assertion time in 3D NoC components after running both faulty and faultless experiments the vulnerability of each component is reported. The effect of psychical fault models are used as evaluation metrics in TREAT. The presented tool is capable of evaluating any Verilog model of 3D NoC architecture or fault-tolerant techniques.

In addition, by exploring the physical fault in 3D NoC environment, both Capacitive and Inductive TSV-to-TSV coupling mitigation coding have been proposed as a side related topic to this project. Furthermore, an efficient routing technique has been developed as part of THeNoC simulator development.

FIG. 8 illustrates a process for evaluating the reliability of 3D NoC designs in accordance with some embodiments described herein. The process can begin by simulating (e.g., by using a simulation module executing on a computer) a register-transfer level (RTL) description of a three dimensional (3D) Network-on Chip (NoC) design (block 802). Next, simulation parameters can be received via a user interface that are used by the simulation module to simulate the RTL description of the 3D NoC design (block 804). The process can then inject at least one dynamic logic-level fault into the RTL description of the 3D NoC design while the simulation module is simulating the RTL description of the 3D NoC design, wherein the at least one dynamic logic-level fault corresponds to a physical fault that is specific to the 3D NoC design (block 806).

Next, the process can compute at least one reliability metric for the 3D NoC design based on analyzing an impact of injecting the at least one dynamic logic-level fault into the RTL description of 3D NoC design (808).

FIG. 9 illustrates a computer system in accordance with some embodiments described herein. Computer system 902 can include processor 904, memory 906, and storage device 908. Specifically, memory locations in memory 906 can be addressable by processor 904, thereby enabling processor 904 to access (e.g., via load/store instructions) and manipulate (e.g., via logical/floating point/arithmetic instructions) the data stored in memory 906. Computer system 902 can be coupled to display device 914, keyboard 910, and pointing device 912. Storage device 908 can store operating system 916, software tool 918 (which can include modules shown in FIG. 5A that are executable by processor 904), and data 920. Data 920 can include input required by software tool 918 and/or output generated by software tool 918. Computer system 902 may automatically (or with user help) perform one or more methods that are implicitly or explicitly described in this disclosure.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
a processor; and
a memory storing instructions which, when executed by the processor, cause the processor to:
insert a dynamic fault model into a register-transfer level (RTL) description of a Three-Dimensional (3D) Network-on-Chip (NoC) design;
perform a cycle-accurate simulation of the RTL description of the 3D NoC design;
detect, by using the dynamic fault model, that a dynamic fault activation condition has been met during the simulating of the RTL description of the 3D NoC design based on signal values in the RTL description of the 3D NoC design that are monitored during the simulating of the RTL description of the 3D NoC design;
inject, by using the dynamic fault model, at least one dynamic logic-level fault into the RTL description of the 3D NoC design by triggering at least one through-silicon via (TSV) during the cycle-accurate simulation upon detecting that the dynamic fault activation condition has been met, wherein the at least one dynamic logic-level fault corresponds to a physical fault that is specific to the 3C NoC design;
analyze an impact of injecting the at least one dynamic logic-level fault into the RTL description of the 3D NoC design by comparing (1) an observatory list of signals at associated assertion times in a first cycle-accurate simulation when the at least one dynamic logic-level fault is not injected into the RTL description of the 3D NoC design with (2) the observatory list of signals at the associated assertion times in a second cycle-accurate simulation when the at least one dynamic logic-level fault is injected into the RTL description of the 3D NoC design;
compute at least one reliability metric for the 3D NoC design based on the analyzed impact of injecting the at least one dynamic logic-level fault into the RTL description of the 3D NoC design; and
report the at least one reliability metric for assessing dependability of the 3D NoC design.

2. The apparatus of claim 1, comprising a traffic generation module to generate a traffic pattern that is used by the cycle-accurate simulation.

3. The apparatus of claim 1, wherein the at least one reliability metric for the 3D NoC design is one of: (1) Mean Time Between Failures (MTBF) of one or more components of the 3D NoC design, (2) percentage of header flit loss, (3) percentage of data flit loss, or (4) percentage of tail flit loss.

4. A non-transitory computer-readable storage medium storing instructions which, when executed by a processor, cause the processor to:
insert a dynamic fault model into a register-transfer level (RTL) description of a Three-Dimensional (3D) Network-on-Chip (NoC) design;
perform a cycle-accurate simulation of the RTL description of the 3D NoC design;
detect, by using the dynamic fault model, that a dynamic fault activation condition has been met during the simulating of the RTL description of the 3D NoC design based on signal values in the RTL description of the 3D NoC design that are monitored during the simulating of the RTL description of the 3D NoC design;
inject, by using the dynamic fault model, at least one dynamic logic-level fault into the RTL description of the 3D NoC design by triggering at least one through-silicon via (TSV) during the cycle-accurate simulation upon detecting that the dynamic fault activation condition has been met, wherein the at least one dynamic logic-level fault corresponds to a physical fault that is specific to the 3C NoC design;
analyze an impact of injecting the at least one dynamic logic-level fault into the RTL description of the 3D NoC design by comparing (1) an observatory list of signals at associated assertion times in a first cycle-accurate simulation when the at least one dynamic logic-level fault is not injected into the RTL description of the 3D NoC design, with (2) the observatory list of signals at the associated assertion times in a second cycle-accurate simulation when the at least one dynamic logic-level fault is injected into the RTL description of the 3D NoC design;
compute at least one reliability metric for the 3D NoC design based on the analyzed of injecting the at least one dynamic logic-level fault into the RTL description of the 3D NoC design; and
report the at least one reliability metric for assessing dependability of the 3D NoC design.

5. The non-transitory computer-readable storage medium of claim 4, comprising a traffic generation module to generate a traffic pattern that is used by the cycle-accurate simulation.

6. The non-transitory computer-readable storage medium of claim 4, wherein the at least one reliability metric for the 3D NoC design is one of: (1) Mean Time Between Failures (MTBF) of one or more components of the 3D NoC design, (2) percentage of header flit loss, (3) percentage of data flit loss, or (4) percentage of tail flit loss.

7. A method, comprising:
inserting a dynamic fault model into a register-transfer level (RTL) description of a Three-Dimensional (3D) Network-on-Chip (NoC) design;
performing, by a processor, a cycle-accurate simulation of the RTL description of the 3D NoC design;
detecting, by the dynamic fault model, that a dynamic fault activation condition has been met during the simulating of the RTL description of the 3D NoC design based on signal values in the RTL description of the 3D NoC design that are monitored during the simulating of the RTL description of the 3D NoC design;

injecting, by the dynamic fault model, at least one dynamic logic-level fault into the RTL description of the 3D NoC design by triggering at least one through-silicon via (TSV) during the cycle-accurate simulation upon detecting that the dynamic fault activation condition has been met, wherein the at least one dynamic logic-level fault corresponds to a physical fault that is specific to the 3C NoC design;

analyzing an impact of injecting the at least one dynamic logic-level fault into the RTL description of the 3D NoC design by comparing (1) an observatory list of signals at associated assertion times in a first cycle-accurate simulation when the at least one dynamic logic-level fault is not injected into the RTL description of the 3D NoC design, with (2) the observatory list of signals at the associated assertion times in a second cycle-accurate simulation when the at least one dynamic logic-level fault is injected into the RTL description of the 3D NoC design;

computing at least one reliability metric for the 3D NoC design based on the analyzed impact of injecting the at least one dynamic logic-level fault into the RTL description of the 3D NoC design; and reporting the at least one reliability metric for assessing dependability of the 3D NoC design.

8. The method of claim 7, comprising generating a traffic pattern that is used by the cycle-accurate simulation.

9. The method of claim 7, wherein the at least one reliability metric for the 3D NoC design is one of: (1) Mean Time Between Failures (MTBF) of one or more components of the 3D NoC design, (2) percentage of header flit loss, (3) percentage of data flit loss, or (4) percentage of tail flit loss.

* * * * *